United States Patent
Ecton et al.

(10) Patent No.: US 12,430,977 B2
(45) Date of Patent: Sep. 30, 2025

(54) LOCKER SYSTEM

(71) Applicant: Exchange Box, LLC, Wilmington, DE (US)

(72) Inventors: Cheryl A. Ecton, Mullica Hill, NJ (US); Vicki L. Conteh, Glen Mills, PA (US); Henry M. Winchester, III, Newtown Square, PA (US); Kevin R. Ecton, Woolwich Township, NJ (US)

(73) Assignee: Exchange Box, LLC, Wilmington, DE (US)

( * ) Notice: Subject to any disclaimer, the term of this patent is extended or adjusted under 35 U.S.C. 154(b) by 0 days.

(21) Appl. No.: 18/941,457

(22) Filed: Nov. 8, 2024

(65) Prior Publication Data
US 2025/0148856 A1 May 8, 2025

Related U.S. Application Data

(60) Provisional application No. 63/597,004, filed on Nov. 8, 2023, provisional application No. 63/597,010, filed on Nov. 8, 2023.

(51) Int. Cl.
| | |
|---|---|
| *G07F 17/12* | (2006.01) |
| *G06Q 30/0601* | (2023.01) |
| *G07C 9/00* | (2020.01) |

(52) U.S. Cl.
CPC ......... *G07F 17/12* (2013.01); *G06Q 30/0633* (2013.01); *G07C 9/00912* (2013.01);
(Continued)

(58) Field of Classification Search
CPC .............. G07F 17/12; G06Q 30/0633; G07C 9/00912; G07C 2009/00388; G07C 2009/00468; G07C 2009/00841
See application file for complete search history.

(56) References Cited

U.S. PATENT DOCUMENTS

| | | |
|---|---|---|
| 6,961,711 B1 | 11/2005 | Chee |
| 10,512,351 B1 | 12/2019 | Valeriano et al. |
| (Continued) | | |

FOREIGN PATENT DOCUMENTS

| | | |
|---|---|---|
| CA | 3114527 A1 | 2/2022 |
| CN | 104464107 A | 3/2015 |
| (Continued) | | |

OTHER PUBLICATIONS

International Search Report issued in International Application No. PCT/US2024/055055 dated Mar. 21, 2025.

*Primary Examiner* — Matthew Mikels
(74) *Attorney, Agent, or Firm* — Vos-IP, LLC

(57) ABSTRACT

A locker system having adjustable-sized lockers, the locker system comprising: a first movable partition disposed between a first wall and a second wall as an upstanding partition or between a third wall and a fourth wall as a shelf partition wherein the first wall, the second wall, the third wall, the fourth wall, and a fifth wall are configured to create an enclosed space and the first movable partition is disposed between two walls at a first position and the enclosed space is divided into a first compartment and a second compartment, each of the first compartment and the second compartment having an initial volume; a first door connected to one of the first wall, the second wall, the third wall, the fourth wall, and the fifth wall to enable access to the first compartment and a second door connected to one of the first wall, the second wall, the third wall, the fourth wall, and the fifth wall to enable access to the second compartment; a first locking mechanism corresponding to the first door and a second locking mechanism corresponding to the second door; and a controller in communication with the first locking mechanism, the second locking mechanism, or both to cause the first locking mechanism, the second locking mechanism, or both to be engaged/locked or disengaged/
(Continued)

unlocked wherein the controller is also in communication with the first movable partition to cause the first movable partition to move from the first position to a second position.

12 Claims, 14 Drawing Sheets

(52) U.S. Cl.
CPC .............. *G07C 2009/00388* (2013.01); *G07C 2009/00468* (2013.01); *G07C 2009/00841* (2013.01)

(56) References Cited

U.S. PATENT DOCUMENTS

| | | | |
|---|---|---|---|
| 11,064,832 | B1 | 7/2021 | Goldstein |
| 11,536,081 | B1 | 12/2022 | Goetz et al. |
| 11,767,710 | B1 | 9/2023 | Johnston |
| 2002/0035515 | A1 | 3/2002 | Moreno |
| 2009/0141117 | A1 | 6/2009 | Elberbaum |
| 2012/0012259 | A1* | 1/2012 | Goodman ............ E05F 15/643 52/745.09 |
| 2012/0194043 | A1 | 8/2012 | Turner et al. |
| 2015/0186840 | A1 | 7/2015 | Torres et al. |
| 2015/0254760 | A1 | 9/2015 | Pepper |
| 2016/0066732 | A1 | 3/2016 | Sarvestani |
| 2016/0066733 | A1 | 3/2016 | Gozar |
| 2016/0140496 | A1 | 5/2016 | Simms et al. |
| 2017/0292761 | A1 | 10/2017 | Dade et al. |
| 2018/0165638 | A1 | 6/2018 | Wilkinson et al. |
| 2018/0197141 | A1 | 7/2018 | Venture et al. |
| 2018/0228311 | A1 | 8/2018 | Bloom et al. |
| 2018/0242768 | A1 | 8/2018 | Lewis |
| 2018/0286154 | A1 | 10/2018 | Carter |
| 2019/0047460 | A1* | 2/2019 | Goldberg .................. G07F 5/26 |
| 2019/0362579 | A1 | 11/2019 | Phillips |
| 2020/0005238 | A1 | 1/2020 | Richardson et al. |
| 2020/0107663 | A1 | 4/2020 | Eivaz |
| 2020/0193375 | A1 | 6/2020 | Santangeli et al. |
| 2020/0390313 | A1 | 12/2020 | Pappas |
| 2020/0397172 | A1 | 12/2020 | Kennett |
| 2020/0408028 | A1 | 12/2020 | Schmider et al. |
| 2021/0000275 | A1 | 1/2021 | Excoffier et al. |
| 2021/0042762 | A1 | 2/2021 | Budano et al. |
| 2021/0148157 | A1 | 5/2021 | Muniz et al. |
| 2021/0225104 | A1 | 7/2021 | Gokcebay et al. |
| 2021/0293465 | A1 | 9/2021 | Cartwright |
| 2021/0298508 | A1 | 9/2021 | Chowdhury et al. |
| 2022/0031105 | A1 | 2/2022 | Newcomb |
| 2022/0125230 | A1 | 4/2022 | Jordan et al. |
| 2022/0188765 | A9 | 6/2022 | Simms et al. |
| 2022/0202224 | A1 | 6/2022 | Oksman |
| 2022/0257041 | A1 | 8/2022 | Redford |
| 2022/0296024 | A1 | 9/2022 | Santangeli et al. |
| 2022/0309457 | A1 | 9/2022 | Peynet et al. |
| 2022/0392287 | A1 | 12/2022 | Shen |
| 2023/0034969 | A1 | 2/2023 | Goldstein |
| 2023/0036924 | A1 | 2/2023 | Syed |
| 2023/0206708 | A1 | 6/2023 | Carter |
| 2023/0210295 | A1 | 7/2023 | Anderson et al. |
| 2023/0237864 | A1 | 7/2023 | Lanzi et al. |
| 2023/0334925 | A1 | 10/2023 | Stevenot |
| 2023/0363562 | A1 | 11/2023 | O'Toole et al. |
| 2023/0400244 | A1 | 12/2023 | Truong et al. |
| 2024/0099490 | A1 | 3/2024 | Liu et al. |
| 2024/0144753 | A1 | 5/2024 | O'Rourke et al. |
| 2024/0153329 | A1 | 5/2024 | Carter |
| 2024/0169780 | A1 | 5/2024 | Eichenblatt |

FOREIGN PATENT DOCUMENTS

| | | |
|---|---|---|
| CN | 104537772 A | 4/2015 |
| CN | 104881932 A | 9/2015 |
| CN | 105096450 A | 11/2015 |
| CN | 107495675 A | 12/2017 |
| EP | 2835078 A1 | 2/2015 |
| FR | 3031216 A1 | 7/2016 |
| GB | 2522737 A | 8/2015 |
| JP | 2003-044926 A | 2/2003 |
| KR | 10-2016-0049281 A | 5/2016 |
| WO | WO/2003/056490 A1 | 7/2003 |
| WO | WO/2023/089532 A1 | 5/2023 |

* cited by examiner

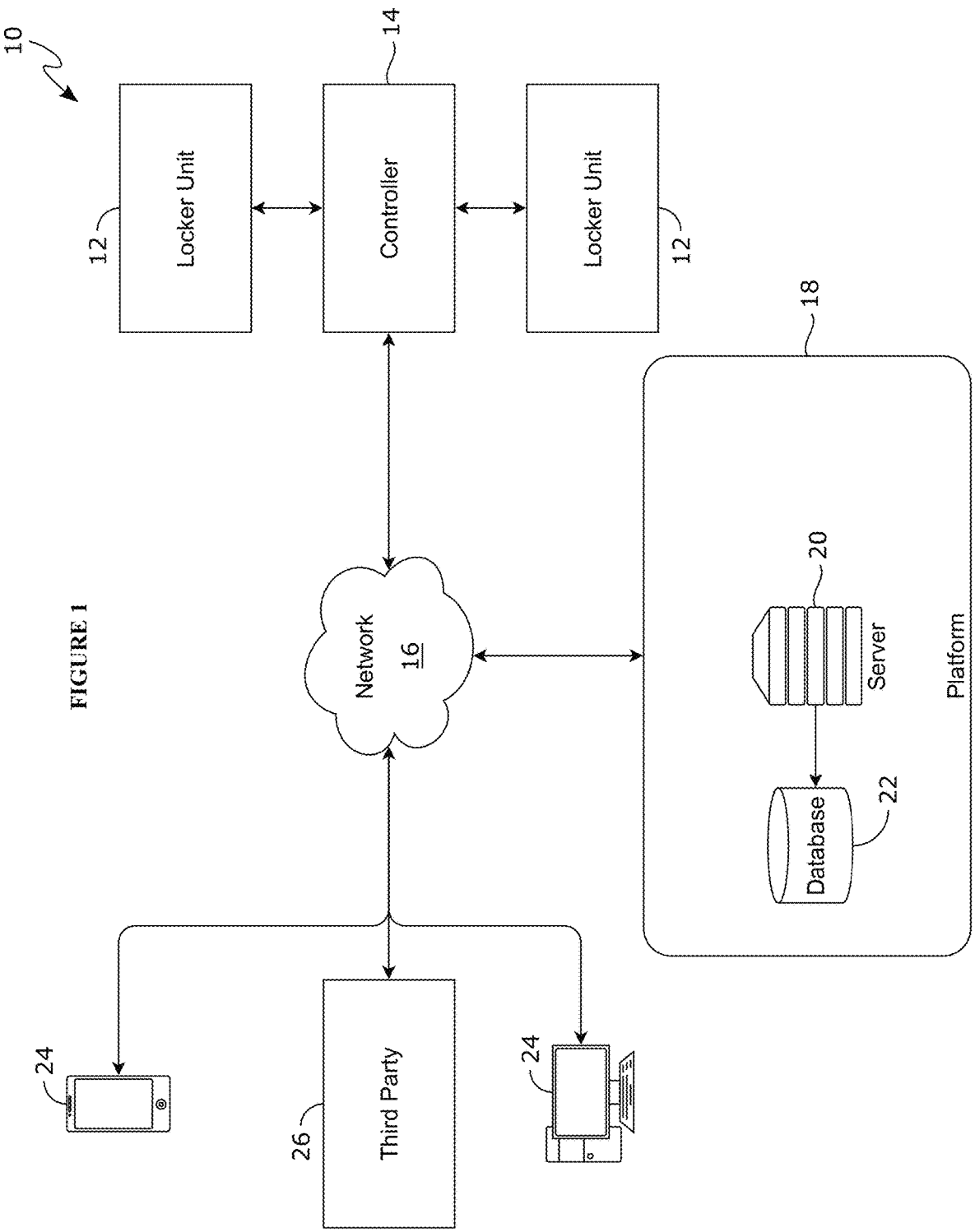

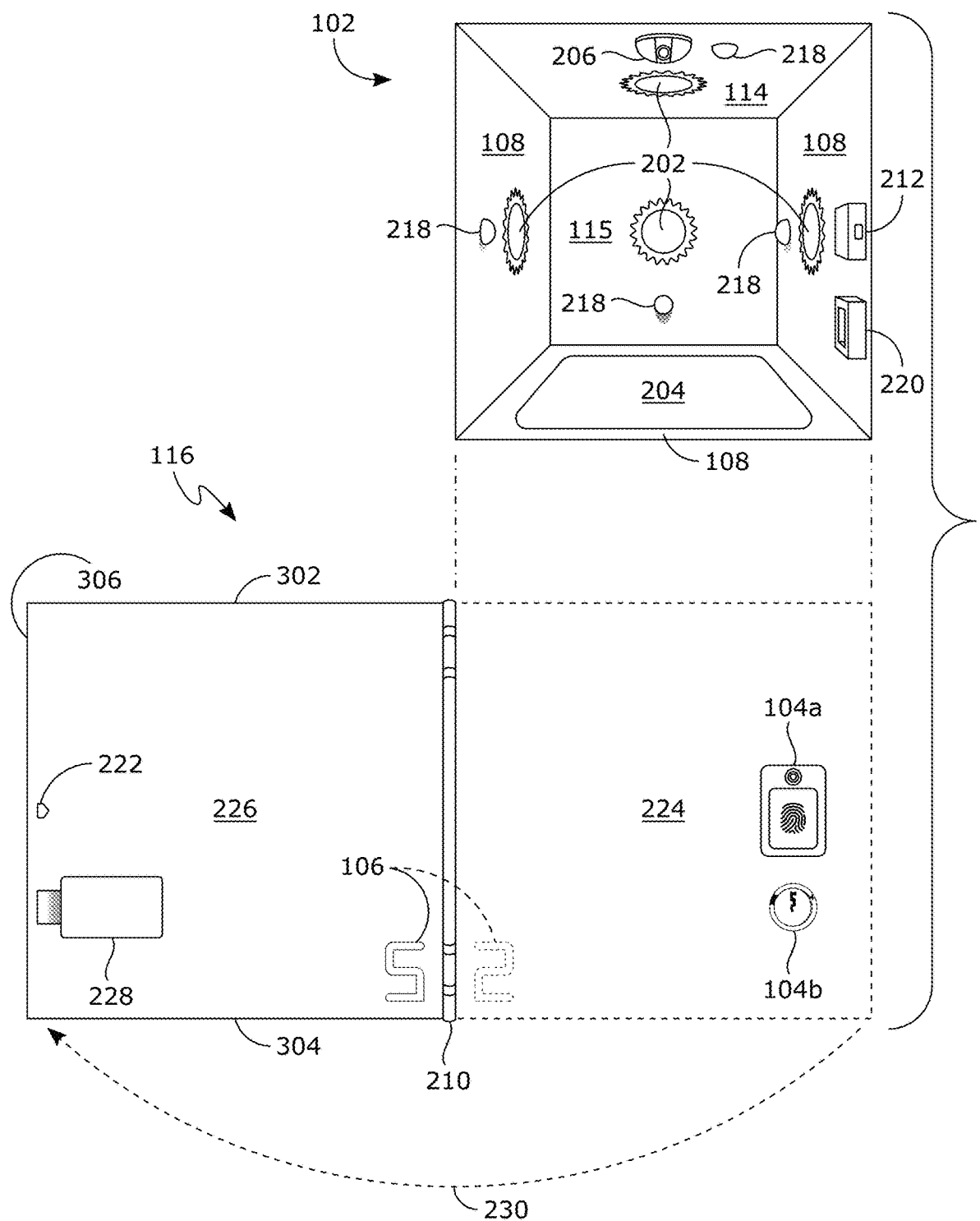

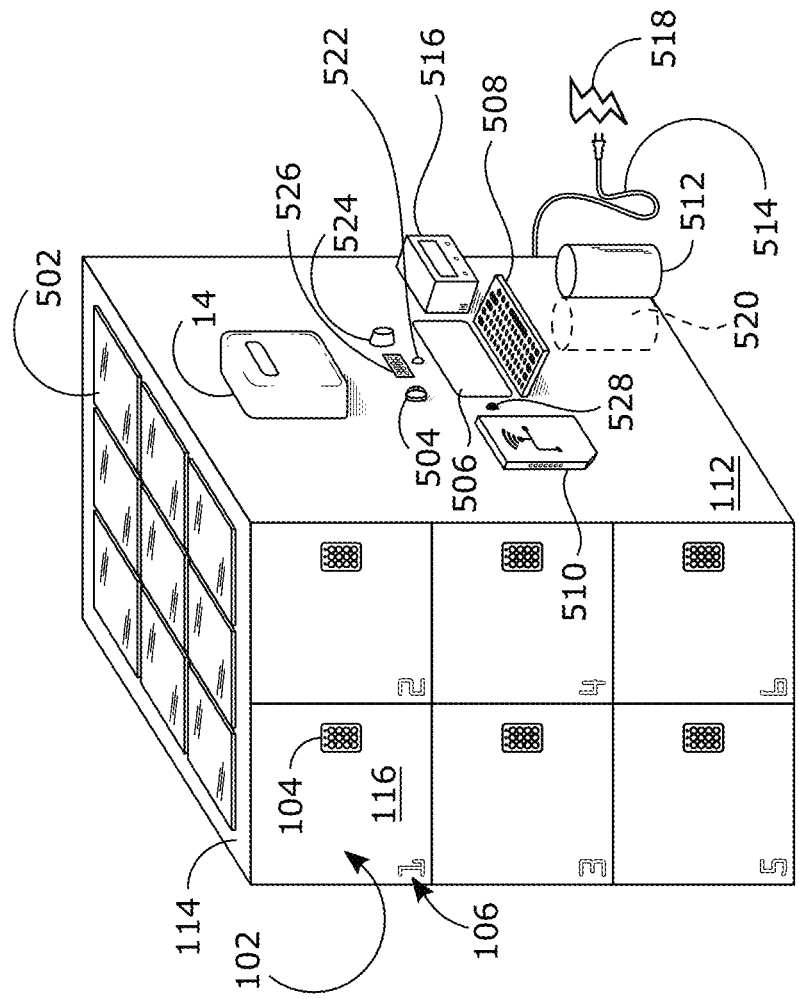

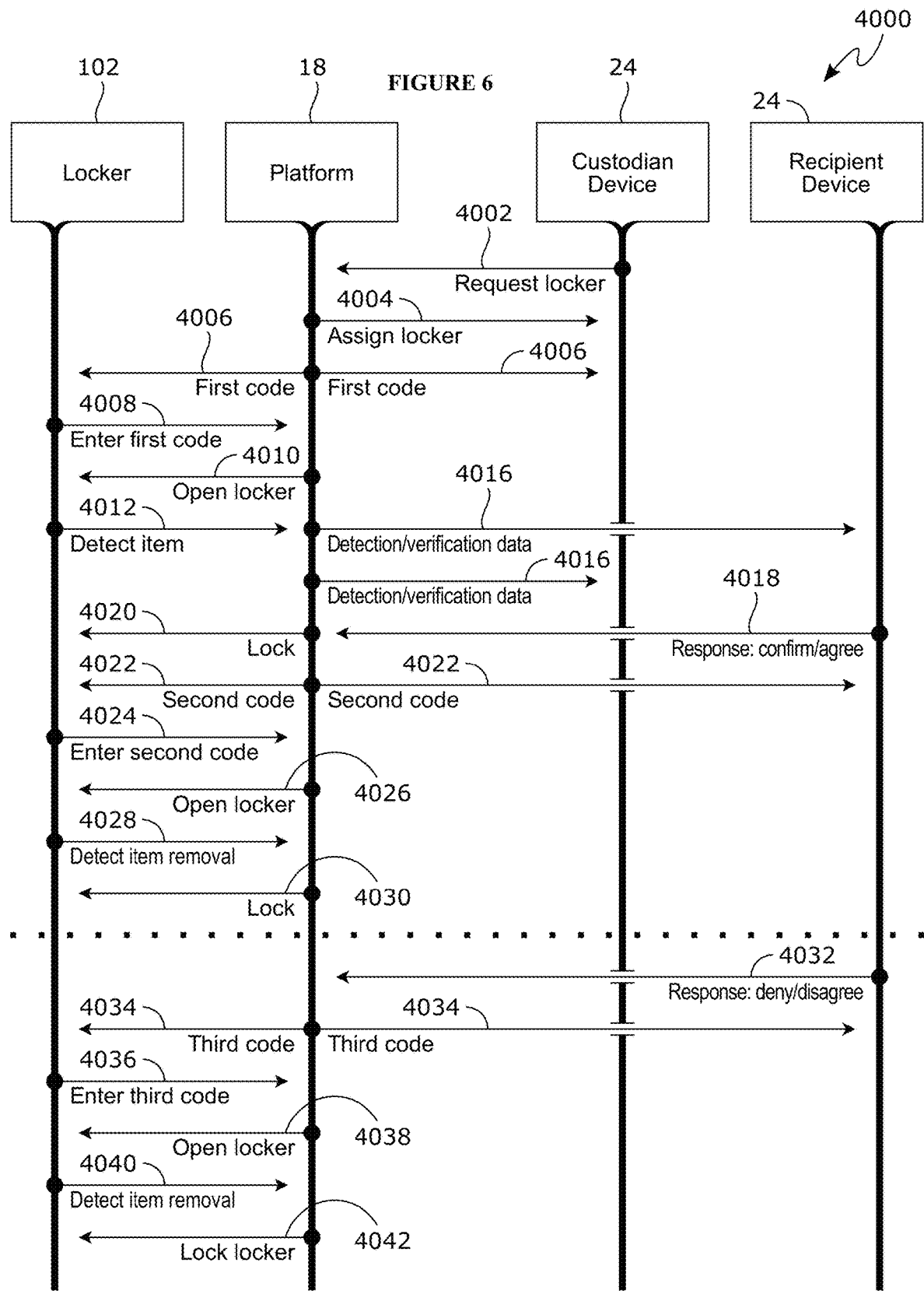

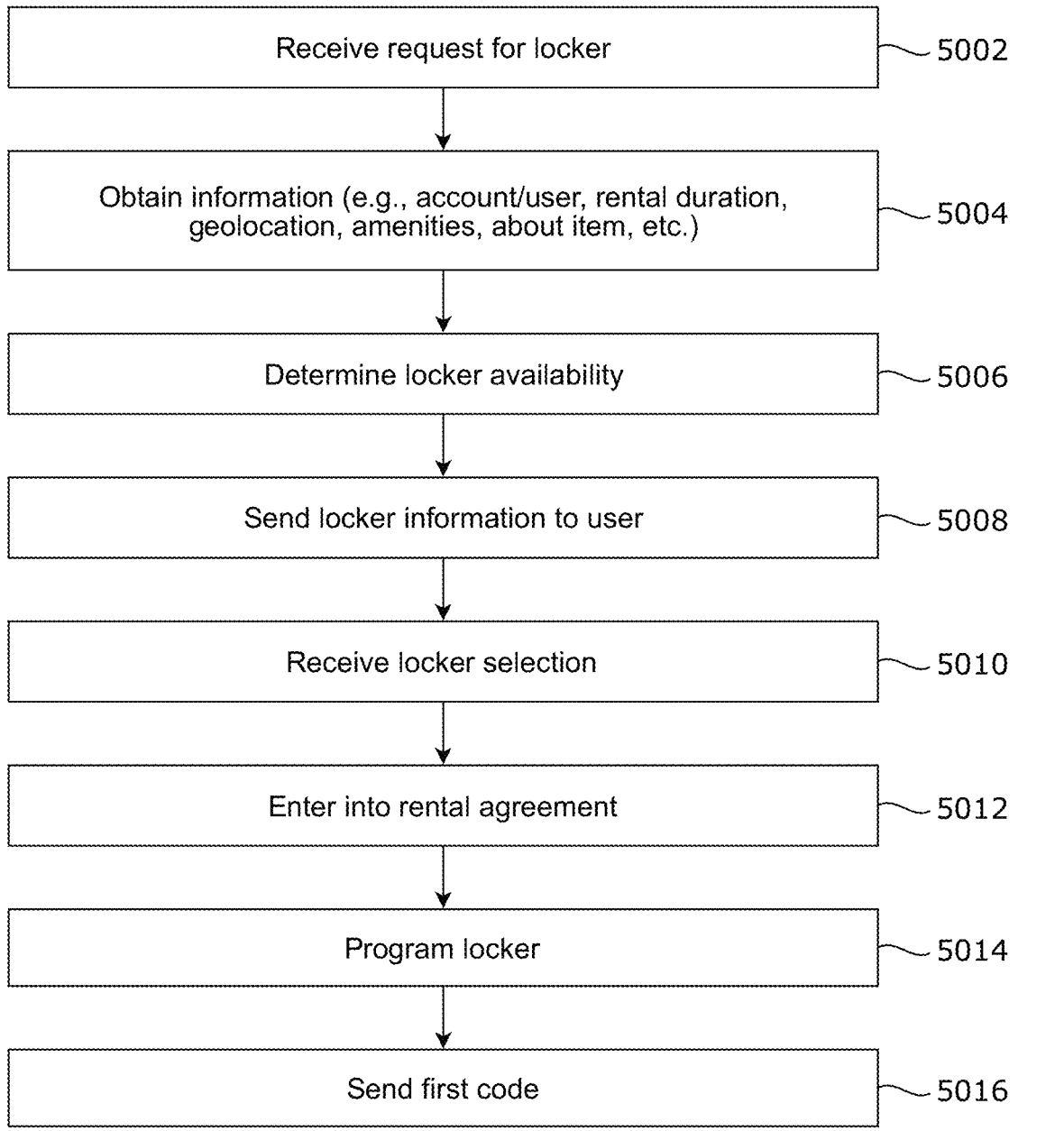

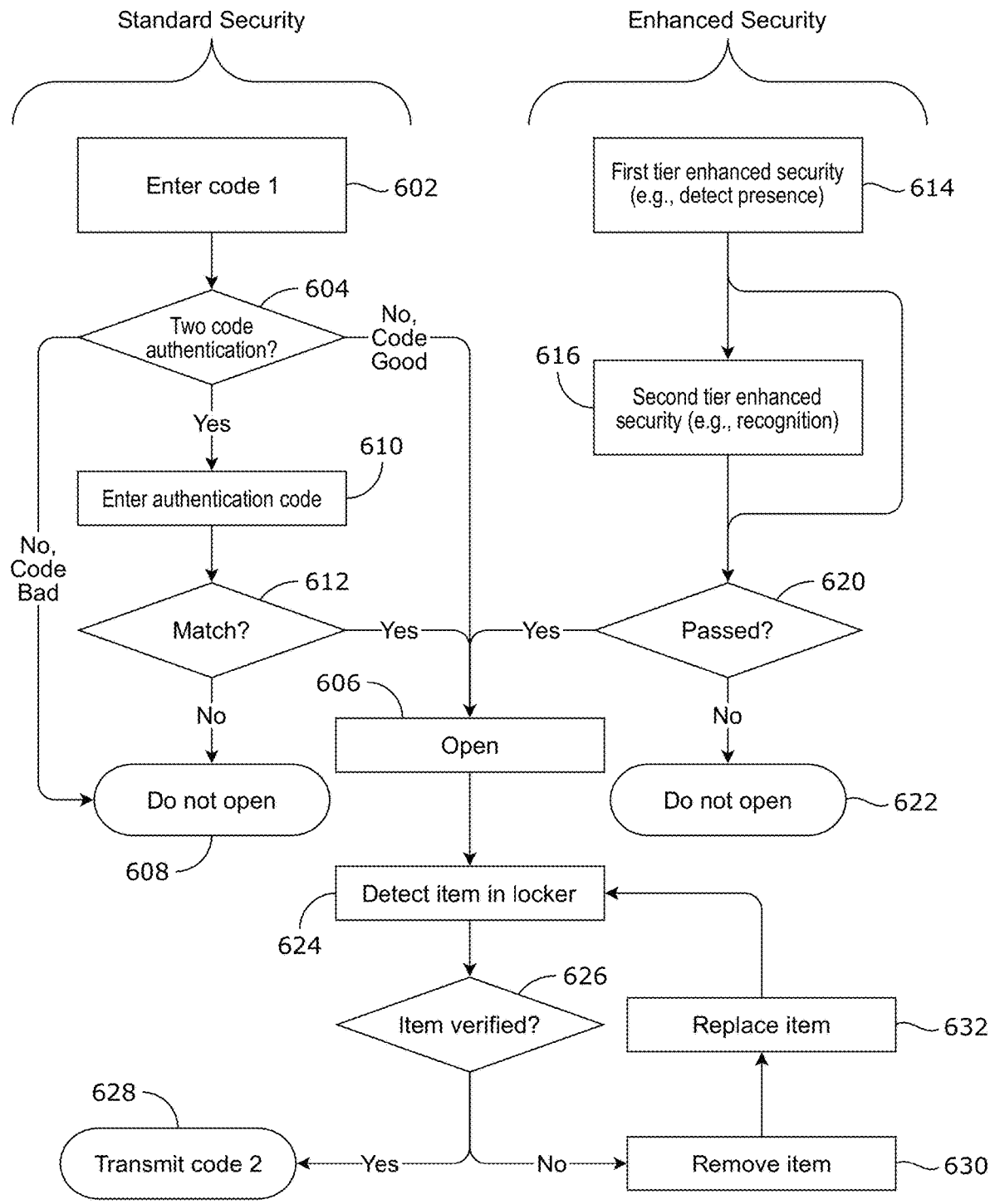

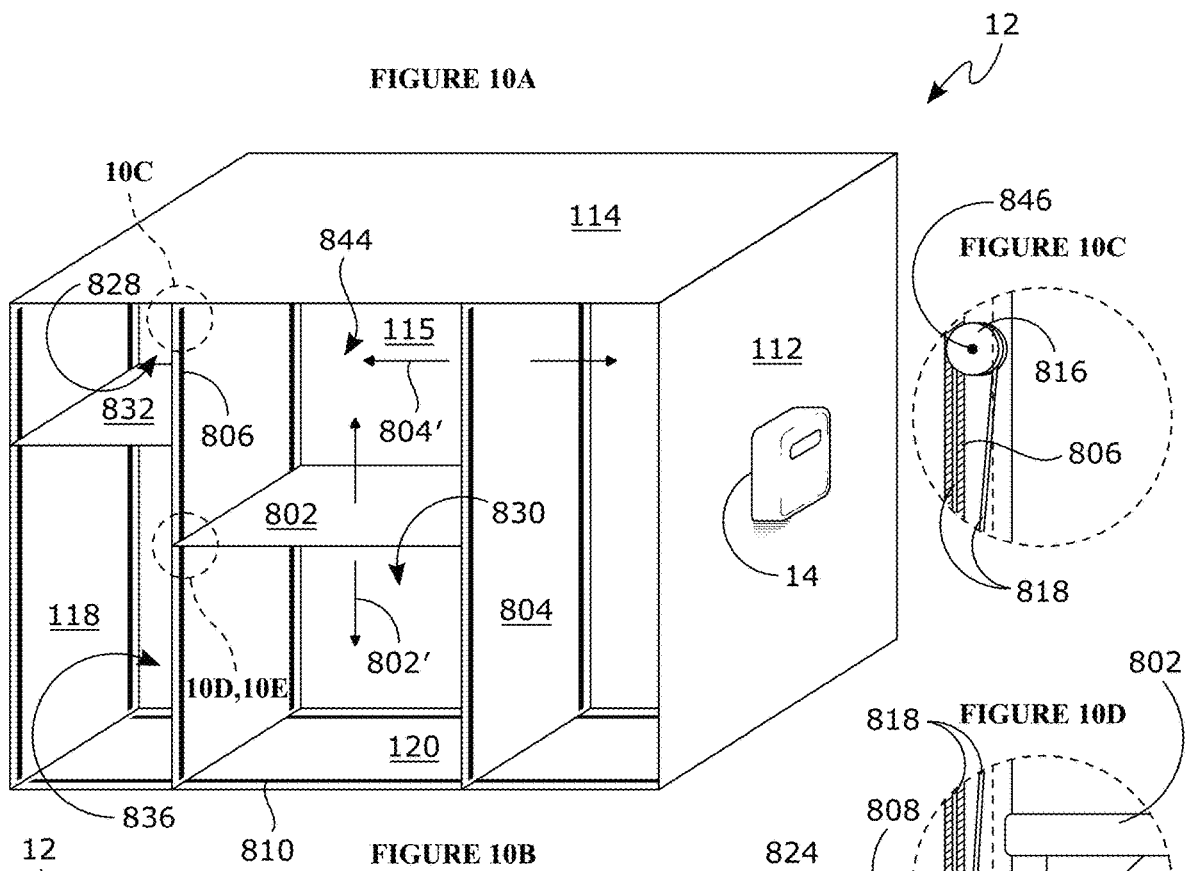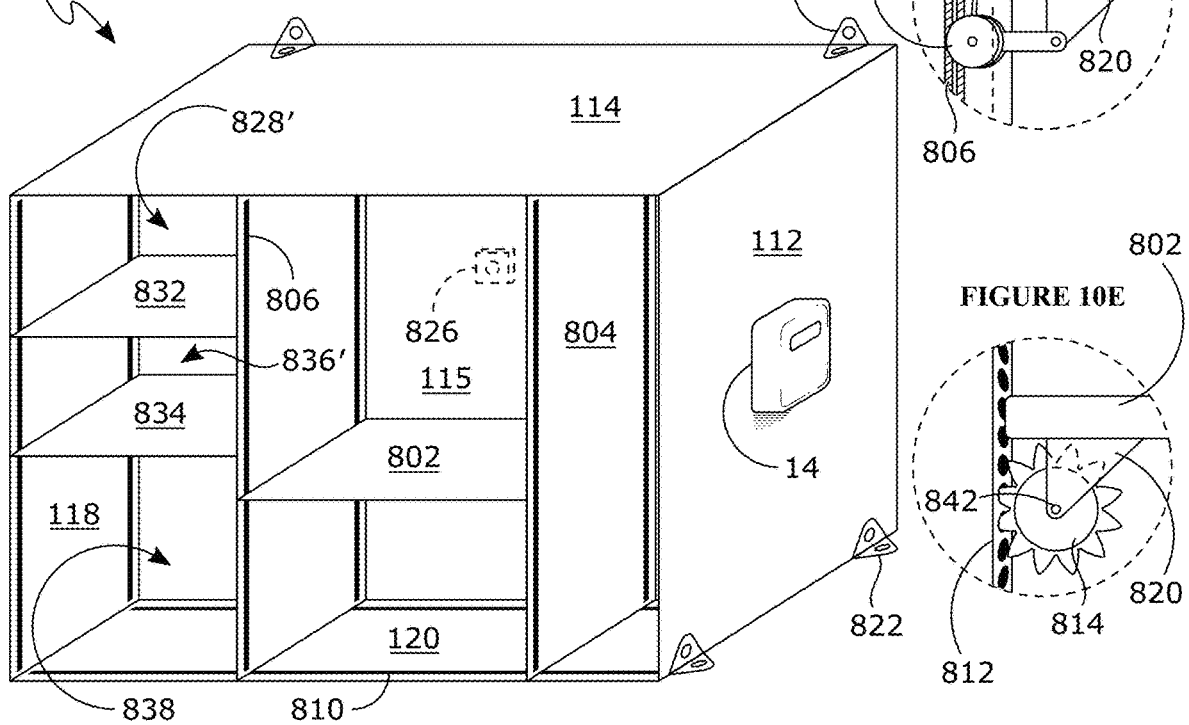

LOCKER SYSTEM

CROSS-REFERENCE TO RELATED APPLICATIONS

This application claims the benefit of U.S. Provisional Patent Application No. 63/597,004 filed on Nov. 8, 2023, and U.S. Provisional Patent Application No. 63/597,010 filed on Nov. 8, 2023, with the United States Patent and Trademark Office, the contents of which are incorporated herein by reference in their entirety.

FIELD OF THE INVENTION

Embodiments of the present invention relate generally to secure lockers and more specifically to adjustable locker systems, which provide flexibility in storage and exchange solutions using the same, and methods relating to modifying locker dimensions and their use.

BACKGROUND OF THE INVENTION

Lockers are a convenient way to temporarily store one or more items. Take, for instance, school lockers, which are used by students to store their personal items, books, supplies, etc. during the day and throughout the school year. Likewise, many people have lockers at their workplace, especially in those situations where the employees do not have an office or lockable desk. Thus, lockers are proven to be useful for temporary storage of items.

Lockers may also be used to hold items for pickup. Cluster mailboxes are one example of a type of locker for mail. The cluster mailboxes may have larger, unassigned boxes for packages that do not fit in the standard issue mailbox. In this case, a package is put in the larger box and a key to open the larger box is put in the standard issue mailbox. This gives some measure of security that the person/address to which the package has been sent will receive the package.

Lockers within and outside of stores, businesses and the like are also becoming popular with the implementation of online orders that can be picked up at a store. In these instances, the lockers may be owned/leased to a business for its exclusive use. As one example, propane tanks are kept in outside lockers where an empty tank may be exchanged for a full tank. As another example, an online order may be put in a locker within a store and the person who placed the order can go to the locker, open it, and pick up the contents.

As useful as lockers are, it is not common to see rentable lockers for public use in public, semipublic, or even private places. Businesses may not be willing to have/use a locker system regardless of whether it is inside or outside of the business due to perceived risks. In fact, such lockers were available at one time, such as in airports, but were removed due to lack of security. Furthermore, individuals typically do not have access to lockers to transfer ownership/first usership from the individual to another individual, store, or other entity. Thus, there is a need for a locker system available to the public, which is easy to access and use, and that has enhanced security measures.

SUMMARY OF THE INVENTION

In a preferred embodiment, a locker system having adjustable-sized lockers, the locker system comprising: (a) a first movable partition disposed between a first wall and a second wall as an upstanding partition or between a third wall and a fourth wall as a shelf partition wherein the first wall, the second wall, the third wall, the fourth wall, and a fifth wall are configured to create an enclosed space and the first movable partition is disposed between two walls at a first position and the enclosed space is divided into a first compartment and a second compartment, each of the first compartment and the second compartment having an initial volume; (b) a first door connected to one of the first wall, the second wall, the third wall, the fourth wall, and the fifth wall to enable access to the first compartment and a second door connected to one of the first wall, the second wall, the third wall, the fourth wall, and the fifth wall to enable access to the second compartment; (c) a first locking mechanism corresponding to the first door and a second locking mechanism corresponding to the second door; and (d) a controller in communication with the first locking mechanism, the second locking mechanism, or both to cause the first locking mechanism, the second locking mechanism, or both to be engaged/locked or disengaged/unlocked wherein the controller is also in communication with the first movable partition to cause the first movable partition to move from the first position to a second position.

In a further embodiment, the locker system wherein the first movable partition is disposed in the second position, which causes the first compartment and the second compartment to change from their respective initial volume to a respective subsequent volume, wherein when a subsequent volume of the first compartment increases, a subsequent volume of the second compartment decreases and vice versa.

In a further embodiment, the locker system further comprising a track in which the first movable partition is movably secured, the track to enable the first movable partition to be moved from the first position to the second position.

In a further embodiment, the locker system further comprising a pulley system in communication with the first movable partition and the controller, the pulley system to move the first movable partition from the first position to the second position.

In a further embodiment, the locker system further comprising a sprocket.

In a further embodiment, the locker system further comprising: a database coupled to the controller either directly or indirectly; wherein the database stores data about a plurality of preset positions in which the first movable partition can be moved; wherein one of the preset positions in the plurality corresponds to the first position and another of the preset positions in the plurality corresponds to the second position; and wherein the first door and the second door each have a plurality of sides and each preset position in the plurality is complementary to one of the plurality of sides of the first door, one of the plurality of sides of the second door, one of a plurality of sides of an additional door, and/or one of the first wall, the second wall, the third wall, the fourth wall, and the fifth wall.

In a further embodiment, the locker system further comprising a microfastening system controlled by the controller, the microfastening system joining the first door and the second door together at one of the sides of the plurality of sides of the first door and an adjacent edge in the plurality of sides of the second door, the microfastening system comprising at least one microfastener and at least one microreceiver wherein the first door and the second door to operate as a single, collective door when the microfastener is received within the microreceiver.

In a further embodiment, the locker system further comprising automatically causing the microfastening system to join the first door to the second door in response to changing the first movable partition from the first position to the second position.

In a further embodiment, the locker system further comprising a second movable partition, the second movable partition configured as another upstanding partition disposed between the first wall and the second wall, the first wall and the first movable partition configured as the shelf partition or the second wall and the first movable partition configured as the shelf partition, or the second movable partition configured as another shelf partition disposed between the third wall and the fourth wall, the third wall and the first movable partition configured as the upstanding partition, or the fourth wall and the first movable partition configured as the upstanding partition.

In a further embodiment, the locker system further comprising: a database coupled to the controller either directly or indirectly; wherein the database stores item-specific data, the item-specific data including a description of an exchange item, a size of the exchange item, a weight of the exchange item, an identifier for the exchange item, a digital image of the exchange item, a description of a distinctive feature of the exchange item, a digital image of the distinctive feature of the exchange item, or combinations thereof; and wherein the database also stores exchange-specific data, the item-specific data for the exchange item, a first user identifying information, a second user identifying information, an exchange date, a first user device associated with a first user, a second user device associated with a second user, or combinations thereof.

In a further embodiment, the locker system further comprising a third-party marketplace for peer-to-peer exchange of items wherein the exchange item is listed by a first user and purchased by a second user on the third-party marketplace and item-specific data about the exchange item obtained from the third-party marketplace by a locker system processor coupled to a locker system memory and the database or by the third party marketplace pushing the item-specific data about the exchange item to the locker system processor.

In a further embodiment, the locker system further comprising a processor coupled to the database and a memory storing executable instructions which, when executed, cause the processor to: (e) obtain the item-specific data for the exchange item from the first user device, the database, a third-party marketplace, or combinations thereof; (f) determine whether the exchange item will fit within the first compartment and/or the second compartment based on the item-specific data for the exchange item by comparing a size of the exchange item to the initial volume of each of the first compartment and the second compartment; (g) when a determination of step (b) indicates that neither the initial volume of the first compartment nor the initial volume of the second compartment can accommodate the exchange item for exchange, send a control signal to the controller to cause the first movable partition to move to the second position; and (h) when a determination of step (b) indicates that neither the initial volume of the first compartment nor the initial volume of the second compartment can accommodate the exchange item, send a control signal to the controller to cause the first door and the second door to fasten together to form a single collective door.

In a further embodiment, the locker system further comprising: (i) a code generator, the code generator generating or selecting one or more access codes; (j) a network connection for communicating the one or more access codes to a first user device, a second user device, or both; and (k) wherein, when executed, instructions cause the processor to: (i) assign a locker to the first user, an assigned locker corresponding to the first compartment having the initial volume, the first compartment having a subsequent volume, the second compartment having the initial volume, or the second compartment having the subsequent volume, the assigned locker based on a determination of which compartment at which volume is best suited for the size of the exchange item; (ii) cause the code generator to generate or select a first access code, the first access code to cause a locking mechanism associated with the assigned locker to disengage/unlock in response to input of the first access code, and wherein the locking mechanism associated with the assigned locker is the first locking mechanism, the second locking mechanism, or both; and (iii) cause the first access code to be transmitted to the first user device, the controller, or both.

In a further embodiment, the locker system wherein, when executed, instructions cause the processor to detect entry of the first access code to open the locking mechanism associated with the assigned locker.

In a further embodiment, the locker system further comprising: (1) a camera disposed within or proximate to the first compartment and/or the second compartment; (m) a scale, an environmental sensor, or both disposed within or proximate to the first compartment and/or the second compartment wherein the environmental sensor is selected from the group consisting of: an accelerometer, a gyroscope, a temperature sensor, a humidity sensor, a vision sensor, an imaging sensor, a proximity sensor, a motion sensor, a level sensor, a position sensor, a gas sensor, a chemical sensor, a pressure sensor, a force sensor, a particle sensor, an infrared sensor, a photoelectric sensor, an ultrasonic sensor, and combinations thereof; and (n) wherein, when executed, instructions cause the processor to: (i) send an instruction concurrent with detecting entry of the first access code to capture data to one or more of the camera, the scale, or the environmental sensor wherein the instruction to capture data is an instruction to capture data as a single event, an instruction to capture data repeatedly until a future event, or an instruction to capture data continuously until the future event; (ii) analyze captured data to determine that an unconfirmed item is contained within the assigned locker; and (iii) in response to determining that the unconfirmed item is contained within the assigned locker: (1) send at least a portion of the captured data to the second user device; (2) analyze at least a portion of the captured data relative to the item-specific data for the exchange item to determine whether the unconfirmed item is the exchange item; (3) optionally send a control signal to the controller to cause the locking mechanism associated with the assigned locker to lock/engage; and (4) optionally in response to locking the locking mechanism associated with the assigned locker, sending a second access code that was generated or selected by the code generator to the second user device.

In a further embodiment, the locker system further comprising instructions which, when executed, cause the processor to: (o) receive an authorization for the exchange to proceed from the second user device, an analysis of the at least a portion of captured data indicating that the unconfirmed item corresponds to the exchange item, or both and in response thereto and if not done so already, send the control signal to the controller to cause the locking mechanism associated with the assigned locker to lock/engage; and (p) in response to causing the locking mechanism associated with the assigned locker to lock/engage and if not done so already, send the second access code to the second user device.

In a further embodiment, the locker system further comprising instructions which, when executed, cause the processor to obtain a payment-made acknowledgement from one or more of the first user device, the second user device, a third-party transaction service, and the third-party marketplace; use the payment-made acknowledgement to cause a payment for the exchange item to be held in escrow; and use the authorization for the exchange to proceed as a trigger to cause release of the payment to the first user.

In a further embodiment, the locker system further comprising instructions which, when executed, cause the processor to obtain a portion of the payment as compensation for using the locker system to transfer the exchange item.

In a preferred embodiment, a locker system having adjustable-sized lockers, the locker system comprising: (a) a first wall, a second wall, a third wall, a fourth wall, and a fifth wall configured to create an enclosed space; (b) at least one movable partition disposed between the first wall and the second wall at a first position to divide the enclosed space into a first compartment and a second compartment wherein the first compartment and the second compartment each have an opening to an initial internal volume; (c) a first door positioned to selectively cover the opening of the first compartment; (d) a second door positioned to selectively cover the opening of the second compartment; (e) a first locking mechanism coupled to the first door to cause the first door to be in either a locked state or an unlocked state; (f) a second locking mechanism coupled to the second door to cause the second door to be in either a locked state or an unlocked state; (g) a controller to control movement of the movable partition between the first position and a second position, the controller also to control whether the first locking mechanism is engaged or disengaged and/or whether the second locking mechanism is engaged or disengaged; and (h) a scanner/reader in operative communication with the controller wherein the scanner/reader is enabled to scan or read a quick response (QR) code, a radio-frequency identifier (RFID), a near-field communication (NFC) tag, or biometric data to open the first door, the second door, or both.

In a further embodiment, the locker system further comprising: (i) a processor coupled to a database and a memory storing executable instructions which, when executed, cause the processor to: (i) receive input regarding an item to be transferred from a first user to a second user, the input indicating at least a size of the item; (ii) respond to the input regarding the size of the item by determining if the first compartment or the second compartment is sized to accommodate the item; (iii) when the determination of step (i) (ii) indicates that neither the first compartment nor the second compartment is sized to accommodate the item, send a control signal to the controller to move the movable partition to the second position, which causes the initial internal volume of the first compartment and the second compartment to change to a subsequent volume and a corresponding change to the opening of the first compartment and the second compartment wherein the subsequent volume of either the first compartment or the second compartment is greater than its initial internal volume; (iv) in response to increasing the subsequent volume of either the first compartment or the second compartment, assigning a first code to the compartment having the increased subsequent volume and sending the first code to a first user device, the first code to enable limited access to the compartment having the increased subsequent volume by the first user; and (v) in response to receiving input of the first code and to detecting that an object is contained within the compartment having the increased subsequent volume, assigning a second code to the compartment having the increased subsequent volume and sending the second code to a second user device to enable the second user to have limited access to the compartment having the increased subsequent volume.

In a further embodiment, the locker system wherein each of the first code and the second code are RFID codes.

In a further embodiment, the locker system wherein the processor is caused to: (i) respond to detecting that any door is shut while the corresponding compartment is occupied by automatically sending a signal to lock one or more locking mechanisms to ensure that the corresponding compartment remains occupied; and/or (ii) automatically send a signal to cause the camera, other sensor, or both to repeatedly capture data; and/or (iii) respond to detecting entry of the first access code by sending a signal to the scale to repeatedly capture data; and/or (iv) respond to detecting that any door is locked while a corresponding compartment contains an object therein by causing the scale to weigh the object, send a weight of the object to the processor for comparing to an expected weight of the object, and store the weight of the object in the database; and/or (v) detect a closing of any door and locking of the corresponding locking mechanism while the corresponding compartment contains the object and respond thereto by rendering the first access code inoperable; and/or (vi) receive and store data from one or more of the camera, the scale, or any other sensor, wherein received and stored data is analyzed to determine if the object is contained within the compartment in which the camera, the scale, or the environmental sensor is housed; and/or (vii) respond to determining that the object is contained within the compartment in which the camera, the scale, or the environmental sensor is housed by causing the controller to lock the locking mechanism associated with the compartment in which the camera, the scale, or the environmental sensor is housed; and/or (viii) transmit at least a portion of received and stored data to the first user device, the second user device, or both; and/or (ix) receive an item approval from the first user device, the second user device, or both wherein a received item approval is stored in conjunction with a particular exchange; and/or (x) use the received item approval as a permission for generating the second access code for the particular exchange; and/or (xi) transmit the second access code to only the second user device; and/or (xii) transmit a portion of received and stored data to the second user device, receive the item approval from only the second user device, and use the item approval from only the second user as the permission to generate the second access code; and/or (xiii) compare item-specific data about the exchange item from the database to captured data from one or more of the camera, the scale, and the environmental sensor to determine if the captured data is indicative of the exchange item; and/or (xiv) use a result of the comparison in step (xiii) to generate and transmit a report containing the result to one or both of the first user and the second user.

In a further embodiment, the system wherein the locker system is defined by the abovementioned embodiments.

In preferred embodiments, any one of a sub combination of any of the systems with any of the locker elements.

In a preferred embodiment, a secure locker system comprising: (a) a plurality of lockers, each locker in the plurality comprising a door selectively lockable by a locking mechanism when the door is in a closed state and having one or more walls that define a compartment in which an item may be securely stored when the door is in the closed state and a fastener of the locking mechanism is in an engaged state or a locked state; (b) a locker monitor comprising: (i) a camera, a second sensor, or both for collecting locker-specific information from one or more of the lockers in the plurality; and (ii) a controller receiving locker-specific information from the camera, the second sensor, or both and controlling a state of the door, a state of the fastener, or both; (c) a processor coupled to a database and to a memory programmed with executable instructions wherein the executable instructions include a locker interface for enabling communications between the processor and the controller and wherein the processor: (i) obtains locker-specific information for each locker in the plurality of lockers from the controller wherein the locker-specific information includes data indicative of the state of the door, data indicative of the state of the locking mechanism, and data indicative of a state of the compartment; and (d) when analysis of the data indicative of the state of the compartment indicates that the compartment is occupied with the item and analysis of the data indicative of the state of the door indicates that the door is closed, a locker monitor comprises: (i) a camera, other sensor, or both for collecting locker-specific item information from one or more of the lockers in the plurality; and (ii) a controller, controller programming, or both for communicating with the locker interface including locker-specific item information, the locker monitor sending a signal to the controller to cause a fastener of the locking mechanism to be in the engaged state or the locked state.

In a further embodiment, the secure locker system wherein the locker monitor includes a camera, a second sensor, or both disposed within each locker of the plurality and wherein each of the data indicative of the state of the door, data indicative of the state of the fastener, and data indicative of the state of the compartment are obtained from camera data.

In a further embodiment, the secure locker system wherein the locker monitor includes the second sensor disposed within each locker of the plurality, wherein the data indicative of the state of the door is obtained from a switch associated with the door, the second sensor, or both, and wherein the second sensor is selected from the group consisting of: an accelerometer, a gyroscope, a proximity sensor, an infrared sensor, a motion sensor, a level sensor, a position sensor, a pressure sensor, a force sensor, a photoelectric sensor, an ultrasonic sensor, and combinations thereof.

In a further embodiment, the secure locker system further comprising a code generator wherein the code generator generates and/or selects a single use code and the processor sends the single use code to a user device and to the controller, and in response to receiving the single use code into an input portion associated with the locking mechanism, the controller causes the fastener of the locking mechanism to switch from an engaged/locked state to a disengaged/unlocked state and the processor causes the single use code to expire.

In a further embodiment, the secure locker system further comprising a first data set indicative of a particular item, the first data set stored in the database, and in response to determining that the compartment is occupied by an item, the processor retrieves the first data set from the database and compares it to camera and/or second sensor data to determine if the item occupying the compartment is substantially similar to the particular item indicated by the first data set or the processor sends camera and/or second sensor data to one or more user devices.

In a further embodiment, the secure locker system further comprising the controller causing the fastener of the locking mechanism to be in an engaged/locked state in response to determining that the item occupying the compartment is substantially similar to the particular item indicated by the first data set and/or an authorization communication received from one or more user devices.

In a preferred embodiment, a method for monitoring whether an item is contained within a locker, the method comprising: (a) for a particular locker in a plurality of lockers, determining whether a compartment defined by the particular locker is empty or occupied by a camera, a second sensor, or both; (b) when the determination in step (a) indicates that the compartment is occupied, obtaining a first set of data about an item contained within the locker from the camera, the second sensor, or both; (c) analyzing the first set of data with respect to a second set of data by a processor to determine if the first set of data agrees with the second set of data, the second set of data retrieved from a database and pertaining to a particular item; and (d) when the analysis from step (c) indicates that the first set of data agrees with the second set of data, sending a control signal from the processor to a controller to cause a locking mechanism associated with a door of the locker to engage/lock.

In a further embodiment, the method further comprising sending a control signal from the processor to a controller to cause the door to open or unlock when the analysis from step (c) indicates that the first set of data does not agree with the second set of data.

In a further embodiment, the method further comprising obtaining a third set of data from one or both of the camera and the second sensor after the door is closed and the locking mechanism is engaged/locked and sending the third set of data or a portion thereof to a first user device, a second user device, or both.

In a further embodiment, the method further comprising sending a code to the second user device and the controller in response to receiving an authorization communication from the first user device, the second user device, or both.

In a further embodiment, the method wherein the second set of data is obtained from a sale listing associated with the item contained within the locker.

In a further embodiment, the method wherein the second set of data defines one or more of: an image, a weight, and/or a dimension related to the item contained within the locker.

In a further embodiment, the method wherein the second set of data is provided from a user device.

In a further embodiment, the method wherein the second set of data is derived from a trained database.

In a further embodiment, the method wherein in step (d), the method utilizes a two-factor authentication process before the step of engaging the lock and performs the step of engaging the lock upon receipt of agreement between the first set of data and the second set of data and upon receipt of an authentication data.

In a preferred embodiment, an item confirmation system that confirms when an item is contained within a locker, the item confirmation system comprising: (a) a locker having at least one wall that defines a compartment and a door in communication with the compartment to enable selective access to the compartment; (b) a locking mechanism having a fastener, the locking mechanism and fastener disposed to cause the door to be locked when the door is in a shut position; (c) a sensor disposed in the compartment or proximate thereto; (d) a controller controlling operation of the door, the locking mechanism, the sensor, or combinations thereof; and (e) a processor in communication with a memory, a data storage device, and the controller, the memory programmed with executable instructions that, when executed, enable the processor to: (i) receive sensor input indicative of an item being contained within the compartment; (ii) analyze the sensor input to determine whether the item contained within the compartment corresponds to item data indicative of a particular item that is retrieved from the data storage device; (iii) receive input regarding a position of the door, the position of the door being either in an open position or a closed position; (iv) analyze the input regarding the position of the door to determine if the door is opened or closed; (v) when the sensor input indicates that the item contained within the compartment corresponds to item data indicative of the particular item and input regarding the position of the door indicates that the door is closed, send a control signal to the controller to cause the fastener of the locking mechanism to engage; (vi) when the sensor input indicates that the item contained within the compartment does not correspond to item data indicative of the particular item and the input regarding the position of the door indicates that the door is closed, send a control signal to the controller to cause the door to open; and (vii) when the sensor input indicates that the item contained within the compartment corresponds to item data indicative of the particular item and the position of the door indicates that the door is opened, send a control signal to the controller to cause the door to close and to cause the fastener of the locking mechanism to engage.

In a further embodiment, the item confirmation system wherein the item data is obtained from a sales listing defining the item within the locker.

In a preferred embodiment, a controller for a locker apparatus comprising: (a) a plurality of lockers, each locker having a door and defining a cavity for receiving an item; (b) a camera, other sensor, or both situated proximate to or within the cavity to obtain camera information or sensor information; and (c) a locking mechanism associated with the door to cause the door to be in at least a closed locked state or an opened unlocked state, the controller configured to: (i) repeatedly obtain information from the camera, the other sensor, or both; (ii) using the obtained information and a locker identifier, analyze whether an item has been placed within the cavity and identify the locker linked to the locker identifier; (iii) if the result of the analysis of step (c) (ii) indicates that an item has been placed within the cavity, obtain item information from an item database, the item information from the item database describing an item, depicting an item, or both, the item to be placed in the locker linked to the locker identifier; (iv) compare the camera information, the other sensor information, or both to the item information from the item database to determine if the item within the cavity is the same as the item described, depicted, or both in the item database; (v) if the determination of step (c) (iv) indicates that the item within the cavity is the item described in the database, determine if the door is in a closed state via camera information, the other sensor information, or both; and (vi) if the determination of step (c) (v) indicates that the door is in a closed state and repeated information from the camera, the other sensor, or both indicates that the item within the cavity has not been removed from the cavity prior to the door being in the closed state, automatically send a control signal to the locking mechanism to cause the door to be in a closed locked state without further access to the cavity until the locking mechanism has been reset to receive a new code for causing the locking mechanism to be in an opened unlocked state.

In a preferred embodiment, a locker system for transferring ownership of an item, the locker system comprising: (a) a plurality of lockers, each locker having a door and defining a cavity for receiving an item; (b) a camera, other sensor, or both situated proximate to or within the cavity to obtain locker-specific information; (c) a locking mechanism associated with the door to cause the door to be in at least a closed locked state or an opened unlocked state; (d) defining a unique identification code to a first user sufficient to open the locking mechanism associated with the door; and (e) wherein upon an unlocking of the door from the unique identification code of the first user, a controller is configured to: (i) repeatedly obtain information from the camera, the other sensor, or both; (ii) using the obtained information and a locker identifier, analyze whether an item has been placed within the cavity and identify the locker linked to the locker identifier; (iii) if the result of the analysis of step (e) (ii) indicates that an item has been placed within the cavity, obtain item information from an item database, the item information from the item database describing an item, depicting an item, or both, the item to be placed in the locker linked to the locker identifier; (iv) transmit information from the camera, the other sensor, or both to a first user device, a second user device, or both, the information defining the item within the locker; (v) obtaining a confirmation from the first user device or the second user device of the item information that the item within the cavity is the same as the item described, depicted, or both in the item database; (vi) transmitting to the first user device or the second user device, a second unique identification code; and (vii) opening the door when the second unique identification code is entered into the locker system.

In a preferred embodiment, an item confirmation system that confirms when an item is contained within a locker, the item confirmation system comprising: (a) a locker having at least one wall that defines a compartment and a door in communication with the compartment to enable selective access to the compartment; (b) a locking mechanism having a fastener, the locking mechanism and fastener disposed to cause the door to be locked when the door is in a shut position; (c) a sensor disposed in the compartment or proximate thereto; (d) a controller controlling operation of the door, the locking mechanism, the sensor, or combinations thereof; (e) a processor in communication with a memory, a data storage device, and the controller, the memory programmed with executable instructions that, when executed, enable the processor to: (i) receive sensor input indicative of an item being contained within the compartment; (ii) receive input regarding a position of the door, the position of the door being either in an open position or a closed position; (iii) analyze the input regarding the position of the door to determine if the door is opened or closed, and close the door if opened; (iv) transmit sensor input to at least one user device; and (v) upon receipt of an authorization for the at least one user device and input regarding the position of the door indicating that the door is closed, send a control signal to the controller to cause the fastener of the locking mechanism to modify to an open position.

In a further embodiment, the item confirmation system further comprising wherein in step (e) (v), an escrow amount of funds previously provided to the system is released upon receipt of the authorization.

In a preferred embodiment, a locker system for transferring ownership of an item, the locker system comprising: (a) a plurality of lockers, each locker having a door and defining a cavity for receiving an item; (b) a camera, other sensor, or both situated proximate to or within the cavity to obtain locker-specific information; (c) a locking mechanism associated with the door to cause the door to be in at least a closed locked state or an opened unlocked state; (d) defining a unique identification code to a first user sufficient to open the locking mechanism associated with the door; and (e) upon an unlocking of the door from the unique identification code of the first user, updating a database or a memory with a timestamp of the time and the unique identification code of the first user wherein a controller is configured to: (i) repeatedly obtain information from the camera, the other sensor, or both; (ii) using the obtained information and a locker identifier, analyze whether an item has been placed within the cavity and identify the locker linked to the locker identifier; (iii) if the result of the analysis of step (e) (ii) indicates that an item has been placed within the cavity, obtain item information from an item database, the item information from the item database describing an item, depicting an item, or both, the item to be placed in the locker linked to the locker identifier; (iv) transmit information from the camera, the other sensor, or both to a first user device, a second user device, or both, the information defining the item within the locker; (v) obtain a confirmation of the item information from the first user device or the second user device that the item within the cavity is the same as the item described, depicted, or both in the item database; (vi) transmit a second unique identification code to the first user device or the second user device; and (vii) open the door when the second unique identification code is entered into the locker system and update the database with a second timestamp corresponding to a second time and the second unique identification code.

In a preferred embodiment, a locker system for transferring ownership of an item, the locker system comprising: (a) a plurality of lockers, each locker having a door and defining a cavity for receiving an item; (b) a camera, other sensor, or both situated proximate to or within the cavity to obtain locker-specific information; (c) a locking mechanism associated with the door to cause the door to be in at least a closed locked state or an opened unlocked state; (d) transmitting a payment corresponding to a price of the item from a first user device or a second user device, said payment held in an escrow; (e) defining a unique identification code sufficient to open the locking mechanism associated with the door to a first user; (f) upon an unlocking of the door from the unique identification code of the first user, update a database or a memory with a timestamp of the time and the unique identification code of the first user wherein a controller configured to: (i) repeatedly obtain information from the camera, the other sensor, or both; (ii) using the obtained information and a locker identifier, analyze whether an item has been placed within the cavity and identify the locker linked to the locker identifier; (iii) if the result of the analysis of step (f) (ii) indicates that an item has been placed within the cavity, obtain item information from an item database, the item information from the item database describing an item, depicting an item, or both, the item to be placed in the locker linked to the locker identifier; (iv) transmit information from the camera, the other sensor, or both to a first user device, a second user device, or both, the information defining the item within the locker; (v) obtain a confirmation of the item from the first user device or the second user device and releasing the payment held in escrow; (vi) transmit a second unique identification code to the first user device or the second user device; and (vii) open the door when the second unique identification code is entered into the locker system and update the database with a second timestamp corresponding to a second time and the second unique identification code.

In a further embodiment, the system wherein the locker comprises a temperature control system wherein the system: (a) obtains a temperature, a humidity, or both from an item data; (b) after defining the door in a locked position, obtains a temperature reading, a humidity reading, or both from a sensor within the locked locker; (c) after receiving the temperature reading, the humidity reading, or both, compares the temperature reading, the humidity reading, or both to the item data; (d) if the temperature reading, the humidity reading, or both are different from the item data, activates a heating system, a cooling system, or a humidity modifying system to adjust the temperature, the humidity, or both within the locker; (e) performs at least a second measurement from the sensor of a second temperature reading, a second humidity reading, or both and compares to the item data; and (f) upon the second temperature reading, the second humidity reading, or both matching the item data, disengages the heating system, the cooling system, or the humidity modifying system.

In a further embodiment, the system wherein the locker system is defined by the abovementioned embodiments.

In preferred embodiments, any of the embodiments of a locker system can be utilized with any of the system embodiments related to the transfer of goods or identification of goods within the particular locker system.

BRIEF DESCRIPTION OF THE FIGURES

FIG. 1 depicts various components of a system per an embodiment.

FIG. 3C details another representation of a compartment sized as an individual locker and a door associated therewith.

FIG. 5 details a representative locker unit having a variety of devices associated therewith.

FIG. 6 details a sequence diagram illustrating a general example of how a secure locker system may be used to transfer ownership/first usership of an item from one user to another user.

FIG. 7 details a method for obtaining a locker according to an embodiment.

FIG. 8 details a method for opening the obtained locker according to an embodiment.

FIG. 10A-10F detail an embodiment of a locker unit, wherein one or more partitions are movable to create adjustable sized lockers.

DETAILED DESCRIPTION OF THE INVENTION

Figure 2A:
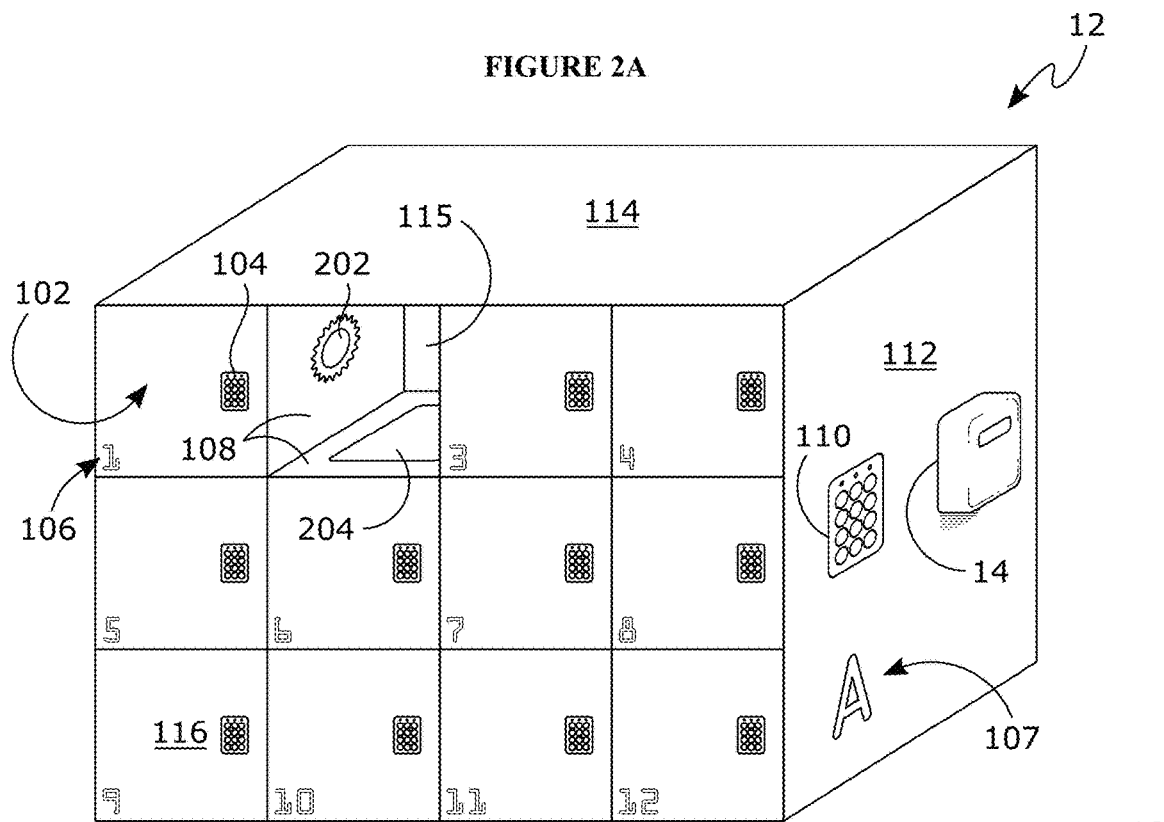
FIG. 2A details a representative locker unit having twelve lockers, each said locker having an interior compartment within which is at least one of a light, a camera, a sensor, or a scale.

A secure locker system may be used for many different reasons. One reason may be to transfer ownership/first usership of one or more items. As one example, a person may sell something either via an e-commerce/online application, through a local/regional newspaper or magazine, word-of-mouth, etc. Typically, the seller and buyer have to determine how to transfer the item. Many people are reluctant to meet face-to-face or to leave the item out in the open where it may be stolen or damaged, such as by the weather. A secure locker system per an embodiment of the present invention allows the seller and buyer to transfer the item from one person to another without having to actually meet in person and with the knowledge that the item is secure during the transfer, and which can assist in eliminating fraud. Businesses may also take advantage of an embodiment of a secure locker system, such as for after/off hours drop off and pickup. Businesses may also use a secure locker system during business hours to expedite transactions and reduce wait times while in line.

Secure locker systems may be used for transfers other than sales, returns, and other similar transactions. As another nonlimiting example, a secure locker may be used to transfer items between individuals such as documents, gifts, donations, personal items that were lost or forgotten, and the like where no money is involved. In this scenario, using the secure locker is more convenient than traveling all the way from one location to the other and participants do not have to coordinate schedules to meet in person. Thus, per an embodiment, secure lockers may be used for direct transfer from person to person or in conjunction with a courier, postal, or other delivery system such as where the distance prevents direct transfers between two parties.

As yet another example, an embodiment of the present invention may allow locker rental for daily/hourly use to store personal items. This type of secure system may be desirable at locations where people want to be unencumbered yet have personal items nearby such as when participating in recreational activities such as at resorts, parks, entertainment venues, while playing/engaging in sports, gyms, beaches, and other such places. Advantageously, users do not have to carry a key, which may accidentally get lost. Further, if sharing the locker (e.g., family members), each person can independently access the secure locker without the presence of another group member.

The embodiments herein are directed toward mechanical lockers as well as electronic systems to allow for efficient ingress and egress into a space within the locker systems. Lockers are well understood by those of ordinary skill in the art, as generally being a space with a door on one side, allowing for selective entry into the space. It is well-understood how to open a door as well as hinging of doors for access, each of which can be implemented in multiple ways without deviating from the scope of the invention. Each of the various embodiments can use one or more of the elements of any of the other embodiments without deviating from the scope of the invention. The end solutions provided by the embodiments herein are scalable and adjustable locker systems that allow for unique changes in dimensions and also for exchange of goods between two users and systems to verify the exchange and to assist in secure payment for the goods exchanged therein. Such systems shall dramatically improve the current issues regarding such exchanges by reducing fraud in such exchanges.

The present locker system is defining new ways in which to allow for the safe and secure exchange of goods between two people or two parties, by allowing for secure access to a given space within a locker system, as well as various systems to allow for monitoring, tracking, and accessing items or information regarding the item within the space, so as to ensure safe and easy exchange of goods. Simultaneously, the systems and devices provided herein detail improved features to prevent fraud and theft of goods that are prevalent in the local exchange economies.

FIG. 1 shows an example of a system (10) that may be used to implement one or more embodiments disclosed herein. Systems (10) are not limited to the system (10) shown in FIG. 1; they may have additional components, fewer components, components that are not shown in the figure and still fall within the spirit and scope of the present invention. Generally, the system (10) includes a locker unit (12), a controller (14), a network (16), a platform (18), a user device (24), and optionally, a third party (26).

There are several embodiments of a locker unit (12) disclosed herein. The locker unit (12) may be any disclosed embodiment or another embodiment that falls within the scope/intent of the disclosure. A given geographical location may accommodate one or more locker units (12). If hosting more than one locker unit (12), the individual locker units (12) may have the same or may have different configurations. Furthermore, a locker unit (12) may be inside and/or outside of a building at a given geographical location, such as a store.

A controller (14) may control the one or more locker units (12). The controller (14) may be a standalone computer, an onboard computer, a kiosk, a control network, part of an internet of things, or other such hardware and/or software that enables a user to provide input, receive output, complete a transaction, etc. relating to one or more locker units (12). The controller (14) may also control the operating of one or more devices, mechanisms, components, or the like associated with a locker unit (12), including, without limitation, individual lockers, locks, lights, and/or sensors. Additionally, the controller (14) may also interface with the platform (18) and communicate therewith via one or more networks (16). Thus, the controller (14) may include one or more of a processor, memory, data storage, input device, output device, other/additional circuitry, hardware, or firmware, etc. and associated software to enable the functionality disclosed herein.

The one or more networks (16) can enable communications between various devices (including controller and locker unit [12]/locker unit components) and may include one or more types of communications protocols. The network (16) may include, without limitation, one or more of a local area network (LAN), a metropolitan area network (MAN), a telecommunications network, a cellular network, satellite communications, global positioning systems, WiFi, the Internet, Bluetooth, near field communication (NFC), or the like.

In an embodiment, the platform (18) architecture serves as the foundation/base that enables the system (10) to function. For the sake of simplicity, the platform (18) shows a single server (20) operatively connected to a database (22). In reality, the platform (18) may include a plurality of servers including virtual servers, virtual machines, etc. of various types, and a plurality of databases (22) having the same or different management systems and/or other types of data storage. Furthermore, the platform (18) may be hosted by a service provider such as an Internet provider, cloud computing provider, or any other hosting and/or provider service such that platform (18) requirements can be scaled on demand/as needed, including the addition/deletion of various types of hardware/software components not depicted in FIG. 1. In an embodiment, the controller (14) may take on some or all of the functionality of the platform (18).

The system (10) may also include one or more user devices (24) in communication with the platform (18), controller (14), third party (26), or combinations thereof via the network (16). A user device (24) may be any type of client device/platform or the like such as a smartphone, tablet, wearable, desktop, laptop, etc. Communications between the user device (24) and the platform (18), third party (26), controller (14), or combinations thereof may be enabled via one or more Web sites/Web applications, an application downloaded onto the user device (24), or both. In this way, a user may be either remote from a particular locker unit (12) or be within the same proximity as the particular locker unit (12) when renting/using a particular locker. Alternatively, interactions, transactions, etc. may also take place via the controller (14) without engaging a user device (24).

Third parties (26) may also take advantage of the secure locker system (10). Third parties (26) may be integrated into the system (10) and/or user devices (24) may be directed/redirected to the platform (18) from a third party (26). Third parties (26) include, but are not limited to, e-commerce/online sites, postal services, courier services, brick, and mortar stores, etc. that can utilize secure lockers as a way to transfer sold, donated, returned, exchanged, transferred, etc. items. When integrated with a third-party (26) online service or the like, one or more application programming interfaces (APIs) or the like may be called upon to facilitate integrated communications.

The system (10) or parts thereof may be utilized in many different ways. For example, the system (10) may be used to facilitate a purchase made via a third-party (26) online store, auction site, or the like. The third-party (26) integrate system (10) functionality in its online store, or it may direct/redirect one or more users to the system (10) to help facilitate the transfer of an item sold/purchased, such as a collectible, a piece of art, a piece of equipment, etc. Generally, and at a very high level of overview, a user may use a user device (24) to rent a locker within a locker unit (12). The rental may take place via the platform (18), the controller (14), or both. Once rented, the selling user can put the sold/purchased item in the locker and the locker will remain securely locked until opened by the purchasing user. The purchasing user then removes the item, and the locker reenters a pool of lockers that are available for rent. The following description and figures provide details about locker units (12), individual lockers within a locker unit (12), processes for use, and controls associated with the locker unit (12), individual lockers, and their use.

Figure 3A:
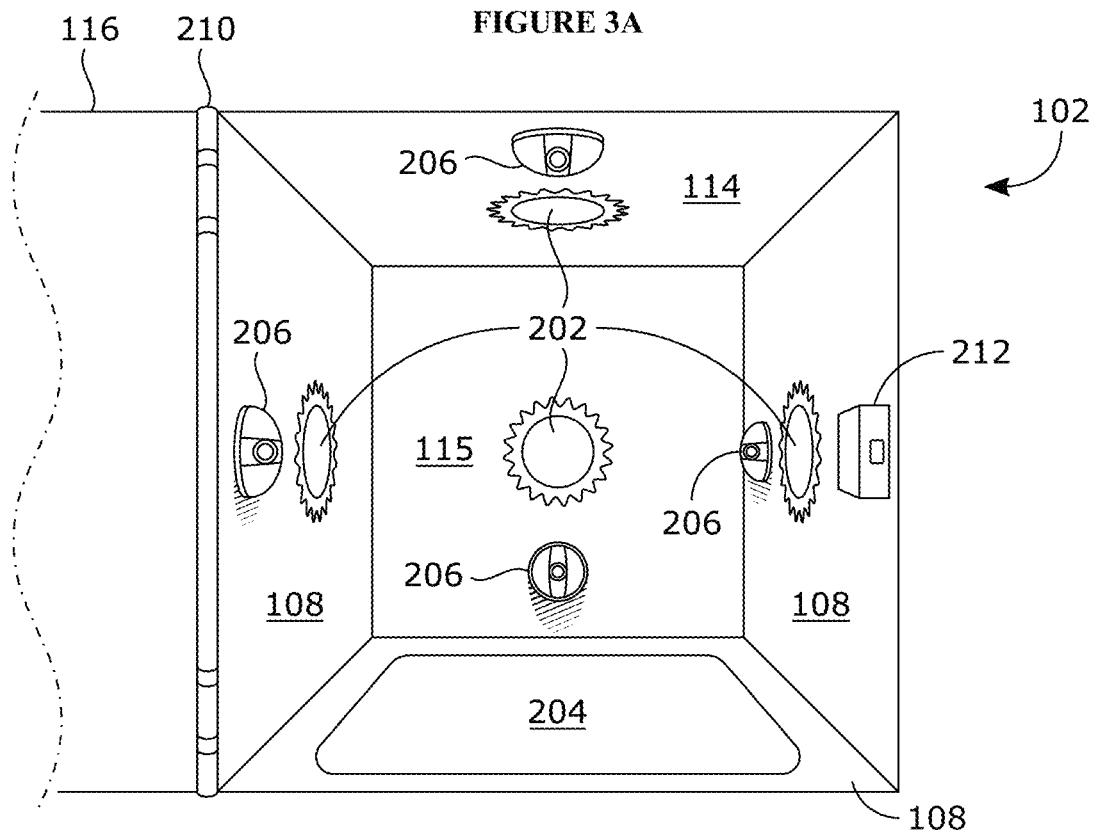
FIG. 3A details a representation of a compartment sized for an individual locker, the compartment having one or more lights, sensors, and/or cameras, to assist in providing for safe transactions using the locker.
Figure 3B:
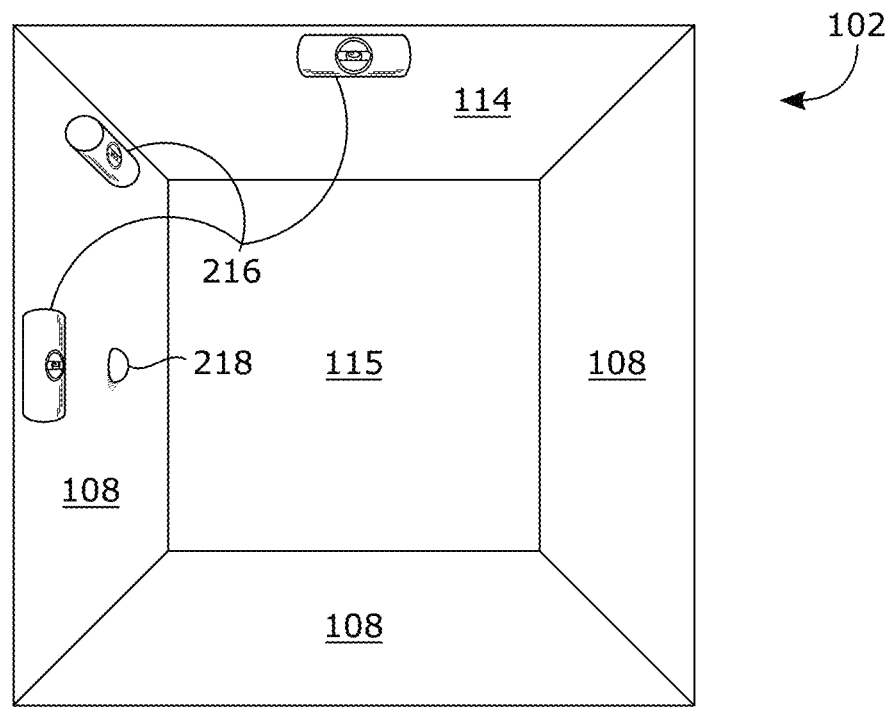
FIG. 3B details another representation of a compartment sized for an individual locker, the compartment having one or more sensors arranged therein.

FIG. 2A shows an embodiment of a locker unit (12). A locker unit may be composed of one or more walls such as a first wall (112), a second wall (114), which are visible in FIG. 2A. Walls that are not visible or that are partially visible in FIG. 2A include a wall opposite and spaced apart from the first wall (112), a wall that is generally perpendicular to the first wall (112) and second wall (114) (i.e., a "back wall," which is shown in FIGS. 3A, 3B, and 3C and is slightly visible via locker #2 in FIG. 2A), and a wall opposite and spaced apart from the second wall (114) (i.e., a floor). Although described as separate walls (112, 114, 115), the walls may be constructed as a continuous wall from a folded sheet of material or other such shape, or more than one wall may be technically continuous but be folded or shaped in such a way that creates the appearance of more than one wall. For ease of understanding, a locker unit (12) is described herein as having a plurality of walls connected together to define an enclosed space regardless of the number and/or size of the sheets of material used in actual fabrication. Further, one or more of the walls described above may be optional. For example, implementations are envisioned where a wall may be provided by an adjacent building or other structure, slab, the ground, or the like.

Figure 2B:
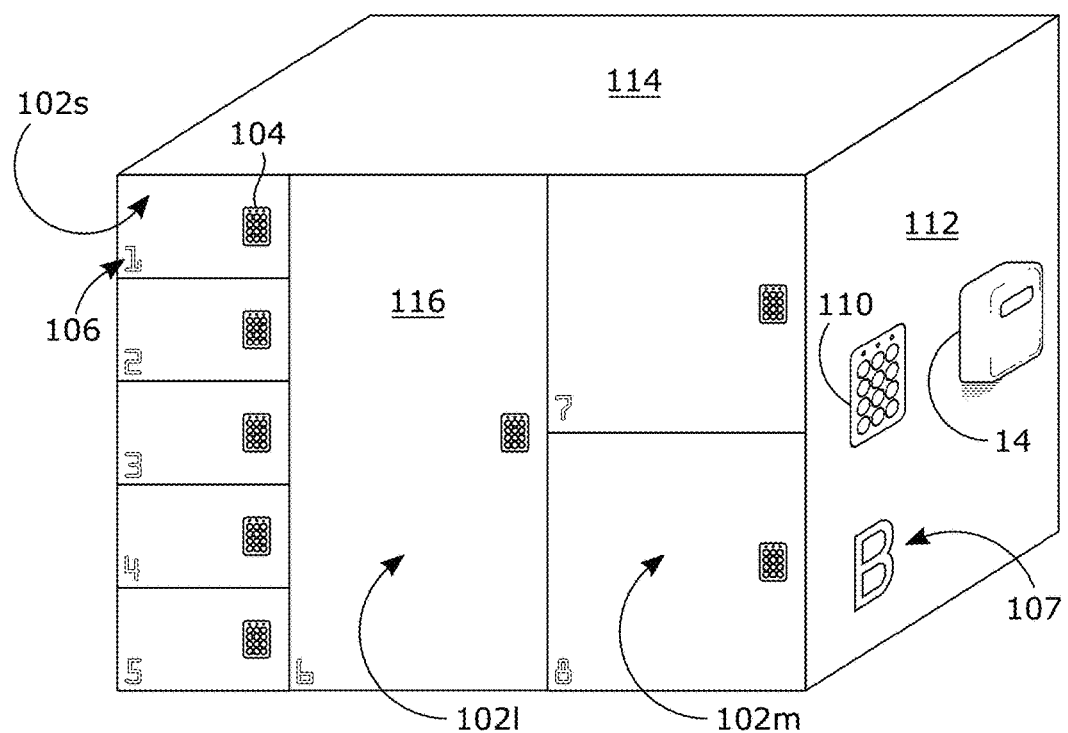
FIG. 2B depicts an alternative configuration of a representative locker.

The locker unit (12) may also include one or more partitions (108) disposed between opposing, spaced apart walls. The positioning and number of partitions (108) within the locker unit (12) defines the number and size of individual lockers (102) compartments that are housed within a particular locker unit (12). For example, as is shown in FIG. 2A, there are twelve individual lockers (102), each individual locker (102) is at least partially defined by one or more partitions (108), which are represented/envisioned by the horizontal lines extending from the first wall (112) and vertical lines extending from the second wall (114). An upstanding partition (108) is visible within opened locker #2 as is a shelf/horizontal partition (108) and the back wall (115). Opened locker #2 shows an optional light (202) and scale (204). In this figure, the walls (e.g., 112, 114, 115) and/or partitions (108) are configured to define compartments of substantially similar size and shape. Embodiments, however, are not limited to compartments of the same size and shape. As is shown in FIG. 2B, the locker unit (12) is configured from essentially the same size and positioning of walls (e.g., 112, 114), but in this case, the partitions (108) are utilized to create eight separate compartments of at least three different sizes. In this way, smaller objects/items can be placed in a comparatively small locker (102s), large objects/items may be placed in a comparatively large locker (102l), and medium sized object/items may be placed in a comparatively medium sized locker (102m). Nonlimiting examples of possible sizes of a small (102s), a medium (102m) and a large (102l) locker compartment may be, respectively: 2 ft. wide by 1 ft. tall by 3 ft. deep, 2.5 ft. wide by 2.5 ft. tall by 3 ft. deep, and 3 ft. wide by 5 ft. tall by 3 ft. deep. Although two embodiments of a locker unit (12) are shown in FIG. 2A and FIG. 2B, it should be understood that a locker unit (12) may be composed of one or more individual lockers (102) in any plausible configuration and/or shape including multiple stepped tiers and other irregular shapes.

Referring to both FIG. 2A and FIG. 2B, a door (116) is associated with each compartment defined by one or more walls (e.g., 112, 114, 115) and/or one or more partitions (108). Generally, the door (116) emulates the size and shape of the compartment opening and can be attached to the locker unit (12) via a hinge or other connector that allows the door (116) to be opened or closed. In other words, doors (116) may open to either side, top, or bottom of the locker unit (12), may be attached to a drawer (not shown), may be articulated such as a garage door, and other such configurations. The plurality of doors (116) may collectively form a front-facing wall of the locker unit (12). Nevertheless, each door (116) can operate independently from the other transitioning between being opened (e.g., compartment accessible) and closed (e.g., compartment inaccessibly).

In an embodiment, one or more locks (104) and/or locking mechanisms are associated with each door (116) in the plurality of doors (116). Like the doors (116), each lock (104) may operate independently of the other locks (104). Generally, when the locking mechanism of the lock is active, access to a compartment via the associated closed door (116) is prohibited. In contrast, when the locking mechanism of the lock (104) is inactive, access to a compartment via the associated opened door (116) is allowed. In other words, the door (116) is open, a user may the locker compartment. However, when the door (116) is shut, access to the compartment within the locker (102) typically depends upon whether the locking mechanism of the lock (104) is active/locked, barring access to the compartment within the locker (102) or inactive/unlocked state, allowing the door (116) to open and close. The lock (104) may be any suitable lock and may include one or more locks (104)/locking mechanisms. For example, a lock (104) may have a combination, a key, an analog or digital alpha/numeric keypad, a facial recognition scanner, a biometric reader (e.g., a fingerprint or retina scanner), an RFID reader, an NFC reader, a magnetic strip reader, a barcode/quick response (QR) code reader, etc. that enables the movement/engagement of connectors such as a latch, a bolt, a shackle, a cam, a lever, a pin, etc. with a strike plate, box, catch, and the like, electronic/electromagnetic connectors, mortise lock connectors, any other suitable connector, a coupling and equivalents and combinations thereof. In an embodiment, each door (116) may be associated with a corresponding lock (104).

Also shown in FIG. 2A and FIG. 2B is a unit keypad (110). The unit keypad (110) may interface with the controller (14), the platform (18) (from FIG. 1), or both. For instance, in an embodiment, a user may use the unit keypad (110) to initiate rental of an individual locker either directly and/or via the platform (18). Further, in an embodiment the unit keypad (110) may be in communication with one or more locking mechanism. That is, each door (116) may or may not have the portion of the lock (104) that receives a code, combination, or the like even though each locker retains an independently operable locking mechanism. Rather, the unit keypad (110) can receive a code, combination, or the like to independently activate/lock, deactivate/unlock each locking mechanism in the locker unit (12). As yet another option, both the unit keypad (110) and the lock (104) on the locker may receive codes, combinations, etc. to operate a given lock (104). As nonlimiting examples, the unit keypad (110) may be an analog or digital alpha/numeric keypad, a combination lock, a facial recognition scanner, a biometric reader such as a fingerprint or retina scanner, an RFID reader, an NFC reader, a magnetic strip reader, barcode/QR code reader, or any other type of reader/scanner generally known in the art. Thus, the controller (14) can send and receive input, data, signals, etc. to and from the unit keypad (110), the individual locks (104), and any other hardware/software associated with the locker unit (12). Likewise, the controller (14) may have two-way communication with a user device (24), the platform (18), or both.

As is also shown in FIG. 2A and FIG. 2B, each individual locker (102) has a locker a locker identifier (106), which may be located on the door (116). The locker identifier (106) can be any number, letter, color, shape, picture, or a combination thereof and can be fixed in a painted, engraved, embossed and/or debossed form or the like, or it can be a digital display capable of being changed remotely to display different identifiers. Additionally, each locker unit (12) may also have a locker unit identifier (107). The locker unit identifier (107) may be any type of identifier and may be used alone or in combination with one or more locker identifiers (106).

Although not shown, a locker unit (12) such as those shown in FIGS. 2A and 2B may have modifications to implement/expand functionality. For example, a locker unit (12) may have one or more "false walls" or partitions (108) to create an enclosed a space for hardware (and associated software), wiring, electrical connections, etc. that enable functionality of the controller (14) and other lock (104) and locker unit (12) components. In a further embodiment, the back wall (115) may emulate the "front wall" so that a locker (102) compartment may be accessed by a second, opposing door (not shown) at the back of the locker unit (12). An opposing back door can have some or all of the components and functionality as a "front" door (116) as described throughout this specification. And, while FIG. 2A and FIG. 2B show the individual locker(s) (102) oriented in one direction, it should be understood that individual locker(s) (102) can be oriented in any direction so that additional individual lockers (102) can be on either of the adjacent unit first walls (112) and/or on the opposing rear wall of the locker unit (12). In such a configuration, additional partitions (108) may be positioned to create desired compartment sizes/shapes and each individual locker (102) that may only be accessible via one door (116).

The locker units (12) shown in FIGS. 2A and 2B may be utilized for many purposes. As one example, two users may use a locker unit (12) to return a forgotten item, like a sweater. A first user may find a second user's sweater at his/her house. Neither can make it to each other's homes to return, but they both shop at the same store that has a locker unit (12). Thus, the first user can go to the locker unit and put the sweater in a suitable locker. The locker unit (12), e.g., via the controller (14), will ensure that the locking mechanism for the locker with the sweater in it is locked and can only be opened by the second user or the first user, if authorized, such as by a unique code, combination, or other unique input. When the second user enters the unique code, combination, and/or other unique input the locking mechanism unlocks, which allows the second user to open the door and retrieve the sweater.

FIGS. 3A, 3B, and 3C show various embodiments of an individual locker (102) including various hardware and/or software components associated therewith. Each locker (102) may show certain variations that are not shown in the others. It is to be understood, however, that components, embodiment features, etc. may vary in presence and/or enablement according to a desired implementation. As was previously indicated, a particular locker (102) compartment may be defined by one or more walls (e.g., 112, 114, 115) and/or one or more partitions (108) the size and shape of a particular locker (102), hence, compartment depends, at least in part, upon the positioning, size, etc. of the walls (112, 114, 115) and/or partitions (108). The locker (102) shown in each of FIGS. 3A, 3B, and 3C, can be visualized as an enlargement of locker #2 in FIGS. 2A and 2B. For example, the locker (102) compartment is defined by two partitions (108) in the vertical position, a shelf/horizontal partition (108), the second wall (114) and the back wall (115). In this embodiment, the door (116) emulates the opening to the locker (102) compartment, having a similar size and shape, and is connected to the locker unit (12) via a hinge (210) as one example of a suitable connector.

Per the embodiment shown in FIG. 3A, the locker (102) houses one or more lights (202) cameras (206), a scale (204) and a receiving member (212). The one or more lights (202) may be attached to, embedded in, or otherwise disposed/positioned on one or more internal compartment surfaces. As is shown in the figure, lights (202) are disposed on/in the two upstanding partitions (108), the second wall (114), and the back wall (115) to provide light within the compartment. The lights (202) can be any size and use any technology generally known in the art regarding lights such as LED, fluorescent, incandescent, halogen, or ultraviolet. The lights (202) can be operated via a motion sensor (not shown), a timer (not shown), a switch (not shown), which may be coupled to or independent of the controller (14) (from FIG. 1). In turn, the controller (14) may be in communication with a remote operating system, such as within platform (18), which may send signals to the controller (14) and/or to individual light controllers (not shown) to cause one or more of the lights (202) to be either on or off. Embodiments are not required to have lights (202). For example, FIG. 3B depicts a locker (102) compartment devoid of lights (202).

A locker (102) may also house one or more cameras (206) within the compartment. As is shown in FIG. 3A, four cameras (206) mounted on/in the same interior surfaces defining the compartment as the lights (202). However, any number of cameras (206) in any configuration may be housed within/by a given locker (102) compartment. The cameras (206) can capture still images, video, thermal images, infrared images, X-ray images, LiDAR images, and/or augmented reality images. The camera (206) can store the images and/or video locally such as via the controller (14). The camera (206) can also transmit images/video to the platform (18) either directly (e.g., via a device controller) and/or via the controller (14), where it may be received by the server (20) and stored in the database (22) all shown in FIG. 1. The camera (206) may operate in a number of ways, nonlimiting examples of which include continuous image capture, motion triggered capture, timed image capture, or manual image capture from a remote location. Camera (206) operation may also be triggered by detecting the opening and/or closing of the door (116) to the locker (102). This action may also trigger other electronics (e.g., lights, sensors [216], [218], etc.) housed within the particular locker to activate/deactivate. The opening/closing of the door (116) may both allow for energy savings, but also enable capture of information and images at relevant times. For example, illumination of the compartment and image capture (e.g., of an item placed within the compartment) may be important in an embodiment where the item is confirmed after the door (116) is shut and the locking mechanism is in the closed/locked position. As with other electronics, the controller (14) via its own software and/or engagement with the platform (18), may control the operation of one or multiple cameras (206).

Still referring to FIG. 3A, one or more scale(s) (204) may be disposed within/housed by a locker (102) compartment. In an embodiment, the scale (204) is disposed in/sits on the shelf/horizontal partition (108) surface so that an item may be placed thereon. The scale (204) can be digital or analog, can have its own controller, and/or be in communication with controller (14). In an embodiment, each scale (204) within a locker unit (12) communicates with the platform (18) directly and/or via the controller (14) such as via the network (16) all shown in FIG. 1. The scale (204) can be utilized to detect weight placed upon it, and in certain embodiments, can compare a predicted weight of a desired item to an actual weight of the actual item to aid in the determination of whether the actual item on the scale (204) matches the desired item. As such, scale (204) data alone or in combination with camera (206) data may be used by the controller (14) and/or the platform (18) to assess various parameters, which may help deter fraudulent activities such as item substitution, replacement, or the like.

FIG. 3B shows other/additional components that may be disposed within one or more interior surfaces of a locker (102) compartment/housed by the compartment. For example, this figure shows a first sensor (216) and a second sensor (218) positioned within the locker (102) compartment. The first sensor (216) and second sensor (218) are generally considered to be different sensors (216, 218). One or more of a sensor type (216 and/or 218) may be present/used depending upon the locker (102) use/implementation. Sensor (216, 218) type may include motion sensors such as a level, a gyroscope, a tilt sensor, or any other movement sensor generally known in the art capable of detecting when an object has been placed or moved within the locker (102) compartment, if the locker unit (12) has been moved, or both. Sensors (216, 218) may also be smoke detectors, carbon monoxide sensors, or other chemical sensors such as those used to detect illegal drugs, explosives, or other hazardous substances; temperature sensors; humidity sensors; infrared sensors; or any other sensor generally known in the art and/or needed for a desired implementation of a locker unit (12).

Each sensor (216, 218) may have its own circuitry that is in communication with the controller (14), the platform (18), or both. As with lights (202), cameras (206), the scale (204), and other locker (102)/locker unit (12) components/parts (e.g., locks [104], unit keypad [110]), communications (e.g., data signals, control signals, etc.) between various parts may be wired and/or wireless, may take place via one or more networks including network (16), and may utilize hardware, software, firmware as needed to enable the desired functionality. For example, data collected by a motion sensor (216 and/or 218) can be used to detect potential item tampering or within the locker (102) compartment and/or locker unit (12). If the data is indicative of tampering or theft, the system (10) may cause one or more doors (116) to be shut and locking mechanisms to lock, set off an alarm, cause one or more cameras (206) to record images, cause one or more lights (202) to turn on or turn off, and/or alert authorities as a few examples.

The top portion of FIG. 3C details some of the same components/features of an individual locker (102) compartment as was shown in FIGS. 3A and 3B including lights (202), cameras (206), a scale (204), and one type of sensor (218). This figure, however, also depicts additional features of the lock (104) such as fasteners/receiving members (e.g., 222, 228/212, 220) that can be engaged/disengaged by a locking mechanism as a result of correct entry of a code, combination, scan, recognition, etc. and/or as the result of a control signal such as one from the controller (14) from FIG. 1. Although the locking mechanism shown in the figure is generally mechanical in nature, it should be understood that any suitable lock, including its locking mechanism and fasteners, connectors, and/or other members may be utilized whether it is mechanical, electrical, magnetic, etc. or combinations thereof. Still referring to the upper portion of FIG. 3C, a first receiving member (212) and a second receiving member (220) are shown disposed on the interior of the locker (102) compartment and positioned on an upstanding partition (108) to receive first fastening member (222) and second fastening member (228), respectively. As depicted, the first receiving member (212) may be referred to as a catch and the second receiving member (220) may be referred to as a dust box. Here, the catch (212) and dust box (220) are located on one upstanding partition (108), but they could alternatively be mounted on one or more of the other upstanding partition (108), the shelf partition (108), or the second wall (114) so long as they are able to engage with the corresponding fastening member (i.e., 222, 228).

The bottom portion of FIG. 3C depicts the door (116) when it is shut (to the right), and when it is open (to the left). The door (116) depicts the top edge/side (302), the outer or opening edge/side (306) and the bottom edge/side (304). When the door (116) is shut it is apparent from the figure that the fastening members (222, 228) are aligned with the corresponding receiving members (212, 220), respectively. Further, the opening to the individual locker (102) compartment is blocked by the door (116). Thus, when the first lock (104a) and/or the second lock (104b) are/is locked/engaged, access to the locker (102) compartment is prohibited. After correct entry of a code, combination, scan, feature recognition, key, etc. via the outward facing portion of the lock (104a, 104b) on the outer surface of the door (224) the locking mechanism can cause the corresponding fastening member (222, 228) to release/disengage from the corresponding receiving member (212, 220), which allows the door (116) to be opened. When the door (116) is opened along arc (230), the interior surface (226) of the door may be visible. In this illustration, the position of each fastening member (222, 228) can be observed, and engagement of the first fastening member (222) e.g., a latch, with the first receiving member (212), e.g., catch and engagement of the second fastening member (228), e.g., bolt with the second receiving member (220), e.g., dust box can occur. While FIG. 3C shows a first lock (104a) and a second lock (104b), which in this illustration utilize different input mechanisms (e.g., biometric and key) locking and/or fastening mechanisms (e.g., latch, catch and bolt, box) each individual locker (102) needs to only have one lock (104) but could optionally have both (104a and 104b). And while FIG. 3C shows the hinge (210) on the left side of the individual locker (102), allowing the door (116) to open along arc (230), the hinge (210) could be located elsewhere to enable opening of the door (116).

Figure 4A:
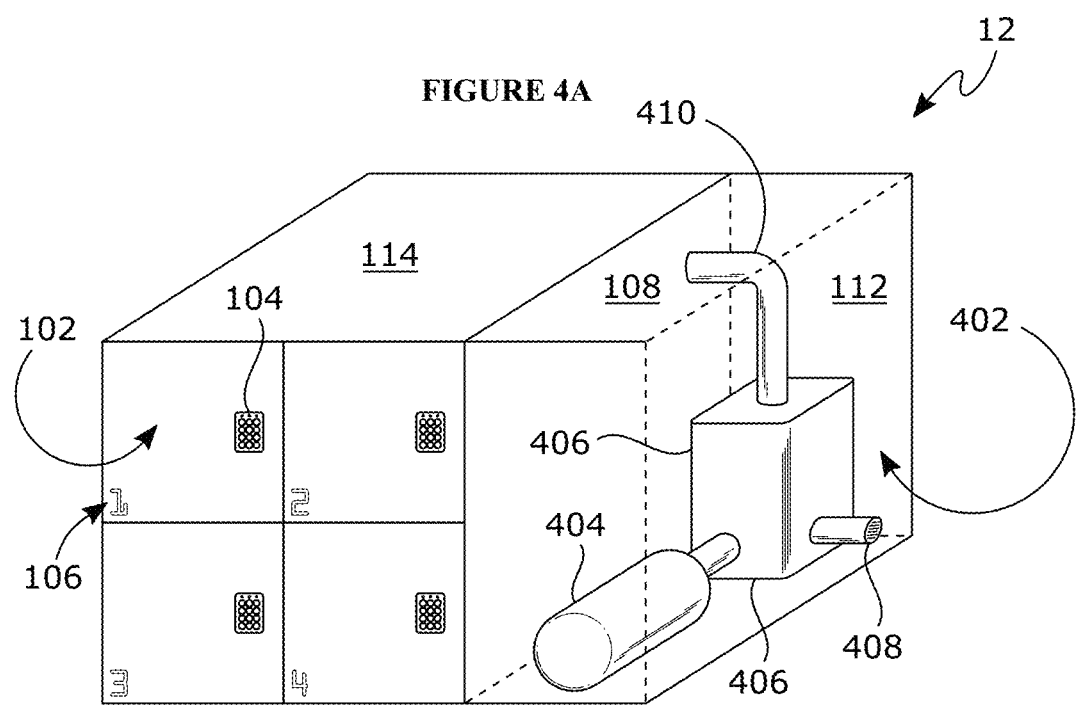
FIG. 4A details an exemplary heating and cooling system for a locker unit.

FIG. 4A depicts another embodiment of a locker unit (12). In this embodiment, the individual locker (102) and/or locker unit (12) as a whole can provide climate control such as temperature, humidity, or both. As with other embodiments, the individual locker (102) can include a lock (104) and locker identifier (106). Here, a mechanical space (402) has been added to the locker unit (12). In FIG. 4A, the mechanical space (402) is depicted to the right of the individual lockers (102), but the mechanical space (402) can alternatively/additionally be on any side of the locker unit (12) including the top, bottom, and/or back. A mechanical space (402) can be created in several ways as would be understood by a skilled practitioner. As depicted in FIG. 4A, an internal vertical wall is created by a partition (108) to create/define the mechanical space (402) between it and the and one or more of the walls (112, 114). In essence, the mechanical space (402) shown in the figure is tantamount to a large locker (1021) from FIG. 2B and may even be accessed via a locker-type door. The mechanical space (402) may house any mechanical and/or electrical equipment, hardware, or the like. In this embodiment, the mechanical space (402) contains one or more components to control environmental/atmospheric conditions of individual lockers (102) such as temperature, humidity, pressure, and the like. Such components include, without limitation, a compressor (404) for cooling, a heating element (406) with vent (408) for heating and duct work (410) to transfer the hot and/or cold air to the individual locker (102). The compressor (404) may also drive heated or cooled fluids through heat exchange units, which can passively heat or cool the unit. While the mechanical space (402) in FIG. 4A shows elements for both heating and cooling, it should be understood that the mechanical space (402) may only include either compressor (404) or heating element (406) or any other mechanical features/components generally known in the art to control the climate/atmosphere in the individual locker (102), and is then combined with the appropriate element (e.g., sensor, detector) within the locker (102) compartment so as to regulate a desired condition within the locker compartment.

Figure 4B:
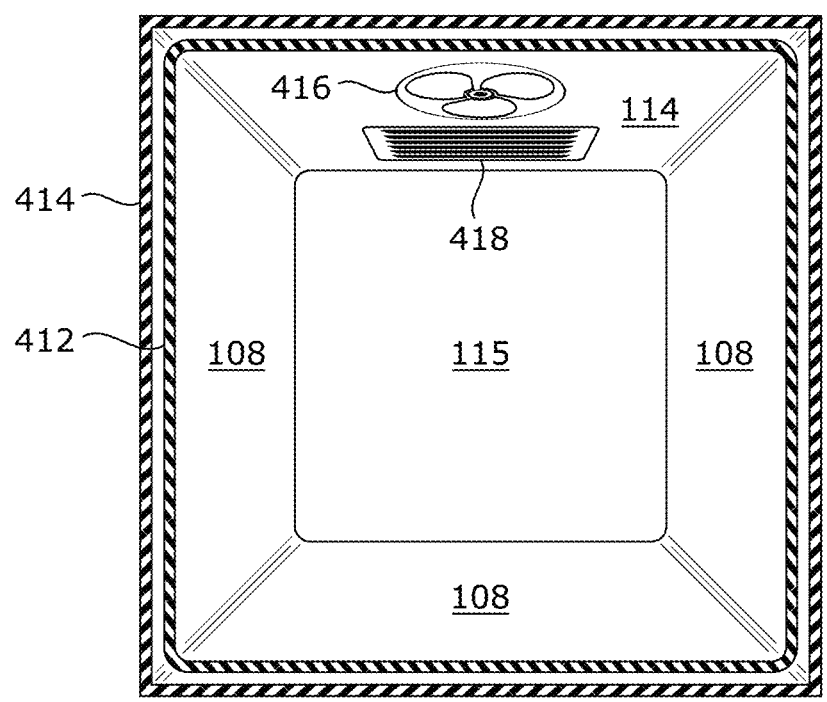
FIG. 4B details an exemplary internal locker compartment that comprises heating or cooling elements and provides insulated and insulating materials to stabilize atmospheric conditions within the locker interior.

FIG. 4B shows a locker (102) interior optimized for climate control. In this embodiment, interior surfaces of partitions (108) and/or walls (114, 115) or a space between the two surfaces may be lined with insulation (412). Furthermore, a face created by the compartment interior and the door (116) (FIG. 2B) is surrounded by a gasket (414) to ensure a proper seal. Additionally, the embodiment of FIG. 4B shows a fan (416) and an interior vent (418) for proper exchange of the climate/atmospheric control elements of FIG. 4A such as the heated and cooled air from duct work (410). While only a single fan (416) and interior vent (418) are shown in FIG. 4B, there can be any number of fans (416) and interior vents (418) in any configuration. And while these elements are mounted on/in one wall (114) in FIG. 4B, they can be mounted on any of the interior defined by the partitions (108) and/or walls (114, 115). In a particular embodiment, such as for day use or multiple uses, an individual locker (102) may have a temperature/climate-controlled section separate from a nontemperature/climate-controlled section for storing temperature sensitive items (e.g., food) and nontemperature sensitive items (e.g., clothing, keys, etc.) as part of the same rental. Also, although not shown in FIG. 4B, the climate-controlled locker (102) can also include one or more of the interior locker components found in other embodiments such as, without limitation, a scale (204), one or more interior cameras (206), one or more lights (202), etc. from FIG. 3A.

FIG. 5 shows another embodiment of a locker unit (12) with individual lockers (102), locks (104) and locker identifiers (106). This locker unit (12) may be constructed/configured in the same/similar manner as any of the other locker unit (12) embodiments (e.g., FIGS. 2A, 2B, 4A) or combinations thereof. Further, walls (e.g., 112, 114) and/or partitions (108) from FIG. 2A may define any number of compartments/interiors of individual lockers (102). Individual lockers (102) may also include any combination of components described herein as being housed, disposed/positioned on, in, or associated with an individual locker (102), including a locker door (116). The embodiment of FIG. 5 specifically illustrates a solar panel (502) on the second (e.g., top) wall (114). The solar panel (502) captures and stores electricity in the battery (512) and/or battery (520) to power various electricity-needing components associated with the locker unit (12).

The embodiment shown in FIG. 5 depicts the controller (14) or portions thereof as separate devices/components. Alternatively, some or all of the below-described devices/components (and other devices described herein) may be discrete devices having their own controller/chipset/computer (not shown), where each discrete device may or may not be in communication with the controller (14). In this way, various devices/components associated with individual lockers (102) and/or locker units (12) can transmit, receive, process, etc. information/data, signals, etc. as described herein and/or as would be understood by one skilled in the art. Such devices/components include but are not limited to an exterior camera (504), a display (506), an alpha numeric keyboard (508), a wireless/data connector (510), the batteries (512, 520), a processor (516), a reader, sensor, and/or scanner (522), an alarm (524), a speaker (526), a microphone (528), a power cord (514), and an external power source (518).

As is shown in FIG. 5, the controller (14) and/or other devices/components are integrated into locker unit (12). Integration into a locker unit (12) can take place in a number of ways and configurations and can be internal (e.g., such as in a mechanical space from FIG. 4A), external (as shown in FIG. 5) or a combinations thereof. Additionally, one or more of the devices and/or controller (14) may standalone (e.g., not integrated into locker unit [12]) or be integrated into a kiosk or the like that is in operative communication (e.g., wired, wireless, etc.) with one or more locker units (12). In other embodiments, one or more individual lockers (102) may include one or more hardware/software components associated with the controller (14) and/or other device/component either as a replacement or duplicative thereof. While FIG. 5 shows a plurality of devices/components one or more may be omitted in a given locker unit (12)/system (10) implementation.

Generally, the exterior camera (504) can capture still images, video, thermal images, infrared images, and/or other imaging data which may be stored locally, transmitted to the platform (18), or both. In an embodiment, the exterior camera (504) can be used as a facial recognition camera to verify the identity of a user of the locker unit (12) and/or it can be used to video conference with customer service representative, administrator, technician, or another locker unit (12) user. Additionally, exterior camera (504) can be used as a video security surveillance camera. The display (506) can be a video display, computer monitor, touch screen or the like. The display (506) can be used to display the contents of any individual locker (102) via the exterior camera (504), or it can display prompts and security checks to guide the user through accessing the individual locker (102), or any other display function/service as would be understood by one skilled in the art. Additionally, the display (506) can act as a video conferencing device allowing the user to see and communicate with a customer service representative or administrator, or other person who is not located nearby. The alpha numeric keyboard (508) allows the user to input data as is known in the art. Inputted information can be processed locally by the controller (14) and/or processor (516), transmitted to the platform (18) for processing, or both. Further, the alpha numeric keyboard (508) can be, or include, an analog or digital alpha/numeric keypad, a combination lock, and one or more readers/scanners/sensors such as for biometrics, codes, radio waves/frequencies, magnetic strips, or any other type of reader/scanner/sensor that is generally known in the art. The alpha numeric keyboard (508) can be utilized to input information into the locker unit (12) such as to provide a code to unlock a particular locker (102) or otherwise provide some input into the locker unit (12) and/or system (10). In an embodiment, one or more reader/scanner/sensors (522) may be provided separate from the alpha numeric keyboard (508). The one or more reader/scanners/sensors (522) may be of any type or combination of types such as, without limitation, for biometrics, codes (e.g., two dimensional, three dimensional, magnetic, radio wave/frequency, etc.), environmental conditions (e.g., motion, temperature, infrared, laser, etc.) or any other reader/scanner/sensor. The wireless network/data connection (510) can be wired or wireless to enable communications via the one or more networks (16), as is known in the art and/or as described herein. The microphone (528) can be positioned to receive sounds and to allow a user to communicate with the locker unit (12) or other system (10) component. Additionally, the speaker (526) can be used for two-way communications such as by transmitting verbal instructions from an administrator, attendant, sales representative, service representative, second user, or the like to the user at locker unit (12). Moreover, the speaker (526) can act as an audible alarm in connection with security such as to provide an alert that the locker unit (12) is being vandalized, tampered with, malfunctioning, etc. Alternatively, a sound may be emitted to let the user know that an individual locker (102) has opened, has shut, needs attention, or the like. In addition to or instead of an audible alarm, the locker unit (12) may include a light/strobing light (not shown), lighted/strobing display, or other such visual alert to draw attention to the locker unit (12). The locker unit (12) can optionally have one or more battery(ies) (512, 520), which may be internal (520) and/or external (512) to the locker unit (12). The battery(ies) (512, 520) can store electricity from an external power source (518), the solar panels (502) or both. In an embodiment, the battery(ies) (512, 520) may function as a backup in the event of an electrical outage or if the locker unit (12) is in a remote location. In these instances, the battery(ies) (512, 520) may be part of or replaced by a generator.

FIG. 6 is a nonlimiting sequence (4000) diagram depicting how an embodiment of the secure locker system (10) (and accompanying methods) may be used to transfer an item, object, or the like, from one user to another. Since FIG. 6 depicts one example, it should be understood that other embodiments may have sequences that take place in a different order, utilize sequences having more or fewer steps than the example sequence, utilizes steps that originate/terminate at a device other than what is shown in FIG. 6, or combinations thereof. For example, FIG. 6 shows a sequence (4000) taking place between the locker (102), platform (18), and one or more user devices (24). It should be understood that events depicted/described as taking place at the locker (102) may be controlled by one or more of device-specific microcontrollers or the like, the controller (14), another processor (516) associated with a locker unit (12), the platform (e.g., server [20] and/or database [22]), or combinations thereof. For example, one or more control signals may be sent and received by the appropriate devices to enable a particular function/event to occur. Likewise, one or more data signals may be sent and received by the appropriate devices to enable relevant data to be transmitted, copied, used in calculations, used in comparisons, cause certain results to occur based on calculations/comparisons, etc. stored, retrieved and the like. Thus, just because a particular event, occurrence, etc. is described as originating, terminating, etc. at particular device does not mean that it cannot occur at a different device or in combination with one or more different devices. Moreover, it should be noted that relevant interfaces such as drivers and other software/firmware may enable one- or two-way communications between the various electronic devices detailed herein. Further, these communications may take place via the one or more networks (16) including personal networks and control networks and all data generated, contained, acquired, etc. via use of the system (10) may be time stamped and/or stored locally at a locker unit (12) and/or in the database (22) or other data store according to a database management system/design as is known in the art.

Using a nonlimiting example of transferring a forgotten sports equipment from one household to another and where schedules do not allow in-person pickup, the sequence (4000) may begin when the first user requests (4002) a locker (102) via the first user's device (24). In this example, the first user device may be referred to as the custodian device (24) as the user associated with the device (24) is in possession of the item at the beginning of the sequence (4000) and the second user device (24) may be referred to as the recipient device (24) as the user associated with this device receives the item at the end of the sequence (4000). In an embodiment, the locker request (4002) may be placed, for example, via an interactive Web site, software application, third-party software integration, or combinations thereof. The platform (18) receives the locker request (4002) and in response thereto, identifies, assigns, or both (4004) one or more lockers in which the sports equipment may be placed. If the first user has a choice in locker assignment, the platform (18) may send locker choices to the first user/custodian device (24). And the first user can select a particular locker (102) from the provided choices via the first user/custodian device (24). In an embodiment, the platform (18) may send identifying information about available lockers (102) including locker unit identifier (107), locker identifier (106), an address, etc. to assist in locker (102) selection. Alternatively, a particular locker (102) can be assigned by the platform (18) without providing the user a choice. After locker assignment/selection (4004), the platform (18) may generate/select, receive, activate, and send/confirm a first code (4006) to the first user/custodian device (24), to the assigned locker (4006), or both. In an embodiment, the first code may be transmitted (4006) with the locker assignment (4004). Either way, a particular locker (102) is selected by/assigned to (4004) the first user. And although in this example the first user requests the locker (4002) and brings the sports equipment to the assigned locker (4004), it is equally possible for the second user to request the locker (4002) on behalf of the first user. As such, the sequence (4000) shown in FIG. 6 could be modified to accommodate this variation, and/or other variations as would be understood by a skilled artisan.

Knowing the location of the locker unit (12), and the assigned locker (4004), the first user may go to the locker unit location (if not already there) and enter the first code (4008) to unlock the assigned locker if the locking mechanism is in a locked/engaged state. As used herein, entry of a code includes various types of data input or recognition such as alphanumeric entry on a lock (104) keypad or keyboard; graphics recognition/detection (e.g., barcode, quick response [QR] code, etc.) by a camera, scanner, reader, etc.; radio wave/frequency detection/recognition (e.g., Bluetooth, RFID, NFC, etc.) by a reader, receiver, transmitter, or the like associated with the relevant lock (104) and/or locking mechanism. If the first code is correctly entered and active, the locking mechanism, including fasteners associated with the door (116) disengage/unlock so that the door (116) to the assigned locker (4004) can be opened (4010). In other words, in embodiments individual lockers (102) should be locked unless opened by a user having the appropriate code, or by authorized personnel for maintenance, servicing, or the like. Moreover, an assigned locker (4004) may be opened only by an active code. Codes may become active when generated, selected, programmed to/received by the assigned locker and the like. Thus, the window in which a particular code is active to open a particular locker (102) may be time and/or use dependent. For example, the first code may be inactivated after a predetermined time has expired, after the first code has been used, or both. Furthermore, an active code may be temporarily disabled and reinstated after an event has occurred such as time lapse or use of an intervening code. An intervening code may be used by an authorized person for maintenance, cleaning, etc. Since in this example, the first user is the only user to which the first code has been sent (4006), the first user is the only person that can open the assigned locker (102) using the first code. If an authorized person needs to open the assigned locker (4004) before use by the first user, the authorized person may be assigned a special code to open lockers. The special code would be unique to the authorized person and as such special code use can be tracked. In this way, if there are allegations of item theft, damage, or the like the platform (18) can consult special code records (e.g., stored in the database [22]) to determine who may have had access to a particular locker at the time the alleged theft, damage occurred. To ensure that the first user cannot open the assigned locker (4004) other than to place an item into the locker, the first code may be temporarily deactivated and/or reassigned. A subsequent first code may also be generated, activated, and sent to the first user if the first user lost/forgot the first code, or the first code does not work for some reason.

When the first user enters the first code (4008), the first code may be verified by the platform (18), such as by comparing the entered first code to stored data relating to the issued first code. If the comparison determines that the data are equal or match, a control signal can be sent to/from the controller (14) to cause the locking mechanism to unlock, which in turn allows the door (116) to open. If data relating to the first code and the entered code are not equal, then the controller (14) may receive and/or send a control signal that causes the locking mechanism to remain in an engaged/locked state so that the door (116) to the assigned locker (102) remains closed. In an embodiment, the lack of a positive control signal to disengage/unlock the locking mechanism for a particular locker may also cause the locking mechanism to remain in an engaged/locked state.

If the locking mechanism associated with the locker door (116) unlocks and the door (116) opens, the sports equipment may be placed within the compartment/cavity of the assigned locker (102). Placement of the sports equipment (e.g., item) within the assigned locker (102) cavity/compartment may be detected (4012) via one or more sensors or other detection/monitoring devices. For instance, one or more cameras (206) or other imaging hardware/software may be used to create an optical/visual and/or audio/sound image of the sports equipment, which may be analyzed to determine that the appropriate item has been placed within the locker (102) compartment. Additionally or alternatively, other sensor/detector information such as motion, tilt, temperature, light, weight, and mass information or combinations thereof and without limitation may be captured, transmitted, and/or processed to detect (4012) the presence of the sports equipment, obtain information about the sports equipment, or both. The data captured/obtained from one or more cameras, sensors, detectors, etc. (4012) may be transmitted to the platform (18) where it may be analyzed, evaluated, used in calculations, etc. to produce one or more results such as a determination that the appropriate item has been placed in the locker and/or a form that may be understood by a human (e.g., image) or a form that can be interpreted/converted for human consumption. In embodiments, the detection information (4012, 4016) may be fully or partially processed elsewhere (e.g., assigned locker device controller and/or controller together with software/firmware and various interfaces) before being transmitted to the platform (18), first user device (24), second user device (24), or combinations thereof. Ultimately, at least the second user device (24) may receive detection information (4016) such as an image that can be presented to the second user.

Using received detection information (4016), one or both users may confirm (4018) or deny (4032) the sports equipment. For instance, using detection information (4016), the second user can confirm (4018) or deny (4032) that the sports equipment in the assigned locker (102) is the correct sports equipment. If detection information (4016) is transmitted to and received by the first user and the second user, they can both be sure that they are looking at the same sports equipment. If the sports equipment is not the correct sports equipment (e.g., denied/disagreed at [4032], the first user may put a different sports equipment into the locker and new detection information may be obtained/captured by one or more sensors, cameras, etc. (4012) and forwarded (4016) for item confirmation (4018) or denial (4032). In an embodiment, the confirmation/denial of the item may continue until the second user confirms (4018) or until the parties exit the system (10).

Step (4020) of the sequence (4000) shows the assigned locker (102) being locked after/concurrent with confirmation (4018), such as via an instruction from the platform (18), although embodiments are not limited thereto. The order in which the assigned locker (102) is instructed to lock, however, may change depending upon the particular embodiment. For example, when transferring an item (e.g., the sports equipment) between two households or other trusted parties, it may be preferred to have the locking mechanism for the assigned locker lock/engage after the correct item has been confirmed as is shown in the sequence (4000). In another embodiment, such as when transferring ownership in an item (e.g., item was sold or returned), it may be preferred to cause the locking mechanism to lock the assigned locker door (116) keeping it shut immediately after the item is detected within the compartment of the assigned locker, the locker door (116) is detected as being shut (e.g., via a pressure sensor or the like), or both and before captured detection information (e.g., video, sensor, detector, etc. data) is transmitted to one or more users (24). Nevertheless, at some point the assigned locker is locked so that the first user cannot open the assigned locker using the first code.

In the event that the sports equipment is the correct sports equipment (4018), and the assigned locker (102) is locked (4020), a second code can be generated, selected, activated, etc. and transmitted (4022) to the second user, the assigned locker (102), or both. Since the code to open the assigned locker has changed, the first code may be inactivated and will be of no use while the second code (4022) is active, although embodiments are not necessarily limited thereto. There may be situations where it is desirable to have both a first code and a second code or more simultaneously active.

When the second user goes to retrieve the sports equipment from the assigned locker, the second user enters the second code (4024), which if correct, will cause the locking mechanism for the assigned locker to disengage/unlock so that the locker door (116) can be opened, much like when the first user entered the first code. The platform (18) may send a control signal/instruction to the controller (14) to disengage/open the locking mechanism if it compares the entered second code to the assigned second code and finds a match. As with the first user, the system (10) may require additional verifications that take place before the assigned locker (102) is unlocked/opened for the second user. If security measures are all passed, the second user can remove the sports equipment from the assigned locker, and data may be captured and collected (4028) (e.g., from sensors, detectors, cameras, and the like) to confirm that the sports equipment has been removed. The data collected to detect item removal (4028) may be the same type as, at least in part, as the data collected to detect that the item is contained within the assigned locker (102). As one nonlimiting example, detecting that the item has been removed may be confirmed by weight/mass information from the scale (204) alone, or in combination with other available captured information. The empty locker (102) can be securely locked (4030) and reused, serviced, cleaned, or combinations thereof.

Still referring to FIG. 6, but below the dotted line, the second user may disagree (4032) that the sports equipment is the correct sports equipment before/after the first user leaves the premises where the locker unit (12) is located. The first user may be notified (e.g., text, e-mail, phone call, controller message, etc.), such as by the platform (18), and requested to retrieve the sports equipment and replace it with the correct sports equipment or discontinue the rental. Either way, the platform (18) may generate, activate, store, and send a third code (4034) to the first user, the assigned locker (102), or both. The activation of the third code may trigger deactivation of the first and/or second code if not already deactivated. In this way, the second user can be prevented from retrieving the sports equipment. Alternatively, one or more of the first, second, and third codes may be simultaneously active, enabling any user that holds an active code to access the assigned locker. As yet another alternative, the first code and the third code may be the same code, wherein the first code may be reactivated, which may or may not be resent to the first user. The first user can enter the third code (4036), and in response to entry of the correct code and/or other validation, the locker can open (4038), and the sports equipment retrieved in much the same was as has been previously described. The first user may put a different item in the assigned locker or may leave the locker empty. Either way, detection information (4040) may be collected, analyzed, etc. as before to determine if the locker is empty, or if the locker holds a different sports equipment. If empty, the locker locks (4042) and any/all codes are inactivated if not previously done so. If a different sports equipment has replaced the original sports equipment, then the sequence may repeat, such as by sending detection information (4012, 4016) to one or more user devices. Again, when use of the assigned locker (102) ends (4028, 4040), codes can be deactivated and the locker (102) can be locked (4030, 4042).

FIG. 7 illustrates a representative method (5000) for obtaining a locker. Although shown as a sequence of steps, it should be understood that method (5000) steps, as with other methods detailed herein, may occur in the order shown or a different order, may include less than all of the steps in the same or different order, or may include additional or alternative steps not shown in FIG. 7, FIG. 1, or combinations thereof. In an embodiment, method (5000) may be initiated by receiving a request (5002) for a locker from the user device (24), the controller (14), or both. Requests may be generated and/or received via software running on the user device (24), controller (14), the platform (18), a third-party integration (26), or combinations thereof. Nonlimiting examples include software hosted by one or more Web servers (e.g., running on platform [18]) interacting with a Web-based application, a mobile application, a client-based application, or combinations thereof running on the user device (24), controller (14), or both. Software running on the user device (24) and/or controller (14) may also include native programs or any other type of application software including those that interact with other software application such as third-party applications and the like as is needed for a particular embodiment. For ease of explanation, discussion herein is primarily in the context of a Web application such as a browser-based application, which includes progressive Web applications, where a request is made via user device (24) or controller (14) and is received at platform (18) where the request (and all other information) is acquired, input, validated, queried, compared, copied, calculated, reported, stored, archived, etc., and combinations thereof. Generally, method (5000) begins with receiving a request to rent a locker (5002). The request may come from a user device (24) to the platform (18) and/or the controller (14), or from the controller (14) to the platform (18), in the form of a GET request (e.g., HTTP GET request), or from the user directly to the controller (14) via a native application executed by the controller (14) with or without communications to/from the platform (18). Regardless of how the request is made, the request establishes entry into the system (10). Thereafter, relevant information is obtained such as user information, locker need information, item information, and/or any other information relevant to locker usage. The obtained information may be stored such as in database (22). The database (22) and/or other data store contains data about lockers and locker units and uses such data and the information obtained from the user, including item information, to identify one or more lockers/locker units that are available for use and transmits that information to the user such as via the user device (24). The user, via user device (24) and/or the controller (14) can select a locker to use, optionally enter into a locker agreement, and receive data to enable locker usage. Method (5000) details are discussed below.

Referring to steps (5002) and (5004), in response to receiving the request (5002) such as an HTTP GET request or other request, platform (18) may obtain information (5004) regarding the user and/or the user's needs via a user interface displayed on the user device (24) and/or a display associated with the controller (14). Obtained information usually falls into categories such as user data, locker data, and item data.

User Data

User data may include data about the user making the request but can also include data about other users participating in locker usage. In an embodiment, the user making the request for the locker may be a first user that has the item at the beginning of a transaction and may also be referred to as a custodial user/custodian. The second user may participate in locker use but may or may not make the actual request for use. Since the second user in this scenario is receiving the item from the first user the second user may also be referred to as the recipient/recipient user. It should be noted that the roles may be reversed such that the second user is the custodian and the first user is the recipient. Users may also include individuals (e.g., first user, second user), entities, and/or representatives, agents, employees of individuals, entities, or both.

General user data obtained and stored by the system (10) can include, without limitation, name, address, phone number, e-mail address, and payment information and the like. User data may also include a user status for a particular rental such as custodian, recipient, representative/employee of such a user, or other such information. In certain embodiments, user data may also include an image of the user, the user's government identification or other identification/credentials (e.g., professional license or the like), biometric data such as for facial recognition, voice recognition, iris/retina scan, fingerprint scan, and the like. User data may be stored in association with a user account, which may or may not be established at the time the locker request was made. User data may also be obtained as a guest user, which may or may not be stored for longer than a particular transaction. Thus, user data may be stored (e.g., in database [22]) and/or associated with other data in a variety of ways, including by user/user account, by transaction, by locker unit/locker, by item, as just a few examples.

Additional user data obtained and stored by the system (10) may include additional addresses/geographical locations other than a home address such as for work, a gym, a store, the second user's geolocation, or another geolocation. In this way, the user and/or platform (18) may select/use a variety of geographical locations when determining locker availability. As yet another embodiment, a user may specify a distance from a geographical center that the user is willing to travel such as within 5 miles, 10 miles, 20 miles, etc. Further, instead of a set distance, the user may identify a first distance, a second distance, a third distance, etc. so that when determining locker availability the system (10) may return results indicative of being within the first, second, or third distance, or even beyond. User flexibility with respect to travel distance may be important when the system (10) determines locker availability, especially where certain locker amenities are desired/required. For example, not all locker units (12) are created equal and not all installation locations support all amenities. A locker unit (12) having climate control/cooling may require power, and thus, may need to be installed near a power source and/or have a backup generator or one or more batteries. Since these units may be more expensive to maintain, fewer may be available, especially if demand is not high. Thus, a user may have to travel beyond a desired distance if climate control is required. As another example, a locker unit providing enhanced security may be inside a secure/guarded building that is outside of a desired range of travel. Thus, even though a particular locker may not be within a desired geographical distance, the platform (18) may take the necessity of an amenity into consideration when suggesting an available locker rental outside of a preferred distance.

An embodiment calls for the system (10) to conduct a user security search. The user/users may have to agree to such a search before it is performed. As a nonlimiting example, the platform (18) may search internal and/or external resources to determine if any user/users have previously abused the system (10) in or has breached a rental agreement in another way such as lack of payment, trying to transfer a banned item (e.g., live animal), or any other reason why access to a locker should be denied. If the search does not find any reason to prohibit locker user, the rental may proceed. Otherwise, the request for a rental may be denied. Results of such a user security search may also be stored in association with a particular user, transaction, locker, etc.

If, during a request for a locker, information about another party to a transaction is needed, user information about the other parties may also be obtained and stored on the system (10). For example, a second user may already have a user account and data from that account may be linked to a particular transaction. Alternatively, if a party to a transaction does not have an account, the first user may supply the needed user information and/or the system (10) may send a transmission (e.g., e-mail, SMS, MMS, phone call, etc.) to the indicated user/users to obtain information directly, and/or to ensure the other party/parties are aware of an upcoming transaction/transfer, to verify that the transaction should proceed, and/or other such security/verification questions as is needed. As yet another alternative, user data may be obtained from the third party (26), such as one enabling a peer-to-peer purchase or the like.

Locker Data

Locker data can include any data relating to locker rental/usage such as the length of time the locker is needed, if the locker is needed now or in the future, the desired geographic location of the locker, the size (e.g., small, medium, large) of locker needed, amenities needed desired such as climate or other atmospheric controls, security level, etc. The length of time a locker is needed can vary depending upon its intended use. For example, a locker may be rented for a single transaction/transfer and as such be rented by the hour or day and as such would be categorized as a short-term renter. Furthermore, the short-term renter may want to use the locker immediately or reserve a time slot for future use. Lockers/locker units (12) may also be rented on a longer-term basis such as weekly, monthly, yearly, etc. For example, a long-term rental may be for exclusive use of the same locker similar to that of a post office box. Long-term renters, however, may want the flexibility to use different lockers at different locations with a superior claim to locker use and not necessarily exclusivity. An embodiment also conceives of long-term renters with exclusive use agreeing to sublet the locker on occasion. Longer term rentals may be especially useful for e-commerce/online vendors that envision many transactions taking place, some of which may even be at the same time and/or at various locations. Brick and mortar enterprises may also want to have long-term rentals for continuous use and control over one or more lockers or even the entire unit (12). A pharmacy, postal service/center, medical office/building are a few nonlimiting examples of entities that may wish to have a long-standing rental of several lockers/an entire locker unit (12). As such, locker rental data may include the duration of a locker/locker unit rental and any other details tailored to suit an individual's or entity's needs.

Regardless of the length of time a person or entity rents a particular locker/locker unit, each time a locker is used for item transfer the process may be similar to a single use transaction. Thus, the following discussion is generally in the context of a single use scenario, but it would be understood by a skilled artisan that variations are envisioned to accommodate individual needs. For example, established long term renters may skip step (5004) and/or step (5006) for a particular transaction unless a new term/condition is requested, including a new/different locker than one that is already assigned to the long-term renter. Furthermore, there may be special agreements for subleases that may be agreed to by both the original renter and the sublessor.

Item Data

The system (10) may also obtain identifying information about the item/items to be transferred or put in a locker from the user via the user device (24), controller (14), or both. Item data may include a general description of the item including type, size, shape, weight, value, etc., which may be sufficient in some instances. In other instances, additional item data may be required/requested such one or more images (including video), serial numbers, distinguishing characteristics (e.g., description, images), etc., especially if the item is expensive, an original work of art, of high sentimental value, will be contained in a package, or for any other reason. In fact, if packaged, an embodiment may require certification from one or more users regarding the identity of the item in the package, that it is not a banned or illegal item, and/or other such certifications in addition to identifying item data. For example, with a medical sample or pharmaceutical, identifying information may include the type of sample/drug, a doctor's order number or prescription number, the type of packaging, volume or number of pills, and any other pertinent information. In an embodiment, rental or item insurance may be optionally offered as item data, locker data, user data or combinations thereof.

In an embodiment, long-term renters may be able to provide general information about items that will be transferred. For example, a maker of handcrafted goods has a long-term rental for distribution of the same sort of items within a given price range. The maker may not need to specifically identify each item for each transaction/transfer, especially if not concealed. Other long-term renters may have to provide specific information for each transfer/transaction such as with a medical sample, pharmaceutical or if the types of items are inconsistent in some way as a few examples.

Locker Inventory Data

The system (10) may also store locker inventory data on one or more databases (22). Inventory data may include the number of locker units (12) in inventory and details about each locker unit (12) including locker unit identifier (107), the size and locker identifier (106) for each locker in the locker unit (12), a total number of lockers in the locker unit (12), individual locker/locker unit amenities (e.g., climate control, adjustable size, security levels and/or security devices, other or additional hardware, etc.), physical location (e.g., address, GPS coordinates, etc.), relative location (e.g., inside a building, outside a building), times accessible to users, individual locker status (e.g., rented, available, reserved, in need of repair, long-term rental, short term rental, sublet available, etc.) locking mechanism status (e.g., locked/engaged, unlocked/disengaged), lock input type/s (e.g., code, combination, key, biometric reader, scanned code, etc.), any additional data that may be needed for locker rental/use, or combinations thereof.

Determining Locker Availability

At step (5006), the system (10) compares data about the user, data about the user's rental needs, and/or item data to locker inventory data to identify one or more lockers/locker units that fit the rental requirements. The system (10) may transmit such results to the user via the user device (24) and/or controller (14). Further, the system (10) may rely on identifying information (e.g., for user, locker, item) to suggest a particular locker even if it is outside of the requested parameters. For example, the system may suggest a locker having a different size and/or having different amenities than requested such as including climate control, having enhanced security, insurance, having 24-hour availability, being location inside a building, or the like, where such suggestion may be triggered by a word/s (e.g., heirloom, one-of-a-kind) input by the user, the user's past rental history, as a few examples. Alternatively, the system (10) may transmit a list of available lockers in a preferred geolocation having a suitable size/s where available amenities and/or prices are listed in association with the individual locker. In this way, the user can decide which amenities are desired based on available options. It should be understood that there are a variety of different formats, information, and ways in which the system (10) can relay the availability of one or more lockers for rent to the user/group of users. Information generally sent to the user device (24) may include, without limitation, the address for the matching locker/locker unit and/or a map with the matching lockers/locker units indicated thereon (either or both with the distance from the geographical center, if any), a best choice (if any) the available locker and/or locker unit numbers, pricing, whether any of the matches also includes an unrequested but available amenity, times of availability (e.g., especially if the locker has been reserved for a future transaction/transfer made by a different first user), and/or any other information that may be useful to the requesting user.

If a long-term renter has an onsite locker unit (12) or a previously assigned, dedicated locker, the platform (18) may skip this step (5006) or one or more plural steps (e.g., [5006]-[5012] altogether). Alternatively, the platform (18) may inquire as to whether the user wants to use a locker from an onsite locker unit (12)/dedicated locker, or if the first user wants to rent a different locker. As yet another alternative, if the long-term renter has a bank of lockers, the platform (18) may suggest (e.g., at step [5008]) a particular locker and/or send a list of lockers in the bank that may be used at that time. Thereafter, the platform (18) may receive locker selection (5010) for the particular transaction/transfer. In another instance, the established, long-term renter may be requesting a locker that is not already in its locker bank for single use or to add to its bank. In that case, the process (5000) may proceed to determine locker availability (e.g., steps [5006, 5008, 5010] . . . ) as if it were a new request for locker rental as has been described. Further, in the embodiments where the established, long-term renter does not have a dedicated locker assigned thereto, at this point, the method (5000) may proceed to determine locker availability (e.g., steps [5006, 5008, 5010] . . . ). In this case, however, the renter may have preferential status over a short-term rental, the platform (18) may allocate certain lockers for such rentals, or both. In some instances, the platform (18) may learn (e.g., via artificial intelligence, pattern recognition, and/or other predictive applications) renter behavior and hold a locker for that renter for a predetermined time.

Locker Selected

In response to receiving a locker/locker unit (12) selection (5010) from the first user, the platform (18) may optionally generate a rental agreement, with or without an insurance option, to send to the user device (24) for the first user to sign (5012). In an embodiment, payment information has already been obtained/is obtained in response to generating the rental agreement. In a further embodiment, the platform (18), may place a temporary hold (e.g., minutes, hours, day, etc.) on one or more of the matching, available lockers/locker units (12) either before the first user selects a locker or after the first user selects a locker and before the first user enters into the rental agreement (5012), or both.

In embodiments where an established, long-term renter is inputting information for a particular transaction/transfer, the selection step (5010) may be omitted, as was suggested above, especially if that renter has a single, dedicated locker.

Match not Found

If the platform (18) does not find an exact locker match, the platform (18) may search the inventory database to determine if a sublet from a long-term rental is available, search the inventory database to determine one or more next-best alternative/alternatives, search for another solution, or combinations thereof. For example, the platform (18) may query the database to determine if there is an available, matching, and/or near-matching sublet. If so, the platform may send in inquiry/notification to the long-term renter asking or notifying it about the sublet. Thereafter, the platform (18) may proceed by sending locker information (5008) to the requesting first user, which may or may not include information regarding the sublease. As another example, the platform (18) may conduct another query to determine if there are one-off matches or next-best alternatives. A one-off match/next best alternative may meet most of the first user's needs except one or perhaps two. Further, the next best/one off does not have to be a downgrade, it may be an upgrade to a locker having an amenity that was not requested. In this case, the platform (18) may adjust the price to that of an equivalent match, especially if the particular locker has not been rented for a while and is not expected to be rented in the near future. Either way, the platform (18) sends locker information (5008) to the user device (24) and waits for a reply with or without a selection (5010).

If the platform (18) cannot find a matching locker, next-best/one-off alternative, sublet, or the like, or if the first user replies (5010) without a selection (5010), the platform (18) may ask if the first user would like to be put on a wait list/be notified if a locker becomes available such as, for example, in the event of an earlier than expected pick up, cancellation, sublet opening or the like. As yet another alternative, the first user may enter one or more new search parameters to see if there are any available lockers that match the new search parameter(s). If a rental solution cannot be found, the method (5000) may end without receiving a locker selection (5010), etc.

Choose Locker and Rental Agreement

With the advent of choosing a locker/lockers to rent, the first user may enter into a rental agreement (5012) and pay for/provide payment information if not done so already. Rental agreements can specify the locker/locker unit by identifier, installation location/address, agreed upon amenities (e.g., climate control, enhanced security, etc.) length of time, how time is measured, billing, user responsibilities, estimated usage/transaction time, second user verification (if needed), and the like. For example, hourly rental agreements may indicate that a billing/use time starts upon payment/entering into the agreement and ends when the item is removed from the locker, for a daily rental the agreement may indicate what hours are in a day (e.g., hours of operation, 12:00 AM until 11:59 PM), and long term agreements may indicate when a billing/use cycle starts and ends, what maintenance measures need to take place (e.g., cleaning, inspections, etc.), and the like. All rental agreements may indicate what will happen to the item if the item is left in a locker longer than the allotted time such as required removal by the first user and/or by a locker administrator, and any other contractual requirements that are generally found in a rental or other contract. And rental agreements may include information about transaction data and storage such as types collected, what will be automatically provided to one or more users and when, and how long the data will be available for one or more users to retrieve.

An improvement of locker systems and methods described herein over prior lockers is the ability to program each locker for any reason and at any time. For example, access to the interior compartment of a locker (102) may be controlled by the controller (14) via executable instructions at the controller (14), control signals from the platform (18), or both. For a given locker and transaction, each user may have different access requirements such as different codes for each user to use where the codes are only recognized as viable at certain times, under certain conditions, or both. Programming individual lockers may also include activating/deactivating certain devices and/or instructions. Again, the controller (14) may control which devices are active and the parameters for activity at any given time, under given circumstances, or both. The controller may do so based on local executable instructions, input from a user, control signals from the platform (18) or combinations thereof. The controller (14) may be in direct control of one or more locker devices, send control signals to device controller, microchips, circuitry, micro controllers, another processor, or the like, or both. Similarly, the controller (14) may receive data, signals, etc. directly from one or more locker (102)/locker unit (12) devices, receive data, signals, etc. from one or more devices via a device controller, microchip, circuitry, micro controller, another processor, or the like. The controller (14) may have processing capabilities (e.g., processor, memory, data store, etc.) for local processing of data, may transmit data in an unprocessed, semi processed, and/or fully processed form to the platform (18), or combinations of the foregoing.

As a general start point for locker programming, we begin with a locker reset. A locker reset may occur at any time but usually takes place between uses/transactions. A locker reset may be initiated in response to receiving and analyzing data that is indicative of the end of a given transaction/use and/or the beginning of another transaction/use. Data indicative of the end of a given transaction may include a timeout after detecting that an item has been removed (e.g., clock/timer data, sensor data, camera data, etc.), a timeout after the correct entry of second or subsequent access data (e.g., clock/timer data, access data match determination), data from a pressure sensor or the like indicating that a locker door (116) has been closed, data from a lock (104) indicative of the mechanism being engaged/disengaged, data from one or more databases (22) regarding the state of the lock (e.g., locked/unlocked), door (e.g., open/closed), item (e.g., present/absent), locker rental times, or combinations thereof. Data indicative of the beginning of another transaction/use may include rental information stored in the database (e.g., date, time, location, etc. of locker rental, locker unit identification, locker identification, etc.) and/or sensor, camera, or other data captured at the locker unit (12) and/or locker (102).

A locker reset may include cleaning, maintenance, etc. between transactions/uses, although this is not required. Further, a locker reset may be either a hard reset or a soft reset. A hard reset generally prepares the locker between disparate or unrelated transactions/transfers, although hard resets are not limited thereto. Unrelated transactions/transfers usually do not have carry over from a prior transaction/use of a given locker, although this is not a requirement for a hard reset. Thus, when the controller (14) and/or platform (18) receive data indicative of the end of a given use/transaction, a control signal may be sent to cause some or all of the data collected as a result of the transaction to be stored to enable later retrieval, a control signal to reset buffers, counters, timers, scales, cameras, etc. to prescribed state in preparation for the locker's next use. A hard reset may also include adjusting parameters for amenities and the like to a "resting" or "intermittent" state in between transactions or to a state prescribed for the next transaction/transfer. For example, in a resting state temperature controls, security measures, data collection, etc. may be increased or decreased as compared to the prescribed state for the prior transaction/transfer. Likewise, in a prescribed state, controls, measures, and the like are adjusted to conform with the rental agreement/intended use. Generally, hard resets can occur automatically, after an item has been removed from a locker or a given time after an item has been removed from a locker such as minutes or hour/s. Hard resets, however, may occur for other reasons such as after maintenance/cleaning, for security purposes, etc.

A soft reset may occur between uses/transactions that may be related in some way such as by user, account, or other parameter, such that the locker does not require a hard reset. Most commonly, a soft reset occurs between uses by the same user/user account and may be triggered by the controller (14)/platform (18) identifying data indicative of correct usage of a second or subsequent code, data indicative of the removal of an item from the locker or at a predetermined time (e.g., minutes, one or more hours, etc.) after determining that the item has been removed, determining that a subsequent use is about to be initiated such as via the application program or by a long term rental locker being opened with a first code, or the like. As transactions may be related (e.g., same user under a long-term rental), data may continue to be collected to the same account without interruption or with minimal interruption. Further, other parameters such as security measures, climate controls, etc. may stay the same and are not necessarily changed between related uses/transfers, unless needed/requested.

Regardless of the type of reset, lockers can also be programed (5014) to require certain access criteria/input from one or more users as a way to enhance security over other known locker systems. The criteria/input may have limited viability and if a user tries to access the compartment of a locker outside of a viability window access can be denied. One type of programmable criteria/input is the use of one or more codes with a limited window of being viable or in an active state for a given locker, transaction, or both. Distribution of such active codes may also be limited to increase the overall security of the locker/locker unit. In other words, access to a particular locker can be controlled so that only the person(s) having an active code assigned to the particular locker can open the locker. In many embodiments only one code for a given locker is active at a time. In other embodiments, such as with a shared locker for a family's day use, multiple active codes may be issued at one time. Nevertheless, a code should have a life cycle commensurate with intended locker use.

In an embodiment, codes may be generated by a code generator defined to be generated by use of the software of the system, and a code can be uniquely generated on an as-needed basis or before a particular use/transaction. If pregenerated, codes may be stored in a repository at the controller (14), the platform (18), or both. Similarly, the code generator may be hardware and/or software that is local (e.g., at the controller [14]) or remote (e.g., at the platform [18]). After generation, a given code may be in either an inactive state or an active state. Most codes that are stored in a code repository and later selected and assigned for use will be in an inactive state. Some, if not most, dynamically generated (e.g., on-demand) codes will be active upon generation. Although, dynamically generated codes may also be inactive at the time of generation and later activated. If generated at the platform (18), codes may be sent to the locker unit (12) controller (14) in an inactive or active state. If inactive, the controller (14) may receive a control signal from the platform to make a particular code active. Alternatively, a code may automatically become active upon assignment to a particular locker, upon transmission to a particular user or both. If not in an active state, a code should be in an inactive state or decommissioned. Inactivation may be temporary with reactivation taking place within minutes, hours, days, weeks, years, etc. The life/life cycle of a particular code may depend on one or more variables such as rental terms, security concerns, and other such concerns. Code status (e.g., active/inactive) can be dependent on or independent of a locker reset.

Referring to Table 1, and using a single transaction/transfer, based on hourly/daily use as a nonlimiting example (e.g., transferring forgotten sports equipment from one household to another) only one code may be active at a time. With respect to code 1, the code may either be active or inactive upon/in response to locker reset and the locker is empty, ready to be used. In fact, in an embodiment, code 1 may not even be assigned to the locker at reset. Rather, it can be assigned to the locker at a later time (e.g., when sent to the user [5016]) and made active at a later time such as just before intended use (which would be indicated at the time of locker rental/registration). Regardless of when code 1 enters into an active state, the code 1 is assigned to a locker, transmitted to the controller (14) if the embodiment calls for remote generation, and is transmitted (5016) to the first/custodial user.

When in the active state, the custodial user may input code 1 to cause the locking mechanism to disengage/unlock and allow the door (116) to be opened. Code 1 input may depend upon the type of code generated. For example, code 1 may be alphabetical, numeric, or both. It may also be a barcode, QR code, or another type of code. Moreover, just because code 1 is active does not mean that it will work to cause the locking mechanism to unlock. Namely, the controller (14) and/or platform (18) may compare the input code to the code that is needed to unlock the locker. If the input code is not the one to be entered at the time of entry, the locking mechanism will remain in a locked state even though code 1 is technically active. If, however, the controller (14) and/or platform (18) determine that code 1 is the correct code entered at the correct time and is active, a control signal can be sent to enable the locking mechanism to unlock. The platform (18) and/or controller (14) may send a control signal to cause the locking mechanism to remain locked in the event of an incorrect code entry or simply not send a control signal at all, which may cause the lock to stay locked.

The duration in which code 1 remains active may depend upon the particular embodiment/implementation. For instance, code 1 may remain active until after detecting an item is put into the locker or code 1 may be inactivated (or even decommissioned) in response to detecting that the locker has opened within a preset time (e.g., minutes, hours) of the system (10) determining a code 1 match, sending the control signal to cause the locking mechanism to unlock, or similar event detected, caused, created, etc. by the system (10). Alternatively, the system (10) may deactivate code 1 in response to detecting that an item is within the locker compartment and/or the door (116) has been closed. Determining whether a door (116) is open or closed (e.g., by controller and/or platform [18]) may be the result of pressure sensor data where pressure is indicative of the door being shut and no pressure is indicative of the door being opened, by analysis of camera data for indicators of an open or closed state, by analysis of motion data from a motion sensor, or other data that can indicate to the system (10) whether a particular locker door is open or closed. Similarly, the system (10) can determine whether an item has been placed in a locker by analyzing data that is indicative of item presence such as camera data, sensor data, weight data, or the like. After code 1 inactivation, the first user cannot open the locker without platform (18)/controller (14) intervention. In this way, the contents within the locker cannot be removed by the first user after the system (10) verifies/confirms the item.

Skipping ahead, the lifecycle of a second code (e.g., code 2) is similar to that for the first code. The second code, however, is generated/allocated and assigned to a particular locker for use by the second/recipient user to enable the second/recipient user to collect the item put in the locker by the first user. If pregenerated, code 2 will be in an inactive state when the locker is reset, locked, empty, and before code 1 has been input. In a usual scenario, code 2 will remain inactive (or not yet generated) until a given time after the system (10) detects/confirms that the item is in the locker and that the locking mechanism is locked/engaged. That is, code 2 may switch from an inactive state to an active state upon the system (10) generating/receiving signals/data indicative of the door being shut, the item being in the locker, and/or the locking mechanism being locked/engaged, although embodiments are not so limited. Code 2 may be transmitted to the recipient/second user either before or after code 2 becomes active. Nevertheless, the system will cause code 2 to become active before expected used by the second user. Activation may be automatic via a control signal and in response to receipt/analysis of data indicative of a triggering event as described herein. While in the active state, the second inputs code 2, the system (10) determines that it is the correct code entered at the correct time for the given locker (or not) and sends a signal to the lock/locking mechanism causing it to unlock in much the same way as detailed with respect to code 1. The second user can remove the item from the locker compartment and shut the door. The system (10) may cause code 2 to switch to an inactive/decommissioned state in response to use of code 2 to open the locker, after determining that the locker is empty, after determining that the door is closed, or combinations thereof in much the same way as described the same way with respect to code 1. It should be understood that the foregoing is a simple, nonlimiting example of how two different codes may be used to control access to a particular locker. There are many variations that can take place, some of which are detailed herein and some of which would be understood in view of this disclosure.

TABLE 1

GENERAL EXAMPLE OF WHEN CODE 1 AND CODE 2 ARE IN ACTIVE/INACTIVE STATES:

| Code Number | Code Status | Locker State | Contents |
|---|---|---|---|
| Code 1 | Active/Inactive | Reset | Empty |
| | Active | Locked | Empty |
| | Active/Inactive | Opened | Item put in Locker |
| | Inactive | Locked | Contains Item |
| Code 2 | Inactive | Reset/Locked | Empty |
| | Inactive/Active | Locked | Contains Item |
| | Active/Inactive | Opened | Take Item Out |
| | Inactive | Locked | Empty |

Embodiments may also include use of a third code, a universal code (e.g., "other"), and even further codes, depending upon a need or an occurrence. For example, referring to Table 2, code 3 may be generated, or selected and assigned to a locker when the locker is locked, contains an item, and neither code 1 nor code 2 is active. Usually, this scenario takes place when a second user fails to collect the item within a reasonable amount of time from the time the item is placed in the locker or from the time it is expected to be removed from the locker. A third code allows a third person (administrator, attendant, agent, first user, etc.) to open the locker and remove the item. If the person removing the item is the first user, the first code (i.e., code 1) may be reactivated, put in an active state/status instead of generating/assigning different code 3 in a manner that is the same as or similar to as described for original code 1.

Still referring to Table 2, a universal code or other code may be generated/switched from inactive to active state at any time but is usually envisioned for a worker such as housekeeping, maintenance, attendant, etc. to access the locker only in the event that work needs to be done, and preferably when the locker is empty.

TABLE 2

GENERAL EXAMPLE OF WHEN CODE 3 AND/OR OTHER CODES ARE IN ACTIVE/INACTIVE STATES:

| Code Number | Code Status | Locker State | Contents |
|---|---|---|---|
| Code 3 | Inactive | Reset/Locked | Empty |
| | Inactive | Locked | Contains Item |
| | Active | To Be Opened/ Opened | Take Item Out |
| Code Other | Inactive/Active | Reset/Locked | Empty |
| | Active | To Be Opened/ Opened | Empty: Cleaning, Maintenance, Other |
| | Active | To Be Opened/ Opened | Contains Item: Cleaning, Maintenance, Other |

Thus, after generation a particular code may have an active, inactive, or decommissioned status and be stored at the platform (18), at the locker/locker unit (12), controller (14) or combinations thereof. When a particular locker is programmed with an active code the current active code can be used to open that locker.

In embodiments, delaying generation/selection, assignment, activation, or combinations thereof may be a feature of one or more levels of enhanced security. If the window in which a particular code is active is short, the less time that code is available to be used to open the locker. As such, one or more triggers may have to occur for a given code to be generated and/or switched from an inactive to active status. Examples of typical code activation triggering events include: upon, in response to, or within a preset time (e.g., seconds, minutes, hours, etc. before and/or after) of (i) a reset (hard or soft); (ii) a code being transmitted to a user or other person by the system; (iii) detecting that the locker door is opened or closed (via indicative sensor, camera, etc. data) (iv) detecting that a locking mechanism is engaged/locked or disengaged/open (e.g., via indicative sensor and/or camera data, indicative control signals sent, indicative input data received, etc. and/or (v) other events/occurrences that take place within ordinary use of the locker as detected via sensor data, camera data and the like, as determined by database data, as determined by control data, etc. In view of the details regarding Table 1 and Table 2, it would be understood that embodiments contemplate that with activation of one code there is a corresponding inactivation of any other relevant code(s).

With enhanced security measures, more than one code activation event may have to take place before a code is fully activated. For instance, in addition to one or more of the above listed triggers, controllers (14) and/or the platform (18) may have to detect the presence of the first user, second user, or other person at the installation, recognize the first user, second user, or other user, or combinations thereof using relevant indicative data such by sensor data, camera data, etc. The controllers (14) and/or the platform (18) may detect the presence of the first user, second user, or other user via entry of an identifying PIN, information contained on the user device (24), or other sensing type technology. Further, controllers (14) and/or the platform (18) may identify a user/other person by biometric information such as face, fingerprint, iris, retina, voice, etc. recognition, or by matching other information such as scanning an identification card or the like. Thus, in response to one or more code activation events, a code may be generated in an active or inactive state (and later activated), sent to the locker for programming, and/or sent to a user device (24). Alternatively, the code may be selected, assigned, and/or switched from an inactive to an active state either at the locker/locker unit or before or after being transmitted to the locker.

Long term rentals may have the same or somewhat different code activation scheme as described above. For example, with respect to a soft or a hard reset or other code activation event, long term renters may obtain a newly generated first code that has never been used or that has not been used for an extended time (e.g., greater than a year, two years, five years, etc.). Alternatively, long term renters may use a same code that has been temporarily disabled (e.g., inactive status/state) for at least a part of a particular transactions such as after first use to open the locker, after the item is put into the locker, after the locker door is closed/locked with the item within the locker, or soon after (e.g., 1, 3, 5, 10, 30, 60, etc. minutes) one or more of the foregoing events and that may be reactivated in response to a code activation event (e.g., reset, sent to user, on premises, recognition, etc.). In a particular embodiment, a first code (i.e., code 1) is always active, although this embodiment may be limited to particular custodial users. And in other embodiments, a long-term renter, or maybe even a short-term renter, may be sent a first code in response to an item being put into the locker from the prior transaction/use. In this case, however, the first code would not be activated unless/until a code triggering event takes place that triggers activation of the first code. Overall, as with short term renters, for security purposes, long term renters are encouraged to give up custody/ownership of the item put into the locker so that it cannot be retrieved without platform (18) intervention such as to prematurely reactivate a code, send a third code, prematurely send a new code or the like. As such, the platform (18) can track who has access to/opens a particular locker and when.

Even though some codes may be reused, such as for more than one transaction/use, they may eventually be decommissioned/put on long-term deactivation. For example, a long-term renter's "reusable" code may be decommissioned/deactivated for an extended time after each billing cycle, each day, and/or upon requested as a few nonlimiting examples. Long term renters may even be able to create their own codes. Nevertheless, the platform (18) maintains control over the status of the user-created codes.

As yet another example of when a code is active, inactive, decommissioned, if locker locks accidentally and the user's code will not open the locker anymore, the user will have to use app (e.g., on device [24] or via the local controller [14]) to request a new code. In such a case, and depending upon the user (e.g., first user or second user) that receives the new code, additionally security measures may be taken to ensure that the item in the locker has not been changed. As one nonlimiting example, an image may be taken of the item to ensure that it is the same item that was previously placed in the locker.

Again, an improved feature of embodiments of the present invention over prior art lockers is that each locker is programmable with one or more codes (for the duration of a particular transaction/use) to enhance locker access control. The ability to turn a particular code on and off gives the platform (18) and users convenient control over who can open the locker and when and to help ensure that only the correct person or persons have access to the locker at the desired time.

One or more types of codes may be generated/used by the platform (18). The type of code generated/used may depend upon the features of the rented locker. For instance, most, if not all lockers/locker units (12) will have a keypad either on the locker (e.g., lock [104]) or on the locker unit (12) (e.g., unit keypad [110]) (or both) that, when an active code is entered, will open the locker assigned thereto. As an example for a keypad code, the code could be a random combination of letters, numbers, symbols, or combinations thereof. Keypad codes may be randomly and dynamically generated, when needed, or may be randomly pregenerated and stored in a code bank at the platform (18) at the controller (14), or both. Furthermore, keypad codes may act as a pin code, a primary code (e.g., code 1, code 2), a code in a two-code authentication sequence, or a backup code (e.g., code 3 or other code) if a primary code of a different type fails. As another example, a locker unit/locker may have a reader/scanner that is able to read/detect graphics or matrix codes such as various types of barcodes, including quick response (QR) codes and variations thereon, all of which are generally referred to as machine-readable codes (MRC). In this case, when an active MRC is scanned or read, the corresponding locker will open. Like a keypad code, an MRC may be dynamically created at the time of need or selected from a bank of pregenerated codes. Additionally, if a locker unit/locker and user device have the appropriate hardware/software, one or more codes may be a digital or other code used in conjunction with shortrange, wireless, and/or keyless technologies enabled by technologies such as Bluetooth, nearfield communication (NFC), radio-frequency identification (RFID), ultrawideband, Airdrop, or other enabled technology. Again, these types of codes may be generated dynamically, or selected from a stored bank/repository of codes. And regardless of the code or other data type, the system (10) verifies that only the proper code/data can be used to access a given locker at a given time by comparing the input data to code data and/or other data assigned to a given locker for use within a given window of activity and that is subject to detectable triggers for both activation and deactivation.

Referring back to FIG. 7 at step (5016), the system (10) may transmit code 1 to the first user device (24) and/or to the controller (14). Code transmission may depend on the type of code (e.g., keypad entry, MRC, keyless code). For example, a keypad code and an MRC may be transmitted to either the first user's device (24) and/or the controller (14). Keyless entry codes, however, may be transmitted to only the first user's device (24). Code transmission may be by any acceptable means such to the user account, via a link sent in an SMS, MMS, or e-mail, or direct to the device via SMS, MMS, e-mail, or the like as a few nonlimiting examples.

The time in which the first code is transmitted (5016) and may also depend upon circumstances. Generally, codes will not be sent unless one or more parties to the transaction/transfer have entered into an agreement (5012). Thereafter, a first code typically will not be sent unless the prior transaction is finished, although this may not be the case in some situations. If the prior transaction is over, the first code may be transmitted (5016) to the first user regardless of whether the locker has been reset. If not already reset, the code may be activated thereafter; if already reset the code may be transmitted in either an active or inactive state. If inactive, the code will be activated upon a subsequent activation trigger. For example, if the first user has enhanced security measures in place, the code may be sent before the security checks have been verified and activated thereafter or the security checks may be verified and the code sent thereafter in an active state, but additional measures may further delay activation. For long-term renters with an established account, the times in which a first code may be sent (5016) may translate to times in which a temporarily deactivated first code may be switched to an active status.

In an embodiment, rental time, transaction time, and various other times may be tracked. For example, with a short term, hourly rental, rental time may start when the rental agreement is entered into if for immediate use. Alternatively, if for future use, the agreement may specify the date, time, or both when the rental starts. Likewise, rental time for short term renters may end when the item is removed from the rented locker. With a long-term rental such as week, month, year, etc. the rental time may be subdivided into billing periods, which may or may not correspond to the rental (e.g., per week or per month) and the like, where the renter periodically pays for use of the locker.

In addition to rental time, transaction time may also be tracked. For example, transactions may begin with a transaction starting event such as, without limitation, when the first user uses the first code (i.e., code 1) to open the locker, when the item is put in the locker, when the door to the locker is closed and the locking mechanism is locked with the item contained therein, or the like. With respect to the hourly renter, the rent time and the transaction time may end at the same time with a transaction ending event such using a second code (i.e., code 2), third code (i.e., code 3), or another code (i.e., other, or universal code) to open the locker door; when the item is removed from the locker; when the locker door is shut and/or locked after item removal, or the like. Transaction times for long-term renters will be the same as the foregoing transaction ending events.

The system (10) may track various other times such as by use of a clock or timer. For example, with an hourly renter, the time between the start of the rental (e.g., when a rental is booked) and the start of the transaction may be tracked (e.g., detecting code input, or receiving other data indicative of locker use such as via a camera, scale, and/or sensor), especially with lockers in a high demand area. In this way, if the locker is being held for an extended time (e.g., more than one to 5 days, a week, or other increment) before a locker is actually used the platform (18) may terminate the rental, charge the renter for the time the locker was out of circulation, and deactivate/decommission the first code. As another example, the platform (18) may track the time starting when a transaction begins to a preset time in the future (e.g., one or more days, a week, or other increment), and if the second user has not retrieved the item by the preset time the platform (18) can notify one or more of the first user, the second user, an administrator/attendant, or the like to retrieve the item. In a particular embodiment, the system (10) may send the second user a warning notice first before notifying the first user and/or administrator/attendant to remove the item. If the second user still has not retrieved the item after the preset time plus an additional time (e.g., one to 3 additional days) the first user and/or administrator/attendant may be sent a notice to retrieve the item. And if neither the second user nor the first user has retrieved the item within the preset time plus even more additional time (e.g., one to 3 additional days), the attendant/administrator goes to the locker and retrieves the item. The item may then be sent or delivered to the first user for a fee, or the item may be stored elsewhere for the first user to pick up, again at an additional fee. In this way, the locker use may be optimized, especially in high volume areas. Long term renters may specify time intervals for a second user to pick up an item. This may be a blanket time, or a time indicated for each transaction.

The method (600) detailed in FIG. 8 allows the custodial/first user to open the locker and put the item to be transferred into the locker (102) compartment. In a preferred embodiment, lockers are locked between transactions to prevent random access to the interior of the locker. Keeping the lockers locked between uses helps prevent vandalism, theft, or the like of the equipment within the locker and prevents people from using the locker for unauthorized storage/putting something illegal or banned in the locker. As such, certain security measures are put in place to control access to the interior of the locker. Security measures may be dictated by the first user, second user, installation location, platform (18), or combinations thereof.

A locker unit (12) at an installation location (e.g., outside or inside a store) may utilize a locker monitor/locker monitoring system. A locker monitoring system may include hardware/software associated with the locker unit (12) such as the exterior camera (504), the display (506), one or more sensors, scanners, reader (522), the alarm (524), the speaker (526), the controller (14) or the processor (516), or combinations thereof. Software, including a locker interface, enables connections and communications between the various locker monitor components. A locker monitoring system may also include or alternatively include camera (206), scale (204), one or more sensors (216, 218), other hardware/software capable of capturing data for monitoring the locker unit (12), individual lockers (102), or combinations thereof. The controller (14) and/or processor (516) may each have a processing unit, memory, and data storage device to process data obtained via hardware/software such as cameras (e.g., [504], [206]) and/or other devices of a locker monitoring system, to send control signals to send control signals to locker monitoring devices, and to perform other computer implemented functions. The controller (14) and/or processor (516) may obtain data/control peripheral devices directly, via a sub/microcontrollers (or the like), or both. In an embodiment a locker interface is utilized for connection and communication between the controller (14)/processor (516) and one or more peripheral devices (e.g., cameras, sensors, locks, etc.). The controller (14)/processor (516) may be standalone, performing all computer-implemented functionality in an embodiment. The controller (14)/processor (516) may also be in communication with the platform (18) server (20), such as via the locker interface, to send data to the server (20) and receive signals therefrom. In yet another embodiment, computer-implemented functionality may be via a combination of hardware, software, firmware at the platform (18), the controller (14) and/or the processor (516), where communications/connections are via one or more locker interfaces. In an embodiment a locker interface may include one or more drivers, other software/executable instructions, or a combination thereof.

Referring now to FIG. 8, when a user approaches a locker unit (12) the locker monitoring system/components thereof may be triggered, such as by a motion sensor (522) to start gathering data either singly, repeatedly, or continuously depending upon the device and/or implementation. As another alternative components of the locker monitoring system may always be on or may be on at certain hours of the day. Either way, one or more of the components/devices are gathering data/ready to gather data when the first user approaches/begins to engage with the locker unit (12). In an embodiment, the custodian/first user may enter code 1 (602) into a particular lock (104) input device or a unit keypad (110). The input code 1 can be compared to the code 1 generated by/sent to the controller (14) for the controller (14)/processor (516)/server (20) to determine if input code 1 and the code 1 assigned to the particular locker (102) match. Further, the controller (14)/processor (516)/server (20) can also determine if the code 1 is active at the time it is input into the lock (104) input device. As one example, the controller (14)/processor (516)/server (20) may look up the code's active/inactive status such as in a code status database, obtain the information from a state machine, or the like. If code 1 was entered correctly it is active the controller (14)/processor (516)/server (20) may cause the locker door (116) to open (606). For example, the controller (14)/processor (516)/server (20) may send a control signal to the lock (104) so that the locking mechanism fasteners/fastening member/receiving member (212, 222 and/or 220, 228) disengage/unlock. In an embodiment where the unit keypad (110) is used to enter code 1, additional information may have to be input (e.g., locker identifier [106]) and verified by the controller (14)/processor (516)/server (20) before the control signal is sent for the locking mechanism to disengage/unlock the locking mechanism fasteners/fastening member/receiving member (212, 222 and/or 220, 228). The state of the particular lock (e.g., locked/unlocked) may be maintained by a state machine and/or a database entry or the like. If code 1 was not entered correctly and/or it is not in an active state, the controller (14)/processor (516)/server (20) may send a control signal to prevent the lock from disengaging or the lock will remain locked/engaged in the absence of a control signal to unlock/disengage (608).

In an embodiment, standard security may be increased by requiring a two-step authentication (604). If two-step authentication is enabled, the code generator or other generator can select a pregenerated authentication code or generate an authentication code on demand and send it to one or more of the controller (14)/processor (516)/server (20). The system (10) also sends the authentication code is also sent (e.g., SMS, MMS, e-mail, etc.) to the first/custodial user device (24). The custodial/first user inputs (610) the authentication code into the lock (104) input unit and/or unit keypad (110) and the system (10) determines if it is a match (612) in the same or similar manner as was determined for code 1. If the authentication codes match (612) then the system (10) causes the locker door (116) to open, and if the authentication codes do not match (612) the door does not open (608). Control of the door opening after entry of an authentication code is in the same manner as previously described, except in response to entry of the authentication code instead of code 1.

An embodiment also provides for enhanced security measures, which are detailed on the right side of FIG. 8. As with other methods detailed herein, the various steps can be implemented as one or more executable instructions in the order set forth or another order and/or with more or fewer of the indicated steps. Further, enhanced security may take place in conjunction with one or more steps of "standard security" but may require one or more additional steps/tiers (e.g., [614, 616]). With tier 1, enhanced security may call for detecting the presence of the user (614). User presence may generally require the input of information used to identify a particular user such as a personal identification number (PIN), a radio frequency identifier (RFID) (e.g., on a badge), a government issued ID, etc.; information used to identify a particular device (24) such as a smart phone geolocation or other tracking features (e.g., GPS data, satellite data, social media tags, internal sensor, cell ID, WiFi ID, RFID, NFC, Bluetooth, Airdrop, etc.). Identifying information may be input to the system (10) per an appropriate input device (e.g., keypad, sensor, reader, camera, scanner, etc.), which can send data to the controller (14)/processor (516) and/or server (20). The controller (14)/processor (516) and/or server (20) can compare the received data to user data stored in the user database (as one example) to determine (620) if the person is a known user, if the person has rented a locker (102) in the locker unit (12) and/or is a representative thereof, or another determination that determines/confirms (620) the presence of the person at the locker unit (12) and a time associated therewith. If the result is positive (yes), then a control signal is sent to cause the locker door (116) to open (606), and if the result is negative (no) then a control signal may or may not be sent to cause the lock (104) to remain engaged/locked as had been described herein. As with other data, determinations, and the like, the data and outcome of data analysis (620, 606, 622) can be stored in one or more databases for later retrieval and/or use.

It should be noted that enhanced security (614, 616) may still require receiving a code (e.g., code 1) from the custodian/first user. Validating user presence (614, 620) may take place before or after the user enters code 1 (602). If code 1 is entered (602) before validating the user (614, 620), the system may first verify code 1 (612) and then validate the user but wait to send an instruction (606, 622) to control the state (locked/unlocked) of the lock (104) until after a validation result is known (620). Alternatively, code 1 may be verified (612) upon/in response to user validation (620) and then the appropriate instruction can be sent (606, 622). As yet another alternative, code 1 may be partially verified (e.g., the code is correct and the time is correct) but validating the user may act as a trigger causing code 1 to switch from an inactive to active state to complete code verification. Once active, code 1 may act as a trigger for the controller (14)/processor (516) and/or server (20) to send the appropriate control signal (606, 622) to the lock (104). In another embodiment, enhanced security may call for code 1 to be entered and verified (612) after validating user presence (614, 620), and if valid will activate a sequence (e.g., one or more control signals) to cause the lock (104) to unlock so that the door (116) can be opened (606). In this instance code 1 may or may not be active before validating the user. If inactive, a positive result on user validity may cause code 1 to switch from an inactive state to an active state. Validating a user may be especially useful in situations where code 1 may have been obtained by a person who should not have the code. When the system (10) links a code or the like to enhanced security only the validated user can use the code to open a given locker.

A second tier (616) of enhanced security includes actually recognizing the user based a biometric or other recognition technology such as face, voice, iris, retina, fingerprint, etc. recognition, and combinations thereof. The use/processing of recognition/biometric data may be essentially the same and elicit essentially the same results in essentially the same way as was described with respect to the first tier (614), just with different data/data sources. Thus, when data processing detects/determines a match or the like between captured data and stored data, the user passes (620) (yes) and the appropriate control signals can be sent to open the door (116). If the user does not pass (620) (no), then the user is not validated and the locker door (116) remains closed, with the lock locked. The second tier (616) can be utilized alone or in conjunction with code entry as was described with respect to tier 1.

In the event that the locker opens (606), the custodial user may put an item in the locker for removal by the second user. Generally, the system (10) detects when the item is in the locker (624) using one or more of the locker monitoring components to monitor the compartment defined by the locker, items placed in the compartment, or both. Thus, one or more components of the locker monitor/locker monitoring system may be used by the system (10) to monitor what is put in the individual lockers and/or activity associated with the locker/locker unit (12). Namely, data captured/recorded via cameras (206), sensors (218), timers, etc. can be processed for a plurality of reasons including locker (102) compartment monitoring, item detection and/or approval/authorization, and user validation as a few nonlimiting examples. In an embodiment, item detection (624) may be optionally offered as a transaction security feature such as when transaction fraud is a concern. Nonlimiting examples regarding fraud include, a second user being concerned that the first user will switch higher cost item for a less desirable item, or the first user being concerned that the second user will make a false accusation about the item's quality, quantity, or the like or about not receiving the item. By obtaining and analyzing information from one or more sensors, timers, scales, and/or other data, the system (10) can determine if an item is in the locker (102) compartment, if the item put in the locker (102) compartment is the item described in an item database, if the item has been moved, replaced, or the like after initial data has been analyzed, and other determinations as described herein. Moreover, as the peripheral devices (e.g., cameras, sensors, scales, etc.) can operate continuously and/or repeatedly obtained data may be captured and stored for later analysis such as when locker unit (12) activity is low, on demand, or other situations. Thus, data may be captured, recorded, analyzed, and used from before an item is placed in a locker compartment to the time it is removed from the locker and thereafter. Such data may be stored in a variety of databases or composite databases such as in association with the first user's account, the particular transaction, the second user's account, if any, as system data (e.g., or prohibited/illegal items, vandalism, etc.), or combinations thereof. Such data may also be time stamped, location stamped (e.g., geolocation, unit identifier, locker identifier, GPS coordinates, etc.) and/or have any other transactional data recorded therewith. In this way, the system (10) can retrieve data by the time, geolocation, locker unit, locker number, user/users, transaction, and/or any other data, for any reason such as to settle a dispute or to provide information about another query. Furthermore, for billing or other purposes, a timer may start when an item is detected within the locker (102) compartment, the timer may be used to determine that a preset time has passed since the item was first detected as being within the locker (102) (e.g., for code activation, inactivation, billing, notifications, and/or other timed events). Thus, the system (10) may perform a wide variety of functions based on the time a particular event occurred (e.g., item detected in locker [102]), time passed since the particular event occurred or other such timed occurrences/events.

With respect to item detection (624) (e.g., present/absent)/compartment state (e.g., occupied/empty) the type of data indicative of the item being present/the compartment being occupied may depend upon the hardware and/or software that is installed/enabled in a particular locker/locker unit (12). For example, if a scale (204) is installed/enabled, a change in weight/mass data (including measuring an exact weight/mass) may indicate whether an item is or is not within the compartment. Likewise, camera (and/or other image sensors) data can be indicative of whether the compartment is occupied or empty and can be compared (e.g., by processor, controller, server) to information in an item database to determine if data captured by the camera conforms to the description, an image, or the like of the database item. Sensor data can also be indicative of whether or not a compartment is occupied/an item is contained therein. For example, pressure data, temperature data, motion data, infrared data, contact data, photoelectric data, etc. can all be indicative of whether or not a compartment is occupied or empty. Generally, like other peripherals, sensors can detect changes in the environment and signal/transmit data to the controller (14), processor (516), and/or server (20) for analysis, interpretation, comparison, etc. In turn the controller (14), processor (516), and/or server (20) can use the data/data results for additional instructions, actions, tasks, etc. such as via a control or other signal. Thus, data from one or more sensors, cameras, scales, etc. can indicate whether an item is present/absent in the compartment, which can be processed to determine whether the compartment is occupied/empty (624). Further, the controller (14), processor (516), and/or server (20) can process sensor (e.g., 216, 218) data, camera (206) data, scale (204) data and the like to determine of the item in the compartment is prohibited/illegal, has been moved, removed, changed, or the like, and other make other/additional determinations based on the data. Of course if a locker/locker unit (12) is equipped with other or additional sensors (e.g., light, vision/imaging, radiation, particle, ultrasonic, gas, chemical, etc.) the input and output of one or more of those sensors may be processes by the controller (14), processor (516), and/or server (20) to determine such as, without limitation, whether an item has been placed in a locker (624). Further sensor and other data may be used by the controller (14), processor (516), and/or server (20) to alert one or more of the first user, second user, or attendant/administrator that something is amiss.

In addition to detecting (624) that an item has been placed in a locker, the controller (14), processor (516), and/or server (20) can orchestrate item verification/authorization (626). Generally, item verification/authorization allows the first user and second user to agree that the item in the locker is the item that is intended to be transferred via the transaction. For instance, if an item was the subject of a sale, the item may be imaged, the controller (14), processor (516), and/or server (20) can process the image data (e.g., from camera [206]) and forward the image to the second user, the first user, or both. The first user and/or the second user may view the image (via user devices [24]) to determine if the image is of the item the same image that is the subject of the purchase. In an embodiment, the second user must send a confirmation/verification signal to the controller (14), processor (516), and/or server (20) e.g., via the second user device (24). The signal transmitted may be dependent upon the type of message that the system (10) sends to the second user (and/or first user). For instance, communications between the system (10) and one or more of the second user or first user device (24) may be via the application, a Web site, an SMS, an MMS, an e-mail, etc. As such, a user may reply to the communication in the same way or a different way. If instructed to confirm/verify via a different communication form, the user may also be asked, in some embodiments, to provide a verification code that was sent in the original message to confirm that the item meets approval, much like two-step verification. As another example, the first user may want to put a lost/forgotten item in the locker and the image data can be used to confirm that the item is the item that the second user wants. In this example, enhanced security may not be an issue and the parties may just want confirmation that the correct item is being transferred. If it is not the correct item, in some embodiments, the item may be removed (630) and replaced (632) with a different item. If so, the controller (14), processor (516), and/or server (20) may process sensor data or other data to determine that the original item has been removed (e.g., at step [630]), and it may collect sensor input to detect that a replacement item has been placed (624) in the locker, again using information from one or more sensors, camera, and the like as before (e.g., 624) to process/forward image and/or other data to the first user, second user, or both for subsequent verification/authorization (626) by at least the second user and as has been described. This loop may continue until the second user approves (626) (yes) an item or either user or the system (10) terminates the transaction. If terminated, the first user, second user, or both may be charged for the time that the locker has been taken out of circulation and/or the system (10) may prohibit one or both of the users from renting a locker for at least a given time, especially if this is a recurring pattern. In an embodiment, the controller (14), processor (516), and/or server (20) may also use the second user's verification (626) and/or information from one or more databases (22) to authorize/approve the item in the locker. For example, the system may use sensor/camera information regarding the item and compare it to identifying information in an item database (22) to determine that the item in the locker conforms to item information input when the locker was rented and/or to determine that the item in the locker is not banned, prohibited, illegal or the like. Such a determination may be made by comparing data to see if it matches, if it is within preset tolerances, outside preset tolerances, or other such comparisons/computations. Again, if the item fails verification by the controller (14), processor (516), and/or server (20), the system (10) sends a request to the first user (e.g., SMS, MMS, e-mail, phone call, etc.) to remove the item from the locker. In an embodiment, the controller (14), processor (516), and/or server (20) may or may not allow the first user to replace the rejected item with a different item (632) and try again. And depending upon determinations made using sensor/camera etc. data the controller (14), processor (516), and/or server (20) may send an alert to an attendant, administrator, security personnel, constable, or the like. This alert may be transmitted in any acceptable form such as SMS, MMS, e-mail, phone call, etc.

Sensor/camera/scale data from the locker/locker unit (12) may be sent to the controller (14), processor (516), and/or server (20) for processing. The same data used for item detection (624) may also be used for verification/authorization (626) purposes. Again, as used herein a sensor may include one or more sensors of one or more sensor types that detects a real-world condition (e.g., motion, light, temperature, pressure, proximity, etc.) and outputs it as a signal to the controller (14), processor (516), and/or server (20). As such, sensors used for imaging such as by a digital camera, fall within the definition of a sensor. Since sensor information can be used to detect when an item is placed in (or removed from) the locker, some or all of the same information may be processed by the controller (14), processor (516), and/or server (20) for verification/confirmation purposes. Further, since embodiments allow sensor information to be output to the controller (14), processor (516), and/or server (20) either continuously or at regular intervals (e.g., every second, 10 seconds, 30 seconds, minute, 2 minutes, etc.) the controller (14), processor (516), and/or server (20) can process sensor information to output/utilize data in any manner including a manner that is recognizable to a person such as one or more images, as one nonlimiting example. As there may be more than one camera/imaging device (204) in a given locker/locker unit (12), the controller (14), processor (516), and/or server (20) may output a three-dimensional (3D) image to send to the second user, first user, or both. A 3D image may be useful in high stakes situations (e.g., the item is the Mona Lisa), where the second user will want to view the item from all angles and to zoom in/out. It should be noted that the controller (14), processor (516), and/or server (20) are not limited to transmitting image information to the second user and/or first user; the controller (14), processor (516), and/or server (20) may output any other sensor information that is usually processed to be understandable to a human, such as weight, temperature, etc.

In an embodiment, the controller (14), processor (516), and/or server (20) can cause a lock to engage/lock when the door is closed and in response to detecting (624) an item is within the locker (102) compartment or after the item is verified (626) by either the controller (14), processor (516), and/or server (20) or by the second user. Generally, the controller (14), processor (516), and/or server (20) can detect if the door (116) is shut via sensor data indicative thereof as has been discussed herein. In an embodiment the door (116) can be shut automatically such as via a control signal to the appropriate device, may be spring loaded, use a hydraulic system, or the like. If not, the system (10) e.g., via the controller (14), processor (516), and/or server (20), may send a message to the user device to request door closure. If the door (116) is shut, the controller (14), processor (516), and/or server (20) may send a signal to the lock (104) causing the locking mechanism to engage/lock the fasteners/first receiving member (212, 222) and/or (220, 228). Thus, the item can be securely locked within the locker compartment with reasonable assurance that it is the one that the second user is expecting and it is not a prohibited item.

When the controller (14), processor (516), and/or server (20) cause a locker to be locked (e.g., door closed, fasteners/first receiving member [212, 222/220, 228] engaged/locked) may depend on an embodiment, enhanced security measures, or both. For instance, a locker may be locked in response to detecting (624) the item in the locker as an enhanced security measure. The first code may be inactivated or decommissioned either before the item is placed in the locker or in response to detecting that it is within the compartment. In this way, the first user has given up custody of the item and the item cannot be changed without the controller (14), processor (516), and/or server (20) action (e.g., transmitting a new code). Further, sensor data collected and processed for verification can be heavily relied upon for approval/authorization since no one can access the inside of the locker to switch out the item. Waiting to lock a locker until after full approval/authorization (e.g., by system and/or recipient user response) may allow the controller (14), processor (516), and/or server (20) to analyze sensor data to ensure that that the item is not contraband and/or that it matches/adheres to database (22) data. In this way, the first user, attendant, administrator, law enforcement, or the like can remove the item if it is found to be contraband/not adhering without having to use a code. In this instance, the second user may be notified that the item was removed and will not be available for pick up. Alternatively, if the item is verified by the controller (14), processor (516), and/or server (20) before receiving a response from the second user, the locker may be automatically locked before second user verification. Again, once the locker is locked the first user and others cannot open the locker to switch out the verified item. And the first code, if not already inactivated/decommissioned may be deactivated/decommissioned in response to the locker locking. Locking the locker after a positive (e.g., confirmation/authorization) response from the second user may be especially useful when the first user and second user are transferring an item between known households. In this way, the first user has the opportunity to remove (630) and replace (632) the wrong item with the correct item. Again, after the locker is locked, the first code may be decommission/inactivated if not done so already. Again, sensor data is being obtained and processed by the controller (14), processor (516), and/or server (20) throughout the transaction to ensure that the item is not prematurely removed and is safely secreted until pick up, and after the locker is locked the first user cannot open the locker for the remainder of the transaction unless permitted by the controller (14), processor (516), and/or server (20).

If the second user or the second user and the controller (14), processor (516), and/or server (20) validate/confirm that the item in the locker conforms to expectations, a notice may be sent to the first user, the second user, or both as has been discussed herein. Generally, the notice may include time, date, location, etc. data relating to the transaction as a whole (up to this point) or just relating to verification/approval. The notice may also include an image of the item and/or other information such as database data relating to the item, other or additional sensor information, or the like. The notice sent to the second user may also include the second code (e.g., code 2) for exclusive use by the second user or the second user's agent. Alternatively, the second code may be sent to the second user in a separate transmission. The second code is different (e.g., same type but different code or different type and different code) from the first code and may be generated, obtained, assigned, activated, deactivated, decommissioned, etc. as described with respect to the first code. Additionally, each notice and/or the second code may be transmitted to a user device via any acceptable messaging technology such as SMS, MMS, e-mail, within the application, via a Web site, etc. and each notice/code may be sent via different technology. In embodiments involving the transfer of funds (e.g., a purchase or return) item verification may also trigger release of funds from one user to the other. If so, the release of funds and related information may also be included in the notice or may be the subject of a separate transmission to one or both of the users.

When the second user retrieves the item from the locker (700), the second user may be subject to the same or similar security measures (702) that were detailed in association with FIG. 8. Generally, the second user may be subject to standard security measures (e.g., FIG. 8 at steps [602]-[608]) or enhanced security measures (e.g., FIG. 8 at steps [614]-[622]) and second code events. Either way, the second user presents (e.g., enter, scans, etc.) the second code to the locker/locker unit (12). If security measures are not passed, the locker remains closed (706) and the appropriate person/ persons (e.g., first user, attendant, etc.) is/are contacted to remove the item from the locker. If security measures are passed (704), the locker opens (708). Since sensor data is still being processed, the controller (14), processor (516), and/or server (20) can detect when the second user removes the item much in the same way as the item is detected as being within the locker (102) compartment. After or in response to item removal, the door to the locker is shut and the lock (14) locked as has been described herein. Further, the locker may reset (712) for the next transaction/transfer. Additionally, the controller (14), processor (516), and/or server (20) cause the transaction/transfer (714) to end such as via a control signal, database update, state machine change, or combinations thereof. Ending the transaction/transfer may include sending a second notice to the first user and/or second user as has been described herein. The second notice may include updated data relating to the transaction such as date, time, location etc. of pick up and any other relevant information including processed sensor data such as a time stamp together with an image of the empty locker. If the transaction/transfer was for a single use, information in the notice may also include rental time, transaction time, charges, amounts, and the like. Long term renters may also receive a similar notice (less the charges) that may also include statistics relating to total usage of one or more lockers/locker units or other such information that would be useful to a long-term renter.

There may be many reasons why the first user may have to retrieve the item after the locker has locked and the first code has been deactivated/decommissioned. For instance, the second user responds to verification in the negative (e.g., does not confirm the item is the correct item), the second user fails to retrieve the item within a preset time, one of the users notifies the system (10) that the second user no longer wants the item, or other such situations. The steps for a person other than the second user to retrieve the item from the locker (700) are essentially the same as for second user retrieval except for the code. For instance, the first user may receive a third code from the controller (14), processor (516), and/or server (20) that is different from the first code and the second code, or the controller (14), processor (516), and/or server (20) may activate the first user's first code. As another alternative, the first code may be automatically activated after a preset time (e.g., one or more days, a week, etc.) so that the first user may retrieve the item. The preset time for first code reactivation may coincide with the preset time given for the second user to retrieve the item. With a long-term rental, a third code may be transmitted to the first user and the first code may be set to an active state after the third code has been used or the first code may simply be toggled between active and inactive states as needed.

In certain embodiments, it may be advantageous to the first user and to a second user who is a buyer to use a locker system for exchange of goods purchased on third-party applications or Web sites. As a nonlimiting example, an item may be posted for sale and the first user, and the buyer agrees to a price for an item listed on a local Web site-based marketplace. Upon an agreement of the sale price, the first user may elect to exchange the goods, in this example a cooking pot, via the locker system (10).

The marketplace listing for the cooking pot included several important pieces of information. First, it included an image, or several images of the item being sold. Secondly, it provided information, such as a brand, a size, a SKU number, and other such identifying information. The cooking pot is by a reputable brand and information on the exact item is readily available on numerous other Web sites, such as where the cooking pot may be listed for sale as a new item. Images and/or the information about the cooking pot (from the marketplace and/or one or more other Web sites), may be imported to/received by the controller (14), processor (516), and/or server (20) and is stored within the system (10) such as in database (22). As such, the stored information relating to the cooking pot can be used as the information obtained about the item (FIG. 7 step [5004]). The first user agrees to use the locker system (e.g., FIG. 7, steps [5002, 5004]) and the first user and buyer agree on a location (e.g., FIG. 7, steps [5004, 5006]). The controller (14), processor (516), and/or server (20) transmits/provides a code to the first user device (24) and provides the location and locker number for use (e.g., FIG. 7 steps [5008, 5010, 5012, 5014, and 5016]. Notably, because the controller (14), processor (516), and/or server (20) knows the size and weight of the item (e.g., cooking pot), the proper sized locker can be assigned (e.g., FIG. 7 steps [5006, 5008, 5010]), which will allow for insertion and placement of the cooking pot. The first user enters the first access code into a keypad on the locker system and the door to the locker that was assigned to the first user opens (e.g., FIG. 8 steps [602, 604, 606]). The first user then places the cooking pot into the assigned locker (e.g., FIG. 8 step [624]) and the door is closed and latched. The first user cannot now enter into the locker, as the access code is deactivated once it has been used.

Upon the closing of the locker door and the locking of the lock, the controller (14), processor (516), and/or server (20) identifies that the good (the cooking pot) has been placed (or should be placed) into the locker (e.g., FIG. 8, steps [624, 626]. The controller (14), processor (516), and/or server (20) can perform a review process to ensure that the item is the correct item as a mechanism to prevent fraud. First, the scale can measure the actual weight of the item and compare it to an estimated weight obtained from the imported/received data about the item. The controller (14), processor (516), and/or server (20) can verify if at least the minimum weight is met, which will aid in the controller (14), processor (516), and/or server (20) confirming that the item is correct.

Next, the controller (14), processor (516), and/or server (20) can take an image from inside of the locker (e.g., FIG. 8 step [624]). This image can then be directly compared to the item from the imported/received information about the item. AI or other recognition software can then be utilized to compare the taken image from the locker to the image provided in the third-party/marketplace listing. Furthermore, the image can be sent directly to the buyer for confirmation (e.g., FIG. 8 step [626]).

The step of confirmation from the buyer provides a layer of verification between the first user (the seller) and now the buyer. The item has been placed within the locker itself and the buyer is able to then verify information regarding the item to confirm whether the buyer wants to authorize and finalize the sale (e.g., FIG. 8 steps [626, "yes," 628]. In certain embodiments, the sale price of the transaction as paid by the buyer to the seller can be held in escrow by the controller (14), processor (516), and/or server (20) or a third-party payment system (26). Thus, only upon the buyer authorizing the item, is the money paid to the first user/seller. In this way, both the buyer and the seller are protected from fraud, as the seller knows that the transaction is authorized, and the buyer has seen the actual item within the locker to confirm that the buyer is receiving the agreed upon item. Thus, at the approval of the buyer, the escrow is released, and the controller (14), processor (516), and/or server (20) records the approval as part of the transaction or other data and sends from the controller (14), processor (516), and/or server (20) to the buyer, via the buyer's user device (24), a second access code (e.g., FIG. 8 step [628]) for entry into the locker.

Figure 9:
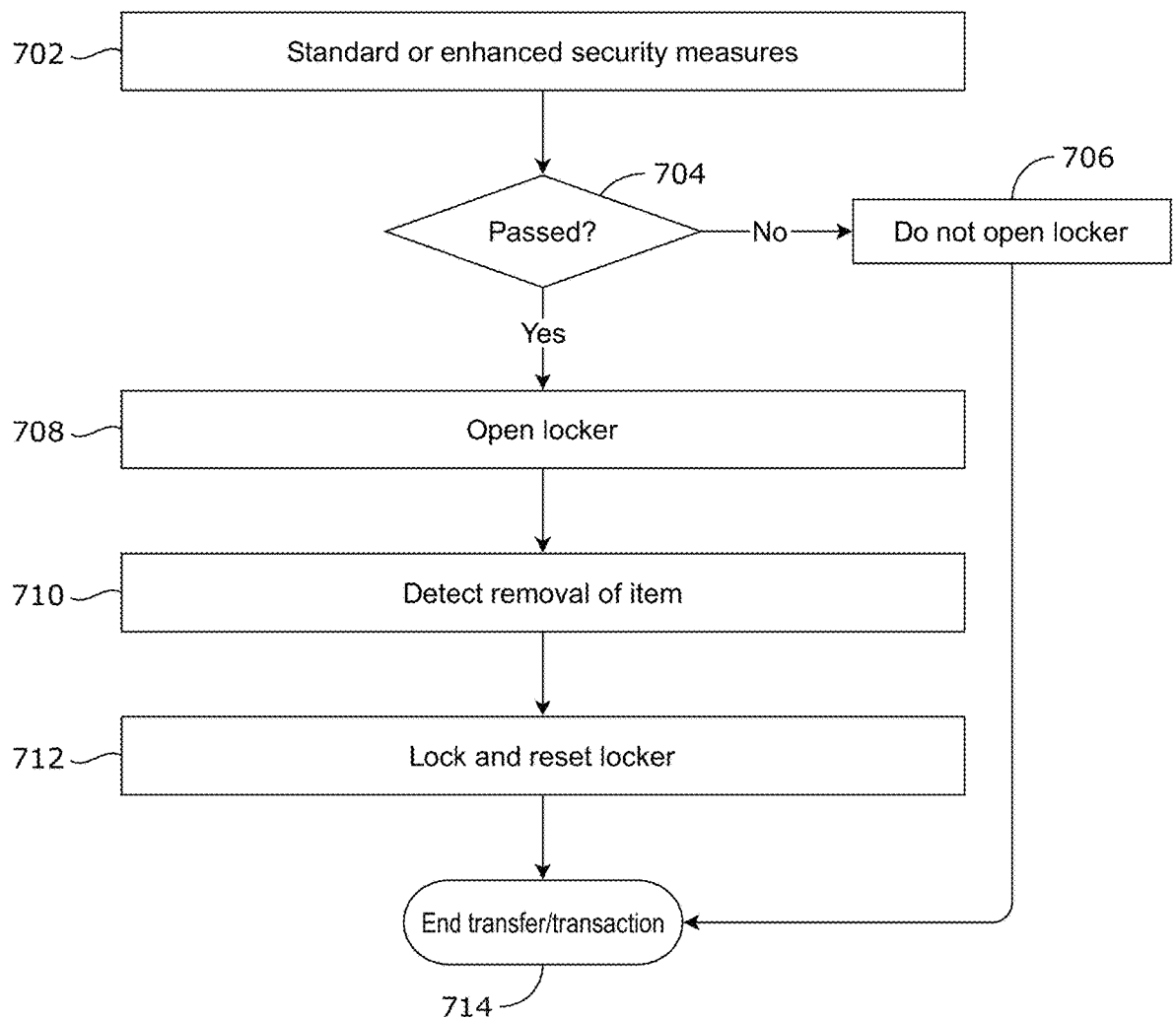
FIG. 9 details a method for retrieving an item from the locker according to an embodiment.

The buyer can now enter the second access code (e.g., FIG. 9, steps [702, 704]) and access the item (FIG. 9, step [708]). The second access code is entered, and the buyer takes the item (e.g., FIG. 9 step [710]), and the door closes. The controller (14), processor (516), and/or server (20) verifies that the locker is empty (e.g., FIG. 9 step [712]) by image, such as from a camera within the locker, the scale, or other sensor within the locker. The platform (18), verifying that the locker is empty (e.g., FIG. 9 step [712, 714], can now authorize the locker to be cleaned, by providing a code for maintenance to perform a cleaning. Or the locker can simply be put back into rotation for use, wherein the locker is again available for rent (e.g., FIG. 9 step [712, 714]).

In an embodiment, lockers may be rented by the day to store personal items while at an amusement park, resort, sports venue, or wherever else a user may want to store and freely access personal items throughout the day. In such an embodiment, the controller (14), processor (516), and/or server (20) may receive a request for a locker, obtain information about the user, rental duration, geolocations, amenities, etc. as described with respect to FIG. 7 steps (5002, 5004). Further, the controller (14), processor (516), and/or server (20) may determine locker availability, send locker information to the first user, receive the locker selection, and enter into a rental agreement (e.g., FIG. 7 steps [5006, 5008, 5010, 5012]). Programming of the locker (FIG. 7 step [5014]) and coding (e.g., FIG. 7 step [5016]), may differ from other embodiments. For example, if there is only one person using the individual locker (102), then only one access code can be assigned and remain active for the duration of the rental (e.g., FIG. 7 step [5016]). If there is more than one person using the locker, then plural access codes may be assigned and remain active for the duration of the rental. In an embodiment, each person using the locker may have a distinct access code. Since fraud is not an issue for personal use, the controller (14), processor (516), and/or server (20) may use only standard security measures (e.g., FIG. 8, steps [602, 604, 606]). In some instances, the controller (14), processor (516), and/or server (20) may still detect that items are placed within the locker (FIG. 8, step [624]) and may elect to perform platform verification (FIG. 8, step [626]) to ensure that the locker is not being used to store banned and/or illegal items. The controller (14), processor (516), and/or server (20) may monitor usage of the locker throughout the duration of the rental without resetting the locker/access codes until the rental duration is completed (e.g., FIG. 9 steps [710, 712, 714]).

Figure 10F:
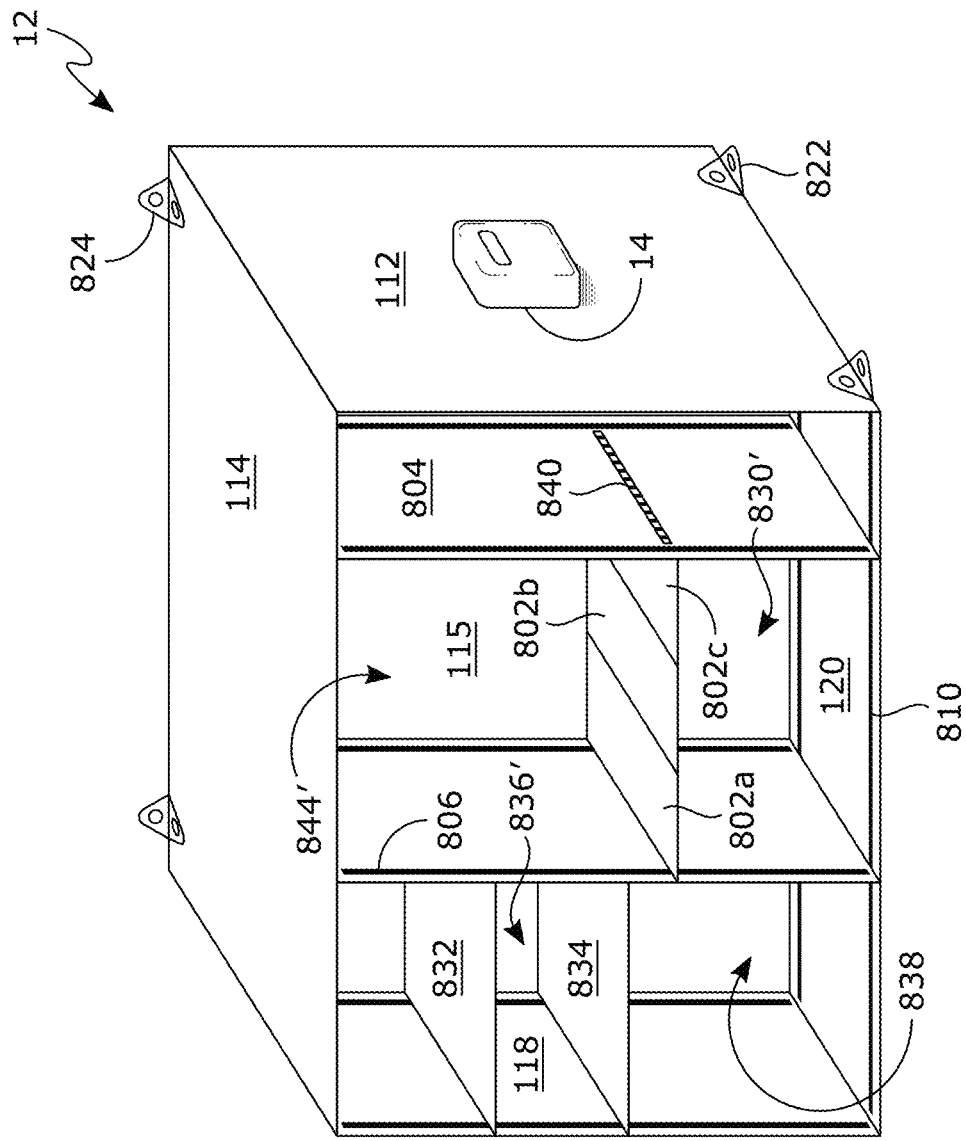

FIGS. 10A, 10B, and 10F depict locker units (12) having lockers that are adjustable in size. The locker units (12) are the same as other locker units (12) in that five walls (112, 114, 115, 118, and 120) define an enclosed space that is divided into compartments defined by one or more partitions. However, in embodiments having lockers that are adjustable in size, the one or more partitions are moveable. For instance, FIG. 10A shows an embodiment where a movable shelf partition (802) is disposed between two upstanding moveable partitions (804), which in an embodiment are also moveable, and another movable shelf partition (832) is disposed between a wall (118) and an upstanding moveable partition (804). Although not shown, it would be understood that a moveable shelf partition (e.g., 802, 832) may be disposed between two spaced apart walls, (e.g., 112 and 118).

As a result of moving one or more moveable shelf partitions (e.g., 802, 832) the size of the compartment defined by the shelf will also change although overall volume will remain essentially the same. For example, as is shown in FIG. 10A, moveable shelf partition (802) can move in the direction of vector (802'). If moveable shelf partition (802) is moved toward wall (114) then volume of compartment (844) decreases and the volume of compartment (830) increases by substantially the same amount as the volume decrease experienced by compartment (844), and if the moveable shelf partition (802) is moved toward wall (120), the inverse is true, the volume of compartment (830) decreases and the volume of compartment (844) increases. The same changes in compartment (828, 836) volume may be achieved via moveable shelf partition (832) movement in the direction of vector (802') either toward or away from one of the walls (114, 120). The moveable shelf partitions (832) and (802) can be moved independent of each other thus enabling compartments (828, 836) to have different volumes than compartments (844, 830). In this way, the locker unit (12) can accommodate differently sized items by optimizing the volume within a given compartment (e.g., 830, 844, 828, 836). It should be noted that a moveable shelf partition (e.g., 802, 832) can be moved toward either wall (114, 120) so that the volume available between the two walls (114, 120) is maximized. For example, the volume of the compartment defined in the far right of FIG. 10A is the maximal volume allowed by its defining walls (114, 112, and 120) and the upstanding moveable partition (804) minus the space taken up by a retracted shelf. Thus, in an embodiment with movable partitions such as moveable shelf partitions (802, 832) and upstanding moveable partitions (804), the volume defined by the five walls (112, 114, 115, 118, and 120) does not change, but the individual compartment (e.g., 828, 836, 844, 830) volume can be modified by moving a moveable shelf partition (e.g., 802, 832) in the direction of vector (802'), by moving an upstanding moveable partition (804), or both.

Figure 11A:
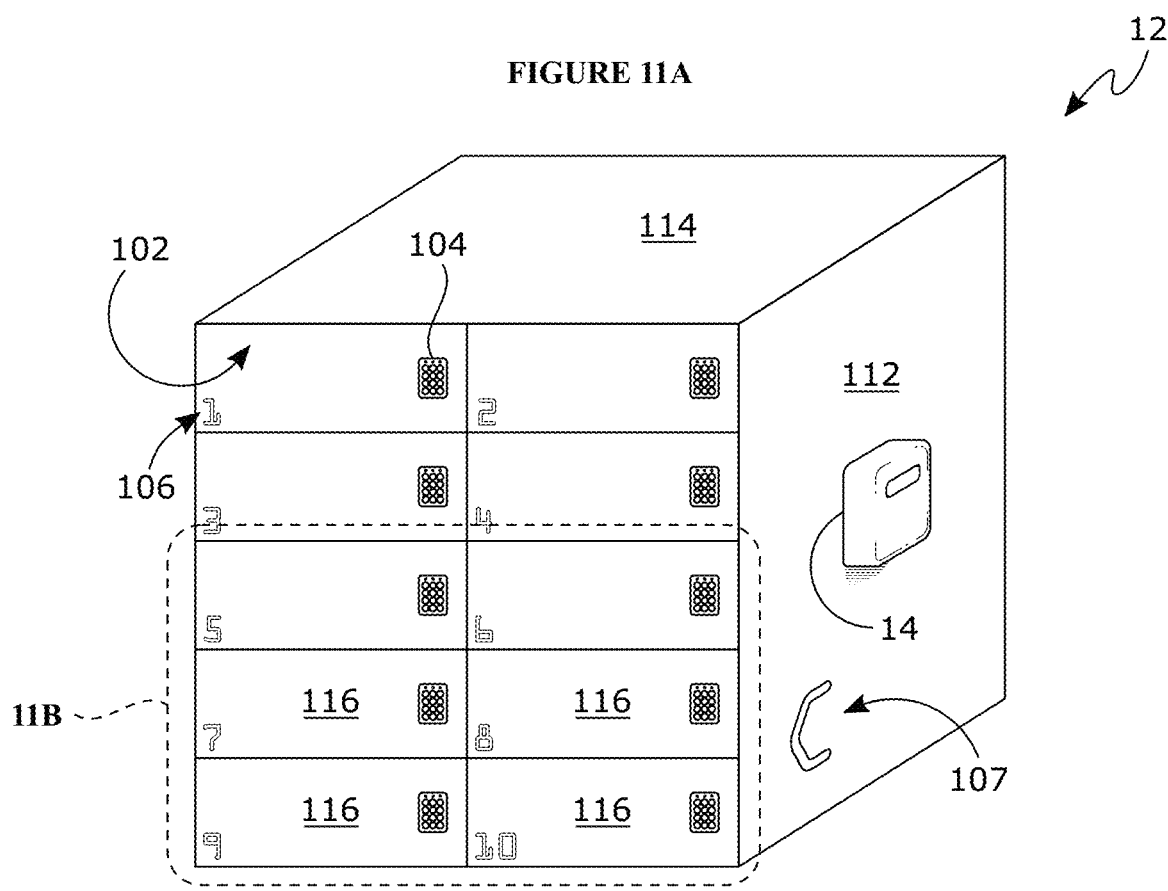
FIG. 11A depicts an embodiment of a locker unit comprising a plurality of doors wherein such doors can be interconnected to change the dimensions of a door from a first size to a second size by interconnection with an adjacent door above or below it.

FIG. 10B details changes in compartment volume when there is more than one moveable shelf partitions (e.g., 832, 834). It should be appreciated that with additional moveable shelf partitions (e.g., 832, 834) comes additional compartments. For example, in the far-left side of the locker unit (12) shown in FIG. 10B moveable shelf partition (832) divides the available volume into two compartments (828' and 836'). Adding moveable shelf partition (834), however, creates another compartment (838). Thus, the number of compartments (e.g., 828', 836', and 838) can be increased or decreased by changing the number of moveable shelf partitions. In an embodiment, the number of moveable shelf partitions s can be limited to correspond to a maximum number of compartments having a predefined volume. This is better understood by referring to FIGS. 10A, 10B, 11A, and 11B together. For example, FIG. 11A illustrates a version of a locker unit (12) having ten locker doors (116). Each locker door has a given length, width, and height. In this figure, the doors (116) have the same dimensions, but embodiments do not necessarily require all doors (116) to have the same dimensions. In an embodiment, movable shelf partitions (e.g., 832, 834, 802) are positioned between an upstanding moveable partition (e.g., 804) and a wall (e.g., 112 or 118) to define individual locker (102) compartments having openings corresponding to the dimensions of the doors (116). Thus, in this example the maximum number of lockers (102) that can be created within the locker unit (12) is ten, wherein each locker (102) has the same predefined compartment volume. This internal configuration, however, may be changed by changing the position of a movable shelf partition and/or upstanding moveable partition. For illustrative purposes, assume that moveable shelf partition (832) is now aligned between lockers #1 and #3 thereby defining compartment (828') having a volume corresponding to the minimally allowed volume. Similarly, moveable shelf partition (834) is aligned between lockers #5 and #7 thereby defining compartment (838), which is two times the minimally allowed volume. Since compartment (836') lies between moveable shelf partition (832) and moveable shelf partition (834), and there are no additional moveable shelf partitions in this example, compartment (836') also double the minimal volume. Thus, in this example, enabled compartment volumes for vertically stacked lockers (102) correspond to the minimal allowed volume, double the minimally allowed volume, triple the minimally allowed volume, quadruple the minimally allowed volume, and the maximum volume allowed by the vertical stack, as was described with respect to FIG. 10A. In this way, the number and position of movable shelf partitions (e.g., 832, 834) and/or upstanding movable partitions (804) defines the volume available within a given locker (102) compartment.

In a sense, the size and shape of the doors (116) determines available locker (102) volumes. As is shown in FIG. 11A, each door (116) in this illustration is roughly the same size and shape for illustration purposes. And, using one moveable shelf partition (e.g., 832) as an example, the positioning of this moveable shelf partition (832) determines the number of doors that will open to expose corresponding compartments. When moveable shelf partition (832) is positioned between doors (116) #1 and #3, door (116) #1 will enable access to compartment (828), and the doors (116) #3, #5, #7, and #9 will collectively enable access to compartment (836). Thus, in this example there are two lockers (102) defined by the movable shelf partition (832), each locker (102) having a size defined by the position of the moveable shelf partition (832). In the same way, if the moveable shelf partition (832) is positioned between lockers #3 and #5, doors (116) #1 and #3 will collectively enable access to compartment (828) and doors (116) #5, #7, and #9 will collectively enable access to compartment (836). In this case however, the size (e.g., volume) of the compartments (828, 836) has changed, as was previously described, where the degree of change generally corresponds to the height of the doors (116) in the vertical stack of lockers. In other words, the moveable shelf partition (832) can be positioned/repositioned at intervals corresponding to adjacent doors in the stack. If all of the doors (116) are the same height the intervals are regular but if adjacent doors are not the same height, the intervals are irregular.

In an embodiment, doors (116) such as those in a vertical stack (e.g., FIG. 11A doors #1, #3, #5, #7, and #9 or doors #2, #4, #6, #8, and #10) can be caused to collectively open according to moveable shelf partition (e.g., 832) position, as was described above. As depicted in FIG. 3C, each of the doors is preferably hinged at one end, e.g., hinge (210), and has a top edge or side (302), a bottom edge or side (304), and a front edge or side (306), as well as the outer surface (224) and an inner surface (226) of each door. Typically, identifying numbers are on the front panel portion. In an embodiment, the controller (14) can control collective door (116) opening either directly or via one or more microcontrollers. As one nonlimiting example, a plurality of microfasteners (1102) and corresponding microreceivers (1104) may be controlled by the controller (14) or a combination of controllers. Generally, the controller (14), platform (18), or both can determine which microfasteners (1102) and microreceivers (1104) should be engaged or disengaged to enable/disable a collective door (116) configuration. Thus, the top edge/side (302) of door #5 might be engaged to the bottom side/edge (304) of door #3. This determination may be based on the current position of one or more movable shelf partitions (e.g., 832, 834) and which doors (116) should be deployed either individually or collectively to allow access to defined compartments (e.g., 828, 836). The determination of the shelf partition may be stored within a database or memory as a known position and said known position then defines which of the microfasteners (1102) are thus engaged to define a door based on the given position of the shelf partition.

Figure 11B:
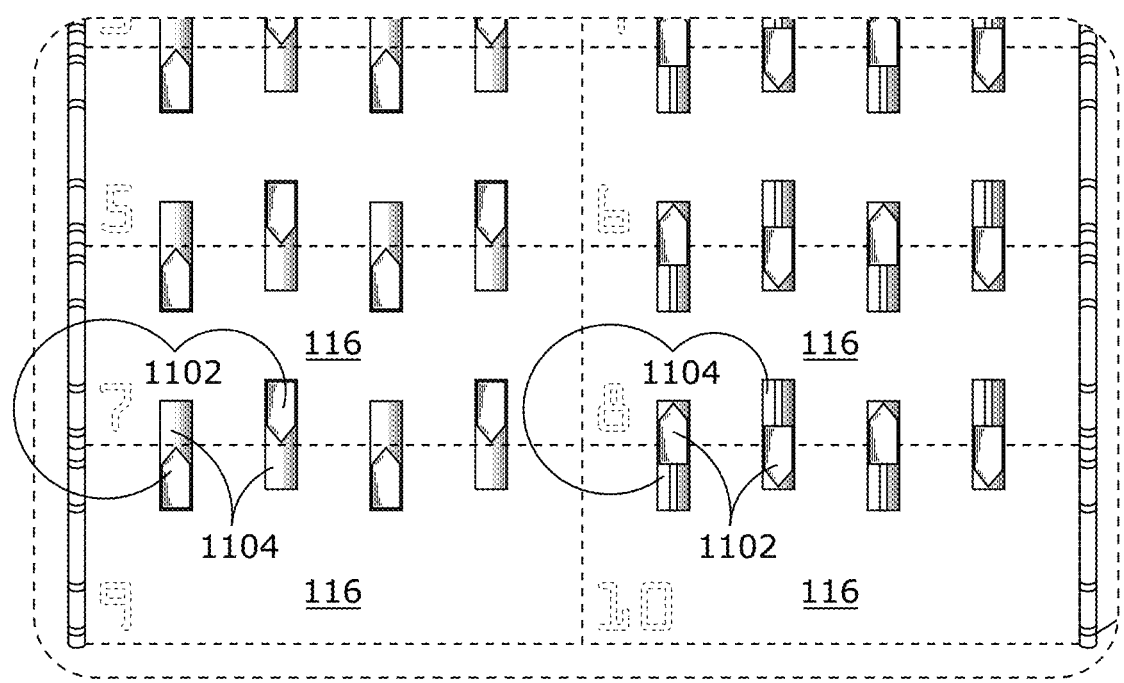
FIG. 11B depicts an embodiment of an attachment system to interconnect one of a plurality of doors to another door so as to allow for modification of the door from a first size to a second size.

Going back to the example where movable shelf partition (832) is positioned between doors #1 and #3, this is a predefined position that may be known locally (e.g., by controller [14]) and/or remotely (e.g., platform [18] via server and database [22]). The known position may be looked up to determine which doors (116) should be deployed individually, collectively, or both. In the current exemplary position of moveable shelf partition (832), the look up (e.g., via database or local data storage) determines that door (116) #1 should be deployed individually and no microfasteners (1102) or microreceivers (1104) need to be engaged to access compartment (828). However, since there are no additional moveable shelf partitions in place, microfasteners (1102) and microreceivers (1104) between doors (116) numbered #3 and #5, #5 and #7, and #7 and #9 need to be engaged to enable a collective door to be opened (e.g., #3, #5, #7, and #9 together). Thus, a top edge/side (302) of a lower door is secured to a bottom edge/side (304) of the immediately adjacent higher door. This can be repeated such that two, three, four, or n number of doors are connected to one another based upon the position of the shelf partition. In the same way, the controller (14), any microcontrollers, and/or platform (18) can determine which lock/s and/or locking mechanisms should be engaged. For example, where an individual lock (104) is the only lock available it will be engaged as has been described. However, where more than one lock (104) is available due to a collective door (116) there are several available options, one option being that one input portion (e.g., scanner, combination, code, etc.) of the collective will cause one or more the locking mechanism of the collective to simultaneously engage/disengage corresponding fasteners/receiving members (see, e.g., FIG. 3C) of the collective. Microfasteners (1102) and microreceivers (1104) may be any type of mechanical, electrical, or magnetic system, or combinations thereof that have been sized to conform with their function as described herein. FIG. 11B shows an electromechanical system with pins, bolts, latches, or the like disposed within the body of the doors (116) that upon actuation can be received by the receiving end of the micro receivers (e.g., 1104), which in this case may be a hole bored into door bodies. When disengaged (e.g., left side of FIG. 11B) the micro fastening mechanism allows doors (116) to be individually opened. When engaged, however, a collective door (116) will be opened. Since the microfastening system between doors numbered #4, #6, #8, and #10 are engaged in FIG. 11B, these doors will open as a collective enabling access to a compartment having four times the minimal allowable volume. Notably, although described with respect to shelf (e.g., 832) position, embodiments can be configured in the same or similar way to enable a variety of upstanding moveable partition (804) positions, or both a variety of moveable shelf partitions (e.g., 832) and upstanding moveable partition (804) positions. Such orientation of the micro fasteners (1102), easily allows the system to configure the size of the door, depending on the position of the movable shelf partition (832). Thus, upon movement of, and final position of the movable shelf partition (832) the micro fasteners (1102) can be configured to generate a door of the defined size to allow for secure entry and deposit into the corresponding compartment.

In an embodiment, moveable shelf partition (e.g., 802, 832) movement may be along a vertical track (806) in the direction of vector (802') and upstanding moveable partition (804) movement may be along horizontal track (810) in the direction of vector (804'). Movement mechanisms, such as those more fully described in FIGS. 10C, 10D, and/or 10E, may be situated within a locker unit (12) to enable the particular mechanism type, which is indicated by the dotted circles of FIG. 10A. As with locks (104) and microfastening systems (e.g., 1102, 1104), the controller (14) alone or in combination with one or more microcontrollers (not shown) and/or the platform (18) can control shelf (e.g., 802) and/or upstanding partition (804) movement along the tracks (806, 810) via one or more movement mechanisms.

FIG. 10C shows a detail of one embodiment of a movement mechanism used to move shelves (e.g., 802) along vertical track (806) to change the position of the moveable shelf partition per directional vector (802'). In the FIG. 10C embodiment, a pulley operator (846) operates a pulley (816) which is used to move moveable shelf partition (802) along vertical track (806) using a guide wire (818) that is attached to the movable shelf partition (802) which raises or lowers moveable shelf partition (802) to change the volume locker compartments (830 and 844), as was previously described. The pulley (816) can be operated using a series of motors and servos controlled by controller (14) alone or in combination with one or more microcontrollers and/or platform (18). Pulley operation can take place automatically to allow shelf (e.g., 802) positioning for a particular implementation or it may be caused by input by an administrator, user, or the like either locally or at another location.

FIG. 10D shows a detail of an alternative embodiment of a mechanism used to move moveable shelf partition (e.g., 802) along vertical track (806) to change the position of the vector (802'). In the FIG. 10D embodiment, a wheel (808) rides along a guide wire (818) that is part of vertical track (806) to move support bracket (820) which is attached to moveable shelf partition (802) which raises or lowers moveable shelf partition (802) to change the height, hence volume of compartments (844, 830) as described herein. The embodiment in FIG. 10D can be operated in manners similar to the embodiment of FIG. 10C.

FIG. 10E shows a detail of an alternative embodiment of a mechanism used to move moveable shelf partition (e.g., 802) along vertical track (806) to change the position of the moveable shelf partition (802). In FIG. 10E, a sprocket (814), with a sprocket operator (842) rides along a sprocket receiver (812) that is part of the vertical track (806). The sprocket (814) is attached to a support bracket (820) which is attached to the moveable shelf partition (802) raising or lowering moveable shelf partition (802) to change the height, hence volume of compartments (844, 830), as described herein. The embodiment in FIG. 10E can be operated in manners similar to the embodiment of FIG. 10C.

While the embodiments of FIGS. 10C, 10D and 10E are described in relationship to the moveable shelf partition (802), vertical track (806), and vector (802'), it should be understood that these embodiments can also function in conjunction with upstanding moveable partitions (804) and horizontal tracks (810) to change the configuration of vector (804'). By moving upstanding moveable partitions (804) either right or left, the width, hence volume of compartments (e.g., 844, 830) is changed which allows the corresponding lockers (102) to accommodate different size items/objects.

Additional features/components shown in FIGS. 10A, 10B, and 10F include anchors (822, 824), which can be mounted on one or more walls (112, 114, 115, 118, 120). In this way, the locker unit (12) can be secured in place and prevent tipping, theft and vandalization. Ground anchor (822) and wall anchor (824) may be any suitable anchor, and they may or may not be the same type of anchor (822, 824). As with other embodiments, embodiments of locker units (12) having movable partitions (108) may include one or more cameras (826) and/or other/additional sensors, lights, etc. as shown in other embodiments. However, in this case they are arranged in a way that enables movement of moveable shelf partitions (e.g., 802, 832) and upstanding moveable partitions (804) as desired while maintaining device functionality. Further, moveable shelf partitions (e.g., 802) may be modified in those embodiments enabling upstanding movable partition (804) movement. One such modification can include dividing a moveable shelf partition (e.g., 802) into plural segments (e.g., 802a, 802b, 802c). Each segment (802a, 802b, 802c) can have a predefined width corresponding to incremental width changes allowed by upstanding moveable partition (804) movement to particular positions, in much the same way as shelf (e.g., 802) positioning in a horizontal stack was described above. In this way, the system (10) can determine which doors (116) should/should not be in a collective door based on a current position of one or more upstanding moveable partitions (804) and/or movable shelves (e.g., 802). In other words, at a first upstanding moveable partition (804) position, shelf width can correspond to the width of any one of the segments (802a, 802b, or 802c), at a second upright moveable partition position, shelf width corresponds to any two of segments (802a, 802b, or 802c), which may or may not correspond to the width of two vertical stacks, and in a third upright moveable partition, shelf width corresponds to all three segments (802a, 802b, and 802c), which may or may not correspond to the width of three vertical stacks within the locker unit (12). In an embodiment, upstanding moveable partitions (804) and/or walls (e.g., 112, 118) may include a slot (840) to receive some or all of a moveable shelf partition (e.g., 802, 802a, 802b, 802c). In this way, when an upstanding partition (804) moves along the horizontal track (810) in the direction of vector (804') the moveable shelf partition (e.g., 802a, 802b, 802c) may collapse into the slot (840) so that some or all of the segments are held within the slot (840). Alternatively, if not segmented, the moveable shelf partition (e.g., 802) may slide through the slot (840) into the adjacent vertical space for a continuous moveable shelf partition (e.g., 802) in two adjacent vertical stacks of lockers. Although not shown in these drawings, it should be noted that a mechanical space as previously described may be appended to or contained within these embodiments of a locker unit (12). In addition to housing certain mechanical components, it is conceivable that a plurality of partitions (108) may be moved into and out of the mechanical enclosure to accommodate a variety of locker (102) compartment dimensions such as via strategically placed slots (840).

As was mentioned, certain aspects of the adjustable sized locker unit (12) may be controlled by one or more of the platform (18), controller (14), or other/additional controller/ chipset/computer/microcontrollers (not shown) associated with locker unit (12). As one example, the platform (18) may obtain information about the size of the item and/or desired size of a locker from a user, marketplace, and/or other source of information. The platform (18) may then determine the size of a compartment needed to accommodate the item and compare the determined compartment size to potential compartment sizes available via a given locker unit (12). For example, each locker unit (12) with movable partition capabilities has a set number of potential compartment sizes based on the size of the space enclosed by the one or more walls, the number of upstanding partitions (e.g., 804) and their preset positions (e.g., to divide the enclosed space vertically), and the number of shelf partitions (e.g., 802) and their preset positions (e.g., that are to divide the enclosed space horizontally). If one or more items are already being housed within compartments according to their item size, those compartments, and additional compartments may limit potential compartment configurations. For example, if an upstanding partition (804) is in a given position, all horizontally stacked compartments defined by that upstanding partition (804) will have the same width. Compartment volume in that stack can only be changed by the number and position of available shelves (e.g., 832, 834). If the size of the compartment needed can be accommodated by the available compartment volume, then the platform (18) determines that the desired size is available to accommodate the item. Stated another way, other items may already be stored within lockers that are adjacent to or impacted by the movement of the upstanding partitions or shelves. In such cases, the minimum size of the locker needed for those items is stored within the database (22) for the given locker unit (12), and the platform (18) can create a map of sorts, to identify the possible configurations available to best fit the item sought to be stored within the locker unit (12) in view of the items already stored therein.

When the platform (18) determines an acceptable configuration or reconfiguration of compartment volume without disrupting/disturbing items already stored in the locker unit (12), the platform (18) can send a signal to the controller (14) and/or a microcontroller to cause the desired changes to be made via one or more movement mechanisms for shelf (e.g., 802) and/or upstanding partition (804) positioning/repositioning. In this way, if the item to be placed in the locker (102) is small, one or more upstanding partitions (804) and/or interior shelves (802) may be moved to make a small locker (102s). As such, more interior space is available within the locker unit (12) as a whole for larger items. The platform (18) may take the current locker unit (12) configuration including currently available interior space when determining locker availability for other/additional rentals. Conversely, if the item to be placed in the locker (102) is large, one or more upstanding partitions (804) and/or shelves (802) may be moved to make a large locker (202*l*), which, in turn, leaves less interior space available within the locker units (12). As the locker doors (116) generally maintain a static size, the platform (18) can determine which individual door(s) should be made into a collective door, thereby creating an opening to access the newly configured compartment that is generally the same size and shape as the compartment opening. In turn, the platform (18) may program/code the locks accordingly as was described herein. After any given item is taken from an adjustable locker/locker unit (12), the platform (18) can use the release space for subsequent adjustment to compartment volume via moveable partitions. In such embodiments, the locker system (10) is dynamic to the given needs of the items within the locker at any given time, but also to the size of an item being requested to be placed within the locker system.

Figure 12:
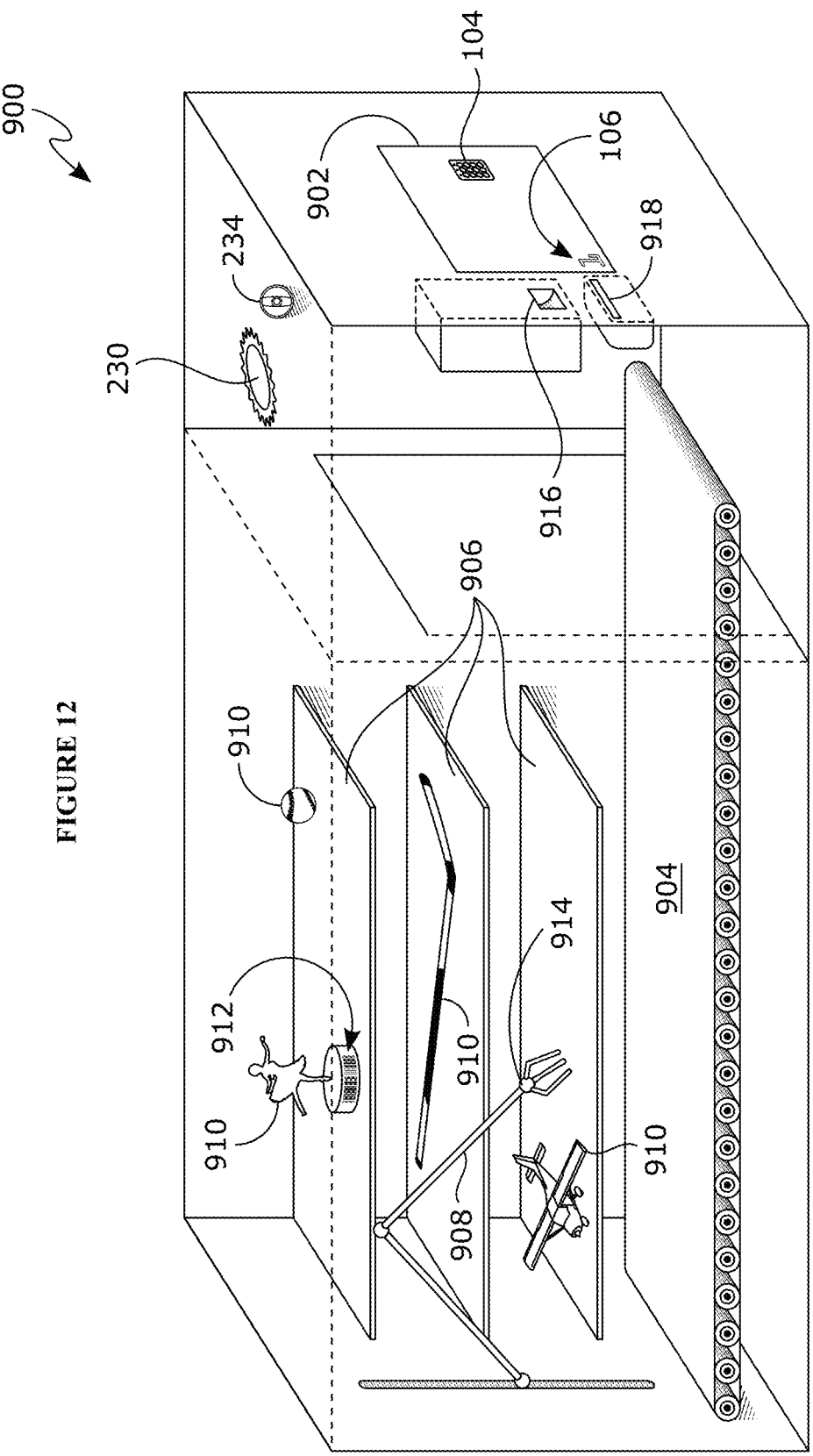
FIG. 12 is yet another embodiment of a locker unit, specifically a shelf box, having one door, a conveyer, one or more shelves within the box, a robotic arm, and a sensor.

FIG. 12 shows an alternative embodiment of shelf box (900). Here, instead of having multiple individual lockers (102), there is one master door (902) with a unit keypad (110) and locker identifier (106). Once the door is opened (e.g., via a first access code), a first user places an item (910) onto conveyor (904) which takes the object/item (910) deeper into shelf box (900) where robotic arm (908) picks up item (910) and places it on the optimal shelf (906). The robotic arm (908) may have an optional asset tracker reader (914) to read asset tracker (912) that is affixed to item (910). When a second user, wants to retrieve an item (910) from the shelf box (900), that user enters a second access code into the locker keypad (104) which sends a signal to the robotic arm (908) and instructs it to retrieve the appropriate item (910) from shelf (906). The robotic arm (908) uses the asset tracker reader (914) to read the asset tracker (912) on the item (910) to confirm that the correct item was retrieved. The robotic arm (908) then places the item (910) back onto the conveyor (904) which moves in the reversed direction to take the item (910) to the master door (902) where the second user retrieves it. The shelf box (900) may optionally have an asset tracker dispenser (916) and a printer (918).

As with other embodiments, the platform (18), controller (14), chipsets/controllers/computers/microcontrollers local to the locker unit (12), or combinations thereof may also control the mechanics of the shelf box (900). For example, one or more of the foregoing may send control signals to the conveyor (904), asset tracker reader (914), and/or robotic arm (908) to move an item (910) to/from a specific shelf/shelf location (906), which may be in response to the respective entry of a first access code by a first user and entry of a second access code by a second user. Generally, the first user may adhere the asset tracker (912) such as a barcode, QR code or the like to the item (910) before placing the item (910) on the conveyer. Alternatively, the shelf box (900) may cause an asset tracker (912) to be printed and/or adhered to the item (910) after it has been placed on the conveyor (904) or shelf (906). The asset tracker (912) can be used to track asset movement and/or location while the asset/item (910) resides within the shelf box (900). Further, the asset tracker (912) may be coded to one or more of the access codes used to open the master door (e.g., by the first user or second user) so that the shelf box (900) knows the item (910) to store/retrieve.

EXAMPLES

Example 1

In an embodiment where the locker unit (12) has a climate control function as shown in FIGS. 4A and 4B a suitable use is for depositing medical samples or distributing prescriptions or any other items that require a climate-controlled environment. As shown in FIG. 4B, and as is previously described, the locker interior (102) is adapted to create a climate-controlled environment. Thus, some individual lockers (102) in locker unit (12) can be heated while other individual lockers (102) can be cooled. Alternatively, any one individual locker (102) can be both heated and cooled to maintain a constant temperature in response to changing external conditions. In addition to temperature, humidity may also be monitored, such as by an internal sensor (not shown). Both temperature and humidity data may be transmitted, e.g., via one or more local/integrated circuits (IC) such as the controller (14), to the network (16), platform (18), or both. One or more of local circuits/ICs such as the controller (14), network (16), and platform (18) can independently or cooperatively control the temperature and/or humidity within the individual locker(s) (102).

In this example, the locker unit (12) is used to collect medical samples such as a urine specimen from users. The user logs into his account and schedules a drop off. The platform (18) suggests a locker unit (12) located within a radius of a particular location as specified by the user. In this example, the locker unit (12) will likely be located at a medical facility such as a hospital, medical arts building, lab, or pharmacy and be dedicated to receiving medical samples, however the climate controlled drop off of medical specimens can occur at any locker unit (12) equipped with mechanical space (402). In this case, the second user of the medical sample is a testing lab or the like. As such, the second user may also set parameters around the drop off times, for example, only Monday through Friday and between the hours of 5:00 AM and 2:00 PM so that staff will be available to retrieve the specimen before it spoils. The second user-defined parameters may be stored in the database (22), which may be referenced when the platform (18) determines locker availability/rental scheduling (e.g., FIG. 7, steps [5006, 5008, 5010]). When the user schedules his drop-off he may optionally have a "locker parameter code" from his medical provider such as an alpha/numeric code or a QR code that can be used in connection with the booking. This code will provide specific storage parameters to the platform (18) alerting it that individual locker (102) must be kept at 4° C. for the urine sample and the sample can be deposited no later than 2:00 PM. Alternatively, the medical provider may enter this information directly into the user account, which can be linked to the platform (18) via the medical provider. As such, the medical provider is an example of a long-term renter of one or more lockers (102)/locker units (12).

The user completes the booking of an individual locker (102) on a specific date, in this instance, Monday, August 1, and for a specific specimen, in this instance a urine sample. In this example, the user has received an optional QR code from his medical provider, so he scans that when booking the locker. The locker software system now knows that the assigned locker (102) must be kept at a consistent 4° C. Next, the platform (18) assigns the user a locker identifier (106) for the designated locker unit (12). In this example, the user has been assigned locker identifier (106) number 4. The platform (18) also checks the parameters set by the user's medical provider and knows that the user can only drop off the specimen between the hours of 7:00 AM and 2:00 PM. The platform (18) then sends the user a first access code that can be used to access individual locker (102) number 4 on August 1 between the hours of 7:00 AM and 2:00 PM. Alternatively or as part of enhanced security, if the user has associated biometric or facial recognition information with his account, that can be used to access the individual locker (102) during the assigned times.

On the morning of August 1, the platform (18) may begin a locker reset if not already reset in preparation for the user's specimen drop off. In August, ambient temperatures are likely above 4° C. The internal sensor senses the current temperature of locker (102) and transmits the sensed data to the controlled (14), network (16), platform (18), or combinations thereof. The controller (14), network (16), platform (18), or combinations thereof will either adjust the temperature of the individual locker (102) directly or via local circuit/IC. One or more of the foregoing will maintain/regulate the temperature of individual locker (102) throughout the transaction. In this example, the internal sensor detects that the internal temperature of individual locker (102) is 22° C. at 4:00 AM. As such, cool air from compressor (404) is directed to flow through duct work (410) to the locker interior (208) of individual locker (102) number 4 via the interior vent (418). The cool air is circulated via a fan (416) and returned to the mechanical space (402) where it is released via vent (408). The internal sensor continues to monitor the temperature of locker (102) keeping it at the constant temperature specified for that particular use. While in this example, the specimen is being deposited on a summer day when the outside temperature is hotter than the specified temperature, if the transaction were occurring in the winter months and the outside temperature is below 4° C., if the internal sensor reads temperatures below the specified temperature, which causes one or more of local circuits/ICs, such as the controller (14), the network (16), platform (18), or combinations thereof, to instruct heating element (406) to create warm air which is transported to the individual locker (102) via duct work (410). In either case, a heating or cooling element, with or without a fan, can passively cool the locker (102), and the system (10) as a whole can manage the temperature with a temperature sensor within the locker interior (102).

The internal temperature of individual locker (102) is now ready to receive the specimen deposit from the user. During the scheduled time, when the user arrives at the locker, he uses the first access code into lock (104) or inputs his biometric, facial recognition or image which, if passed causes the locker door (116) to open. However, if the user enters this information outside of the drop of times, i.e., 5:30 AM or 3:00 PM, the door (116) will not open. Once the user closes the door it can automatically relock by reengaging the locking mechanism thus rendering the user's first access code inoperable. Alternatively, a prompt may appear on lock (104) or display (506) asking the user to confirm that he is ready to relock the door (116). Once the user affirmatively confirms relock, his access code is rendered inoperable.

Once the door is closed, there are several ways to notify the second user that the specimen is ready for pickup. The act of locking the door (116) may trigger a communication to be sent to the second user directly from the network (16), or via the platform (18). Alternatively, if locker (108) is equipped with scale (204), once the scale (204) detects a change in weight, it can transmit a signal via the channels described above to the second user. In another alternative, if locker (108) is equipped with camera(s) (206), an image of the specimen after it is deposited in the individual locker (102) is sent to the provider via the aforementioned channels. The camera (206) may be engaged simply by the entry of the first access code, or by locking the locker (102), or any other feature that would signify the opening and/or closing of the door to identify the item within the locker (102).

The second user has several options for retrieving the specimen from the individual locker (102). First, the platform (18) can send the second user a second access code that the second user or the second user's designee can use to open the locker (102). Alternatively or additionally, the second user or the second user's designee may have biometric information, or a facial recognition image stored in the second user's account which can be used to open the assigned individual locker (102) one or more times during a designated time window. As another option, the second user or the second user's designee has a master code which can be an alpha numeric code, barcode, QR code, NFC code, or the like that is used to unlock any individual locker (102) at any time as an administrative function. In yet another option, the second user or the second user's designee may have a master key with the ability to unlock one or more individual locker(s) (102) using a keyhole with controls a deadbolt engaging with or detaching from a dust box to lock or unlock door (116). In all of these examples, the system is able to provide for a drop location, with temperature-controlled spaces, and which allows for anonymity between a given sample and the patient, as may be desirable for many medical applications.

Example 2

A locker unit (12) with climate control functionality is also ideal for patient pharmaceutical prescription pick up. Here, enhanced security can be added to verify the identity of the second user retrieving the prescription from individual locker (102). In this example, the pharmacy, doctor's office, hospital staff or the like places the prescriptions in individual lockers (102) after they have been filled. The staff can either access the individual lockers (102) via a keyhole with a master key or they can access the individual lockers (102) using any of the variety of methods described herein. When the staff member places the prescription in the locker (102) he associates the locker identifier (106) with the account of the second user picking up the prescription. This can either be done manually by inputting the information into an interface that communicates with the platform (18), or it can be done by scanning a barcode, QR code, RFID code or NFC code located on the prescription itself. Scanned prescription information can also pertain to the temperature and humidity requirement of the particular prescription so that the interior temperature of locker can be regulated as previously described in Example 1. Alternatively, camera(s) (206)/internal sensor/reader/scanner(s) can read the barcode, QR code, RFID code or NFC code automatically and transmit that information as previously described to cause the internal temperature of the locker to be regulated, if needed. The staff person then closes door (116), and it automatically locks, or the staff member physically locks door (116) using a key.

Once the prescription is secured in the individual locker (102) the platform (18) notifies the user that it is ready for pickup via an alert from an app, text message, SMS message, phone call, e-mail or any other communication method generally known in the art. The alert contains pertinent information such as the location of the locker unit (12) and/or the assigned individual locker (102). Alternatively, the alert may only contain the location of the locker unit (12), and the remainder of the information will be delivered when the user arrives at the locker unit (12), such as to the network (16) or user device (24). Again, such a system can allow for anonymous delivery of medications, where the pharmacy can fill the prescription and load into a locker system, and the patient does not need to be seen by the pharmacist, in order to maintain anonymity with regard to medications being taken by a particular patient.

In all such cases, turning to FIG. 2, when the user arrives at locker unit (12) he uses the alpha numeric keyboard (508) to enter pertinent identifying information such as the user's account number, last name, date of birth, and/or last four digits of the user's social security number, or such information can be coded with an RFID tag, unique to the user, which contains such information. This information is sent to the network (16) for processing which can occur totally contained within the CPU or in conjunction with the remote platform (18) via wireless connector (510). The platform (18) uses the unique identifying information to look up the user's account and identify the individual locker (102) containing the user's prescription that is ready for pickup. Depending upon the level of security needed, the user may be subject to one or more tiers of enhanced security (e.g., FIG. 8 steps-[620]). Nonlimiting examples of additional verification include, driver's license, passport, health insurance card, Medicare/Medicaid card, credit card, facial recognition scan, or retina scan. All of these types of additional verification can be read by scanner/reader/sensor (522) and/or exterior camera (504) which sends them to the network (16) for processing. Additionally, the locker unit (12) can accept credit card payment or mobile wallet payment from the user for the prescription via scanner (522) or require the user to answer questions customarily asked by a pharmacist using a combination of the alpha numeric keyboard (508), display (506), and network (16). The platform (18) can also monitor the user via exterior camera (504) and provide verbal instructions to the user via speaker (526).

Once the user has successfully verified his identity, paid for the prescription, if required, and/or answered any questions required by the pharmacy, the controller (14), the network (16) on its own or in conjunction with the platform (18), or one another does one of two things. Either it will automatically unlock door (116) thus allowing the user to access locker (102) and retrieve the prescription, or it will instruct the user to approach individual locker (102) with the assigned locker identifier (106) and use lock (104) to access the locker (104) by doing one or more of the following: (i) entering a onetime alpha/numeric access code, (ii) using lock (104) as a biometric scanner to read the user's stored finger print, retina scan or facial recognition image, (iii) using the locker keypad (104) to read a barcode, QR code, or NFC code from the user's phone, or (iv) using the locker keypad (104) to read the magnetic strip on the user's credit card that paid for the transaction. Once this step is successfully completed, door (116) is unlocked so that the user can access the locker (102) and retrieve the prescription.

In some embodiments, the patient makes a payment of the prescription, and only upon the prepayment, is the access code provided to the patient for pickup.

In other embodiments, the patient provides the access code, and then is prompted to make the payment. Once the payment is authorized, the entered access code, together with the payment then unlocks the locker.

In some embodiments, the personal information is not needed for prescription pickup, wherein an individual, so long as they have the access code, can pick up the prescription for another patient. This may be helpful in picking up a prescription for a spouse, a child, another dependent, or even by a friend, relative, or another person who may be employed by the patient.

In another embodiment of this Example 2, the back wall (115) of individual locker (102) is replaced by a second opposing door (116) with its own lock (104) and receiving member (212) with entry pad latch and/or keyhole and deadbolt. In this embodiment, the user and the provider enter the locker (102) from different doors (116). The provider's door may open into the provider's secure office or lab space on the interior of a building or office suite while the user's door (116) may open to the exterior of the building or the common hallway of an office suite. This allows the provider to place items into and remove items from the locker (102) without leaving the confines of the provider's space.

Example 3

While FIG. 2A shows individual lockers (102) of uniform size in fixed position a further improvement arises when the individual lockers (102) can be customized to various sizes to meet the current space demands of users. In FIG. 10A, FIG. 10B, and FIG. 10F, both the moveable shelf partitions (802) and/or upstanding moveable partition(s) (804) are completely moveable to change the size of compartment (828). While it is possible to move both moveable shelf partitions (802) and upstanding shelf partition (804) simultaneously, the locker software system (10) may only make one direction available at a time to reduce the amount of wasted space. In this example, user one has posted a standard size computer monitor for sale on a peer-to-peer marketplace such as Craigslist®. User two agrees to purchase the computer monitor from user one for ten dollars. User one logs into his account using the platform (18) and locates a locker unit (12) that is convenient for both users. User one indicates that the monitor is 24 inches wide by 18 inches tall. The locker software system assigns user one compartment (830) which as shown in FIG. 10A is set to have a height of 24 inches. The platform (18) processes the request and determines that it can optimize the use of space by moving moveable shelf partition (802) along vertical track (806) into vector (802') so that in FIG. 10F, compartment (830') is only 19 inches tall, just big enough to accommodate the monitor that user one will deposit into the compartment (830').

Prior to user one's arrival at locker unit (12) the network (16), either independently or in conjunction with the locker system software, adjusts the position of moveable shelf partition (802) by activating pulley (816) detailed in FIG. 10C at the top of vertical track (806) using a pulley operator (846) such as a servo, motor, microcontroller or other remote operating system generally known in the art, which moves the guide wire (818). Moving to FIGS. 10D, 10E and 10F, as the pulley (816) moves the guide wire (818), the wires run through wheel (808) that is attached to said moveable shelf partition (802) support bracket (820) thus raising or lowering said shelf partition (802) along vertical track (806) and changing the height of compartment (830'). Once moveable shelf partition (802) is in the correct position, it is secured and locked into place and pulley (816) and wheel (808) are no longer movable until the item is retrieved from compartment (830') and the locker is placed back into circulation. Alternatively, the pulley operator (846)/pulley (816)/guide wire (818)/wheel (808) system can be replaced by a sprocket (814), sprocket receiver (812) and sprocket operator (842) to raise and lower moveable shelf partition (802).

Once compartment (830') is configured and securely locked into place, the platform (18) notifies user one that his locker is ready for drop off. User one uses his assigned unique access code to open one or more door(s) (116), places the computer monitor into compartment (830') and closes the door(s) (116). Because the space has been reconfigured, user one may need to open one or more doors to access compartment (830'). The verification process optionally continues as described in the previous embodiments and the platform (18) notifies user two that the item is ready for pick up. User two retrieves the item optionally using the processes described in the previous embodiments and the transaction is complete. Once the transaction is complete, the platform (18) knows that it can reconfigure compartment (830') to meet the needs of the next set of users.

As shown in FIGS. 10A, 10B and 10F, it may be advantageous to allow the partitions to stack against one another to change the size of compartment (836). In FIG. 10A, moveable shelf partition (832) is stacked with moveable shelf partition (834) because moveable shelf partition (834) from FIG. 10B has moved up the vertical track (806), so it is touching moveable shelf partition (832). Alternatively, moveable shelf partition (834) could be positioned on the floor by moving down the vertical track (806) to the bottom of locker unit (12) so it is out of the way. This allows compartment (836) to have a greater vertical dimension to accommodate taller objects such as a baseball bat. In FIG. 10A, the far-left column of lockers only has two compartments (288) and (836), because the moveable shelf partition (834) is stacked. When moveable shelf partition (834) is unstacked, three spaces may be possible, or alternatively, moveable shelf partition (832) can also be stacked, creating a single space.

Turning to FIG. 10B, to optimize space, the platform (18) and/or the network (16) has directed the pulley operator (846) to move pulley (816) which moves the guide wire (818) thus lowering moveable shelf partition (834) along vertical track (806) until it is in the desired location. Now, compartment (836') is smaller to accommodate a smaller object, but by moving moveable shelf partition (834) down or up the vertical track (806) as dictated by its starting position a third compartment (838) has been created. Now, the platform (18) can list three compartments (208, 836', and 838) in the far-left column of locker unit (12) as available for rent.

Moving the upstanding moveable partition (804) follows a similar process with the pulley operator (846)/pulley (816)/guide wire (818)/wheel (808) system or the sprocket operator (842)/sprocket (814)/sprocket receiver (812) system used to move upstanding moveable partitions (804) along horizontal track (810) to change the size of compartment (844). However, in moving the upstanding moveable partitions (804), the size of the moveable shelf partitions (802) must change to coincide with the different size of the reconfigured compartment (844'). This is accomplished via one of several ways. If the moveable shelf partitions (802) are in a fixed position throughout all of locker unit (12) then upstanding moveable partitions (804) may optionally include a slot (840) in each upstanding moveable partition (804) that is at the height of moveable shelf partition (802) so that when upstanding moveable partition (804) moves along horizontal track (810) into upstanding moveable partition vector (804'), the moveable shelf partition (802) slides through the slot (840). Alternatively, moveable shelf partition (802) may have a telescoping feature that allows it to expand, contract and lock into place as upstanding moveable partitions (804) moves along horizontal track (810). As shown in FIG. 10F, the moveable shelf partition is comprised of telescoping sections (802a, 802b, and 802c) which can expand and collapse to the appropriate length. Also, similar to the shelves, the upstanding moveable partitions (804) can stack against one another changing the number of vertical columns of individual lockers within locker unit (12). Additionally, the upstanding moveable partition (804) may optionally have a telescoping feature allowing them to not fully extend to unit exterior top.

While pulley and sprocket systems are specified, these two embodiments can be combined together, or another system entirely can be utilized to allow for movement of walls or floors in each of the embodiments, as would be understood by those of ordinary skill in the art.

While not shown in FIGS. 10A, 10B and 10F, the moveable shelf partitions (802) and upstanding moveable partitions (804) can optionally contain all of the features of FIG. 3AB such as scale (204), light(s) (202), camera(s) (206), and/or all of the features of FIG. 4B such as fan (416), interior vent (418), gasket (414), and/or insulation (412), and/or additional features such as external and/or internal sensor(s). Regardless of the configuration of the locker unit (12) shown in FIGS. 10A, 10B, and 10F, each locker (102)

will be accessible via one or more doors that only access that particular locker interior in the current configuration. Those doors may optionally contain one or more of hinge (210), lock (104), keyed and/or keyless entry, and/or locker identifier (106).

Example 4: Conveyor Belt

In other embodiments, the individual lockers (102), are replaced by an automated system such as the one depicted in FIG. 12. Here, shelf box (900) has master door (902) with lock (104) and locker identifier (106). While not shown in FIG. 12, the shelf box (900) may optionally contain one or more of the features from FIG. 5 such as exterior camera (504), display (506), alpha numeric keyboard (508), power cord (514), controller (14), external electrical power (518), scanner/reader/sensor (522), speaker (526), and/or features from FIG. 10B such as ground anchor (822) and/or wall anchor (824).

In this embodiment, user one has sold user two item (910), in this example a music box, on a peer-to-peer marketplace such as Facebook Marketplace®. The users agree to a price of $200.00 and opt to use shelf box (900) to exchange the item (910) between the two of them. They use the platform (18) to select a shelf box (900) that is conveniently located near both of them. Each user logs into his individual account in the locker software system. User one is asked to provide identifying information about the object/item (910). In this example, user one tells the platform (18) that the item is a music box measuring five inches tall and weighing one pound. The locker system software assigns a unique asset tracker (912) to the item (910). The asset tracker (912) can be a barcode, QR code, alpha numeric code or any printable code that can be read by a machine. User one prints the asset tracker (912) at home and affixes it to the item (910). Alternatively, this step can be completed at the shelf box (900) by printing the asset tracker (912) using printer (918) or if the asset tracker (912) is an RFID or NFC tag, the user obtains the asset tracker (912) from the asset tracker dispenser (916) and affixes it to item (910) or to a container holding the item. A tag may be a digital tag, such that the tag itself can be programmed to identify the given identifier. Such tags may include both NFC tags, but simple LCD (or similar) type tags can populate a QR code, or a barcode, which can be modified for a subsequent user.

The platform (18) also generates a unique way for user one to access shelf box (900) using use lock (104). This can be an alpha numeric code delivered to the user's account or sent to the user via e-mail, text message, or SMS. Alternatively, if lock (104) is a biometric reader, this can be the user's fingerprint, retina scan or facial recognition image, or if lock (104) is a scanner or card reader, this can be a barcode, QR code of NFC code delivered to the user's device by the platform (18) or the user's credit card or person ID such as a driver's license that was previously associated with the user's account. The platform (18) may set parameters around which user one's unique access code can be used to access shelf box (900). For example, if user one schedules drop off on a particular day during a particular time window (i.e., Saturday, June 1 between 9:00 AM and 12:00 PM), or a particular week (i.e., Saturday, June 1-Friday, June 7 at any time), the unique access code assigned to user one for the drop off of item (910) will only work during those times. Alternatively, the unique access code assigned to user one may be active indefinitely until used. In any event, once user one uses the unique access code to unlock master door (902) that code cannot be used a second time until specifically reactivated by the locker system software.

Once user one has correctly entered his unique access code, master door (902) unlocks and user one places item (910) onto conveyor (904). Conveyor (904) is capable of moving in both the forward and reverse direction to move item (910) further from or closer to master door (902). Initially, upon receipt of item (910), conveyor (904) moves item (910) closer to robotic arm (908). Robotic arm (908) uses asset tracker reader (914) to read the asset tracker (912) on item (910). This information is sent to the platform (18) via the one or more networks (16). The platform (18) confirms that the asset tracker (912) matches that assigned to the unique access code used to unlock master door (902). Asset tracker reader (914) can also have a camera function to scan item (910) and send that image scan to the platform (18) which uses image recognition to confirm that item (910) is in fact the item scheduled to be exchanged as part of the transaction between user one and user two. Robotic arm (908) is also able to detect the weight of the object it lifts. This weight is transmitted to the platform (18) as an additional means of verification.

Once the platform (18) has confirmed that item (910) is the correct item, robotic arm (908) lifts item (910) from the conveyor (904) and places it on any one of shelf(ves) (906). An advantage of shelf box (900) is that item(s) (910) can be continuously rearranged on shelf(ves) (906) to optimize storage space. Each time an item (910) is moved to a different shelf (906), the robotic arm (908) uses asset tracker reader (914) to scan asset tracker (912) before the robotic arm (908) moves the item (910) to a different shelf (906). The new location of item (910) is conveyed to the platform (18) so that the precise location of each item (910) is known at all times. If the platform (18) is unable to confirm that item (910) is the correct item to be exchanged between user one and user two, for example, the item has the incorrect asset tracker (912) or the image recognition verification is unable to verify certain parameters such as the item (910) being five inches tall, and/or that the item (910) weighs one pound, then the platform (18) will notify both an administrator and user one. User one is then instructed to return to shelf box (900) to retrieve the incorrect item. User one is given a different unique access code. When user one enters that code into lock (104), the platform (18) directs the robotic arm (908) to retrieve the incorrect item from its known location on shelf (906). The robotic arm (908) places the item (910) on conveyor (904) which moves in a direction so that item (910) is moved closer to master door (902). When the item is in position, conveyor (904) stops moving, master door (902) is released and user one retrieves the incorrect item from shelf box (900).

However, if item (910) is verified by the platform (18) as being the correct item, once it is securely placed on shelf (906), the platform (18) notifies user two that the exchanged item (910) is ready to be picked up from shelf box (900). The platform (18) sends user two a unique access code such as those described in greater detail herein. The unique access code can expire at a particular time, or it can remain active indefinitely until used. User two goes to shelf box (900) and enters his unique access code via locker keypad (104). If shelf box (900) is equipped with the option features shown in FIG. 5, user two may be asked to provide a second level of authentication such as facial recognition confirmation via exterior camera (504) or a government issued ID, such as a license, which can be read via scanner/reader/sensor (522). After user two has passed the required level of verification, before master door (902) is opened, the platform (18)

instructs robotic arm (908) to retrieve the correct item (910) associated with the transaction between user one and user two from shelf (906). Robotic arm (908) places item (910) onto conveyor (904) which moves in the direction to transport item (910) closer to master door (902). Here, light (230) and camera (234) are activated. Once item (910) is in place, master door (902) opens, and camera (234) begins recording still or video images and transmitting those images back to the platform (18) via a wired or wireless connection. If item (910) is the correct item from the agreed upon transaction between user one and user two, user two will remove the item from the conveyor (904) and close master door (902). Camera (234) records that item (910) has been removed from shelf box (900) and sends that information to the platform (18), which marks the transaction as complete and releases any escrowed funds from user two to user one. However, if user two does not remove item (910) from conveyor (904) when user two closes master door (902) conveyor (904) moves item (910) back toward robotic arm (908) which rescans unique asset tracker (912) using asset tracker reader (914) before picking up item (910) from conveyor (904) and moving it to any one of shelf(ves) (906) for storage. The platform (18) notifies user one that the item was not retrieved and user one and user go through the options detailed elsewhere in this application to rectify or cancel the transaction.

In embodiments wherein a container is utilized to hold an item, the container itself has a known size and shape, so that the system brings a given container to the user, to place the item within the container. The container can then be affixed with a tag, such as a printed tag, or the electronic tag can be modified for the particular use scenario. The robotic arm (908), when used with a container, will understand through the system, the size and shape of the container. This allows the system to identify a location on the shelves (906) that can store the container at any given time. Thus, can efficiently allow for placement of containers adjacent to one another on the shelf (906) within the locker system.

Example 5

Because both locker unit (12) and shelf box (900) will contain valuable items and sensitive materials at any given time, they are equipped with many security features to prevent tampering, theft and vandalization. For example, as shown in FIG. 10B, ground anchor (822) and wall anchor (824) are mounted in various positions. In FIG. 10B, ground anchor (822) is shown on unit exterior wall (112), but one or more ground anchors (822) can be used on any surface of locker unit (12) or shelf box (900) that comes in contact with the ground. Ground anchor (822) can be a separate piece that is attached to unit exterior wall via conventional mechanisms such as a nut and bolt system, or via other known mechanisms of attaching two pieces together such as welding or epoxy. Alternatively, ground anchor (822) can be fabricated as one continuous piece of unit exterior wall. Ground anchor (822) is also affixed to the ground surface where locker unit (12) or shelf box (900) is located via conventionally known mechanisms such as bolts or concrete.

Likewise, while wall anchor (824) is shown as being affixed to unit exterior top and also to the back of any locker unit (12), ground anchor (822) can be affixed to any surface of locker unit (12) or shelf box (900) that comes in contact with the wall where the unit is located via the mechanisms described for ground anchor (822). The use of ground anchor(s) (822) and wall anchor(s) (824) prevent locker unit (12) and shelf box (900) from being tipped or removed from its intended location.

Additionally, locker unit (12) and shelf box (900) may optionally contain one or more movement sensor(s) located anywhere in the interior and/or exterior of locker unit (12) and shelf box (900), optimally on at least one parallel surface and one vertical surface. The movement sensor(s) can be any commercially available sensor such as a tilt sensor, inclinometer, tilt indicator, tilt meter, slope alert, slope gauge, gradient meter, gradiometer, level gauge, level meter, declinometer, and/or pitch-and-roll indicator capable of detecting if locker unit (12) or shelf box (900) has experienced unexpected movement indicative of tampering or vandalization. Here, when the movement sensor experiences an unexpected change, it sends a signal either wired or wirelessly to the network (16) which either on its own or in conjunction with the locker system software, initiates several safety features such as activating alarm and/or contacting an administrator, security service, and/or law enforcement officials. A change detected by movement sensor may also optionally activate one or more camera(s) (206) and/or exterior camera (504) to record security footage.

The anonymity of using locker unit (12) and shelf box (900) may make them susceptible to criminal activity such as the exchange of illegal substances and other contraband such as drugs or explosives. Accordingly, locker unit (12) and shelf box (900) are equipped with additional safety features to prevent this type of illegal use namely internal sensor(s) which can be a chemical sensor, immunosensor, transducer, spectroscope such as infrared absorption spectroscopy, thin film sensor, or any other sensor generally known in the art capable of detecting illegal substances and/or explosives. In this example, user one and user two book an exchange transaction using the locker system software, however, they indicate that the item being exchanged is something other than the illegal substance, for example, a cosmetic powder in a jar. The locker software system assigns user one an individual locker (102) and a unique accesses code to unlock the individual locker (102) as described in detail elsewhere in this application. User one places his item into locker (102) and closes door (116) at which point internal sensor(s) is activated. Here internal sensor detects that the substance placed in locker (102) is cocaine rather than beauty powder. The internal sensor communicates this information to the network (16) either wired or wirelessly. The network (16) can process the information directly at locker unit (12) or shelf box (900), or the network (16) can send the information to the platform (18) or an administrator via wireless connector (510).

Once the illegal substance is identified, several things happen either simultaneously or sequentially. First, all relevant emergency response personnel are notified. The platform (18) has preestablished standard operating procedures for each potential substance that can be detected. These can range from notifying an administrator and/or security guard to mobilizing, police, fire department, military, and/or explosives response team. Second, all access codes to the assigned individual locker (102) are deactivated and an emergency access code is created which can be shared with an administrator, law enforcement personnel, and/or a bomb squad. This emergency access code will remain active for multiple uses until the situation is marked as resolved in the locker system software. Third, if there is an imminent threat to individuals in close proximity to the locker unit (12) or shelf box (900), speaker (526) delivers instructions to guide individuals to safety. Fourth, the platform (18) can optionally activate all camera(s) (206) and/or exterior camera (504) to capture security footage of the event.

At the discretion of the administrator and/or law enforcement personnel, the platform (18) can send a notification to user two, canceling the transaction or the platform (18) can allow the transaction to continue as planned as a means to capture individuals engaging in criminal activity. The platform (18) may also provide law enforcement personnel with details about user one and user two from their accounts to aid in the investigation.

Example 6

The locker system as detailed herein, may function in certain applications as a mailbox for an extended duration. As noted herein, an individual locker may be rented or held by a single user for such timer periods as days, weeks, months, etc. and thus can serve as a repository for the individual user, such as a rentable mailbox. In such an embodiment, it may be advantageous for the user to have a dedicated key unique to the individual user. Such key can be a mechanical key, a unique code which can be entered into a keypad, or items such as an RFID beacon. Similarly, access by the mail carrier can also then be through the mail carrier's unique code, or RFID beacon, if through a front door or can be accessed into the same lockers, through a rear door, which is only accessible by the mail carrier.

Thus, when mail is deposited, the unique code/RFID beacon can be entered and unlock a door, providing access to the locker/mailbox; items are thus placed into the locker and the components of the system, as detailed herein, can then perform the various actions that are desired by the given system, or the particular user, such as capturing images, detecting the presence of an item, etc. or simply allowing for the opening and depositing and retrieving of mail from the box. The system can include such mechanical features as adjusting the size of the lockers, so that in a fixed setting, larger packages could be placed into an ordinary locker, when needed, and adjusted back after use. Thus, the system provides for a unique flexibility that is otherwise found in the industry, allowing for secure depositing of packages or mail, while simultaneously giving the unique flexibility of size management of each locker.

Therefore, one can understand that the system details a unique platform that allows for a flexible solution to storage locker systems, allowing for adjustable locker sizes where desired. Furthermore, components of the system detail the ability to track and allow for exchange of items within the locker systems, with specific safeguards to improve the safety and reliability of transactions between two parties.

What is claimed is:

1. A locker system having adjustable-sized lockers, the locker system comprising:
    a. a first movable partition disposed between a first wall and a second wall as an upstanding partition or between a third wall and a fourth wall as a shelf partition wherein the first wall, the second wall, the third wall, the fourth wall, and a fifth wall are configured to create an enclosed space and the first movable partition is disposed between two walls at a first position and the enclosed space is divided into a first compartment and a second compartment, each of the first compartment and the second compartment having an initial volume;
    b. a first door connected to one of the first wall, the second wall, the third wall, the fourth wall, and the fifth wall to enable access to the first compartment and a second door connected to one of the first wall, the second wall, the third wall, the fourth wall, and the fifth wall to enable access to the second compartment;
    c. a first locking mechanism corresponding to the first door and a second locking mechanism corresponding to the second door; and
    d. a controller in communication with the first locking mechanism, the second locking mechanism, or both to cause the first locking mechanism, the second locking mechanism, or both to be engaged/locked or disengaged/unlocked wherein the controller is also in communication with the first movable partition to cause the first movable partition to move from the first position to a second position;
    e. a database coupled to the controller either directly or indirectly, wherein the database stores data about a plurality of preset positions in which the first movable partition can be moved, wherein one of the preset positions in the plurality corresponds to the first position and another of the preset positions in the plurality corresponds to the second position, and wherein the first door and the second door each have a plurality of sides and each preset position in the plurality is complementary to one of the plurality of sides of the first door, one of the plurality of sides of the second door, one of a plurality of sides of an additional door, and/or one of the first wall, the second wall, the third wall, the fourth wall, and the fifth wall; and
    f. a microfastening system controlled by the controller, the microfastening system joining the first door and the second door together at one of the sides of the plurality of sides of the first door and an adjacent edge in the plurality of sides of the second door, the microfastening system comprising at least one microfastener and at least one microreceiver wherein the first door and the second door to operate as a single, collective door when the microfastener is received within the microreceiver.

2. The locker system of claim 1 wherein the first movable partition is disposed in the second position, which causes the first compartment and the second compartment to change from their respective initial volume to a respective subsequent volume, wherein when a subsequent volume of the first compartment increases, a subsequent volume of the second compartment decreases and vice versa.

3. The locker system of claim 1 further comprising a track in which the first movable partition is movably secured, the track to enable the first movable partition to be moved from the first position to the second position.

4. The locker system of claim 1 further comprising a pulley system in communication with the first movable partition and the controller, the pulley system to move the first movable partition from the first position to the second position.

5. The locker system of claim 1 further comprising a sprocket.

6. The locker system of claim 1 further comprising automatically causing the microfastening system to join the first door to the second door in response to changing the first movable partition from the first position to the second position.

7. The locker system of claim 1 further comprising a second movable partition, the second movable partition configured as another upstanding partition disposed between the first wall and the second wall, the first wall and the first movable partition configured as the shelf partition or the second wall and the first movable partition configured as the shelf partition, or the second movable partition configured as another shelf partition disposed between the third wall and the fourth wall, the third wall and the first movable partition configured as the upstanding partition, or the fourth wall and the first movable partition configured as the upstanding partition.

8. A locker system having adjustable-sized lockers, the locker system comprising:
 a. a first movable partition disposed between a first wall and a second wall as an upstanding partition or between a third wall and a fourth wall as a shelf partition wherein the first wall, the second wall, the third wall, the fourth wall, and a fifth wall are configured to create an enclosed space and the first movable partition is disposed between two walls at a first position and the enclosed space is divided into a first compartment and a second compartment, each of the first compartment and the second compartment having an initial volume;
 b. a first door connected to one of the first wall, the second wall, the third wall, the fourth wall, and the fifth wall to enable access to the first compartment and a second door connected to one of the first wall, the second wall, the third wall, the fourth wall, and the fifth wall to enable access to the second compartment;
 c. a first locking mechanism corresponding to the first door and a second locking mechanism corresponding to the second door;
 d. a second movable partition, the second movable partition configured as another upstanding partition disposed between the first wall and the second wall, the first wall and the first movable partition configured as the shelf partition or the second wall and the first movable partition configured as the shelf partition, or the second movable partition configured as another shelf partition disposed between the third wall and the fourth wall, the third wall and the first movable partition configured as the upstanding partition, or the fourth wall and the first movable partition configured as the upstanding partition; and
 e. a controller in communication with the first locking mechanism, the second locking mechanism, or both to cause the first locking mechanism, the second locking mechanism, or both to be engaged/locked or disengaged/unlocked wherein the controller is also in communication with the first movable partition to cause the first movable partition to move from the first position to a second position.

9. The locker system of claim 8 wherein the first movable partition is disposed in the second position, which causes the first compartment and the second compartment to change from their respective initial volume to a respective subsequent volume, wherein when a subsequent volume of the first compartment increases, a subsequent volume of the second compartment decreases and vice versa.

10. The locker system of claim 8 further comprising a track in which the first movable partition is movably secured, the track to enable the first movable partition to be moved from the first position to the second position.

11. The locker system of claim 8 further comprising a pulley system in communication with the first movable partition and the controller, the pulley system to move the first movable partition from the first position to the second position.

12. The locker system of claim 8 further comprising a sprocket.

* * * * *